US008131856B2

(12) United States Patent
Murase et al.

(10) Patent No.: US 8,131,856 B2
(45) Date of Patent: Mar. 6, 2012

(54) COMMUNICATION SYSTEM AND COMMUNICATION METHOD

(75) Inventors: Yasuhiro Murase, Tokyo (JP); Jun Moriya, Tokyo (JP); Hiroyuki Kikkoji, Tokyo (JP); Nozomu Okuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 10/555,990

(22) PCT Filed: May 18, 2004

(86) PCT No.: PCT/JP2004/007028
§ 371 (c)(1),
(2), (4) Date: Nov. 8, 2005

(87) PCT Pub. No.: WO2005/015421
PCT Pub. Date: Feb. 17, 2005

(65) Prior Publication Data
US 2007/0005435 A1    Jan. 4, 2007

(30) Foreign Application Priority Data

Aug. 11, 2003 (JP) ................. 2003-291741
Aug. 25, 2003 (JP) ................. 2003-299491
Sep. 26, 2003 (JP) ................. 2003-336375

(51) Int. Cl.
*G06F 15/16* (2006.01)
*G06F 15/177* (2006.01)
*G06F 17/00* (2006.01)
(52) U.S. Cl. ........ 709/227; 709/203; 709/205; 709/206; 709/222; 709/229; 705/10; 705/15; 726/1; 726/6; 726/8
(58) Field of Classification Search .............. None
See application file for complete search history.

(56) References Cited

U.S. PATENT DOCUMENTS
4,080,659 A * 3/1978 Francini ................. 708/134
(Continued)

FOREIGN PATENT DOCUMENTS
JP    2002-055948    2/2002
(Continued)

OTHER PUBLICATIONS
U.S. Appl. No. 10/526,902, filed Aug. 16, 2005, Yamashita et al.
(Continued)

*Primary Examiner* — Ario Etienne
*Assistant Examiner* — Ho Shiu
(74) *Attorney, Agent, or Firm* — Oblon, Spivak, McClelland, Maier & Neustadt, L.L.P.

(57) ABSTRACT

A first communication apparatus 1 stores a first customer information registered by a user in order to receive a first service. A second communication apparatus 2 stores a first customer information registered by the user in order to receive a second service. A transmission mean 3a of a third communication apparatus 3 transmits request information requesting to receive the first service to the first communication apparatus 1 together with identification information of the user. A reception mean 3b receives customer information necessary for user registration for the first service from the first communication apparatus 1 according to the transmission of the request information. When the customer information necessary for the user registration for the first service is already included in second customer information, a display mean 3c displays the customer information in the second customer information on an input screen for user registration. Therefore, input of customer information of a user is facilitated in the case in which user registration is performed in plural communication apparatuses.

26 Claims, 26 Drawing Sheets

U.S. PATENT DOCUMENTS

| | | | |
|---|---|---|---|
| 5,347,477 A * | 9/1994 | Lee | 708/141 |
| 5,623,612 A * | 4/1997 | Haneda et al. | 715/856 |
| 5,640,577 A * | 6/1997 | Scharmer | 715/235 |
| 5,966,697 A * | 10/1999 | Fergerson et al. | 705/26 |
| 6,016,484 A | 1/2000 | Williams et al. | 705/39 |
| 6,496,855 B1 * | 12/2002 | Hunt et al. | 709/217 |
| 6,820,204 B1 * | 11/2004 | Desai et al. | 726/6 |
| 6,910,179 B1 * | 6/2005 | Pennell et al. | 715/207 |
| 7,139,978 B2 * | 11/2006 | Rojewski et al. | 715/744 |
| 7,334,184 B1 * | 2/2008 | Simons | 715/234 |
| 7,475,146 B2 * | 1/2009 | Bazot et al. | 709/227 |
| 7,509,672 B1 * | 3/2009 | Horwitz et al. | 726/8 |
| 7,725,523 B2 * | 5/2010 | Bolnick et al. | 709/201 |
| 7,779,345 B2 * | 8/2010 | Topalov et al. | 715/224 |
| 2001/0011250 A1 * | 8/2001 | Paltenghe et al. | 705/41 |
| 2001/0056375 A1 * | 12/2001 | Kunii | 705/14 |
| 2002/0007330 A1 * | 1/2002 | Kumar et al. | 705/36 |
| 2002/0013724 A1 * | 1/2002 | Kudo et al. | 705/9 |
| 2002/0023059 A1 * | 2/2002 | Bari et al. | 705/76 |
| 2002/0023230 A1 * | 2/2002 | Bolnick et al. | 713/202 |
| 2002/0062342 A1 * | 5/2002 | Sidles | 709/203 |
| 2002/0133509 A1 * | 9/2002 | Johnston et al. | 707/203 |
| 2002/0161707 A1 * | 10/2002 | Cole et al. | 705/42 |
| 2002/0186249 A1 * | 12/2002 | Lu et al. | 345/781 |
| 2003/0028792 A1 * | 2/2003 | Plow et al. | 713/193 |
| 2003/0037339 A1 * | 2/2003 | Lee | 725/109 |
| 2003/0041133 A1 * | 2/2003 | Hiroshige et al. | 709/222 |
| 2003/0135507 A1 * | 7/2003 | Hind et al. | 707/100 |
| 2003/0149781 A1 * | 8/2003 | Yared et al. | 709/229 |
| 2004/0025056 A1 * | 2/2004 | Katsube | 713/201 |
| 2004/0068693 A1 * | 4/2004 | Rawat et al. | 715/507 |
| 2004/0171377 A1 * | 9/2004 | Engstrom | 455/419 |
| 2004/0205176 A1 * | 10/2004 | Ting et al. | 709/223 |
| 2004/0230647 A1 * | 11/2004 | Rawat | 709/203 |
| 2005/0060701 A1 | 3/2005 | Murase | |
| 2005/0091679 A1 | 4/2005 | Tanaka et al. | |
| 2006/0190483 A1 * | 8/2006 | Takahashi et al. | 707/104.1 |

FOREIGN PATENT DOCUMENTS

| | | |
|---|---|---|
| JP | 2002-55948 | 2/2002 |
| JP | 2002-351827 | 12/2002 |
| JP | 2003-186832 | 7/2003 |
| JP | 2003-196563 | 7/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/573,647, filed Mar. 28, 2006, Kikkoji et al.

\* cited by examiner

INFORMATION REGISTRATION SCREEN 370

(A)

| MEMBERSHIP REGISTRATION | |
|---|---|
| EMAIL ADDRESS | |
| PASSWORD | |
| NAME | |
| PREFECTURE | |
| CITY | |
| STREET NUMBER, OTHER | |
| TELEPHONE NUMBER | |

INFORMATION INPUT COLUMN 380

(B)

INFORMATION QUOTATION AND SELECTION SCREEN 390

QUOTE INFORMATION?

[ YES ]  [ NO ]

INFORMATION QUOTATION AND SELECTION BUTTON 360

INFORMATION REGISTRATION SCREEN 370

(C)

| MEMBERSHIP REGISTRATION | |
|---|---|
| EMAIL ADDRESS | abcd.@son.ne.jp |
| PASSWORD | |
| NAME | SUZUKI TARO |
| PREFECTURE | TOKYO |
| CITY | SHINAGAWA |
| STREET NUMBER, OTHER | KITASHINAGAWA 1-2-34 |
| TELEPHONE NUMBER | 03-3907-6543 |

AUTOMATIC INPUT/QUOTATION INFORMATION 400

FIG. 4

COMMUNICATION SYSTEM AND COMMUNICATION METHOD

TECHNICAL FIELD

The present invention relates to a communication system, a communication apparatus, a communication method for the communication apparatus, and a communication program for the communication apparatus, and in particular to a communication system, a communication apparatus, a communication method for the communication apparatus, and a communication program for the communication apparatus that transmit and receive customer information.

BACKGROUND ART

Conventionally, in order to use a service provided by a service enterpriser (WWW server) on the Internet, for example, an EC (Electronic Commerce) shop, a user needs to register information, for example, user information using a terminal. If the user intends to receive services of plural service enterprisers, the user registers individual information, which is the same information, with respect to each of the service enterprisers. The user needs to perform input of the same information by the number equivalent to the number of service enterprisers in order to register the same information in the respective service enterprisers.

Therefore, the user needs to perform input work for the same information every time, and an amount of information may be large depending on a case. Thus, convenience for the user is not satisfactory.

In order to improve convenience for a user at the time of information registration, a method is conceivable with which a system of an Internet provider automatically transmits individual information of the user registered in the Internet provider to a service enterpriser and causes the user to perform only registration work for other necessary information. However, with this method provides, the Internet provider provides the service enterpriser with information on the user regardless of an intension of the user, and there is a problem from the viewpoint of the Individual Information Protection Law or the like.

In addition, a single sign-on system, with which a user is capable of accessing plural service enterprisers with login of one time, has been proposed. When there are an authentication agency enterpriser that provides such a single sign-on authentication base, service enterprisers that have contracts with the authentication agency enterpriser and copes with the single sign-on authentication base, and a user who has a contract with the authentication agency enterpriser, the user can receive a service by performing authentication work with the authentication agency enterpriser only once without performing authentication work with the respective service enterprisers. However, in the case in which the service enterprisers themselves manage individual information and the like of the user separately, the user needs to perform information registration work with the respective service enterprisers. Thus, even if the single sign-on authentication base is used, convenience for the user is not always satisfactory.

DISCLOSURE OF THE INVENTION

The invention has been devised in view of such a point, and it is an object of the invention to provide a communication system, a communication apparatus, and a communication method for the communication apparatus, and a communication program for the communication apparatus that can transmit and receive customer information among communication apparatuses and facilitate input of customer information of a user.

In the invention, in order to solve the problem, there is provided a communication system that transmits and receives customer information including: a first communication apparatus that stores first customer information registered by a user in order to receive a first service; a second communication apparatus that stores second customer information registered by the user in order to receive a second service; and a third communication apparatus that is connected to at least the first communication apparatus, characterized in that the third communication apparatus has: transmitting means that transmits request information requesting to receive the first service to the first communication apparatus together with identification information of the user; receiving means that receives customer information necessary for user registration of the first service from the first communication apparatus according to the request information; and display means that, when the customer information necessary for the user registration is already included in the second customer information, displays the customer information in the second customer information on an input screen on which the user registration is performed.

According to such a communication system, when the user makes user registration in the first communication apparatus in an attempt to receive the first service from the third communication apparatus, if customer information necessary for receiving the first service is already included in the second customer information registered in the second communication apparatus, the customer information in the second customer information is displayed on the input screen on which the user registration is performed.

In the communication system of the invention, when a user makes user registration in the first communication apparatus in an attempt receive the first service from the third communication apparatus, the customer information in the second customer information registered in the second communication apparatus is displayed on an input screen on which user registration is performed of the third communication apparatus. Consequently, input of customer information of the user can be facilitated.

In short, a first effect of the invention is that, in the case in which a user registers the same information with the respective service enterprisers, the user does not have to input the same information many times, and convenience for the user is improved significantly. In the conventional system, the same information has to be inputted to the respective service enterprisers every time, and convenience for a user is not satisfactory.

In addition, a second effect is that an information input support method according to the invention can also be applied between completely different enterprisers, and convenience for a user can be improved. For example, in the case in which a user, an information management enterpriser, and service enterprisers adopt the single sign-on authentication system in order to improve convenience for the user, since the information management enterpriser and the service enterprisers authenticate each other, the information management enterpriser and the service enterprisers can automatically exchange information on the user each other as the system. However, the information management enterpriser and the service enterprisers cannot exchange the information each other as a business service because there is the Individual Information Protection Law. In the invention, the user judges once whether information is to be registered with the respective service enterprisers, and the work is performed under an intension of the user to the end. Thus, there is no problem legally.

Moreover, a third effect is that a user is urged to register information on the user with the respective service enterprisers. Usually, in the case in which an amount of information to be registered with the service enterprisers is too much, the user is surprised by the large amount of information to be registered and cannot stand the fact that information registration work takes time. Then, the user may give up the registration work for the information halfway or may not perform the registration work at all and give up connection to the service enterprisers. However, by applying the invention, the user only has to input only uniform information for each of the service enterprisers, and a mental barrier, which the user has in performing information registration with the respective service enterprisers, can be lowered. Consequently, more users than in the past can contribute to information registration with the service enterprisers.

BRIEF DESCRIPTION OF THE DRAWINGS

FIG. 4 is a schematic diagram explaining transmission of a user interface screen in another embodiment of the invention;

BEST MODE FOR CARRYING OUT THE INVENTION

Embodiments of the invention will be hereinafter explained with reference to the drawings.

(1) First Embodiment

Figure 1:
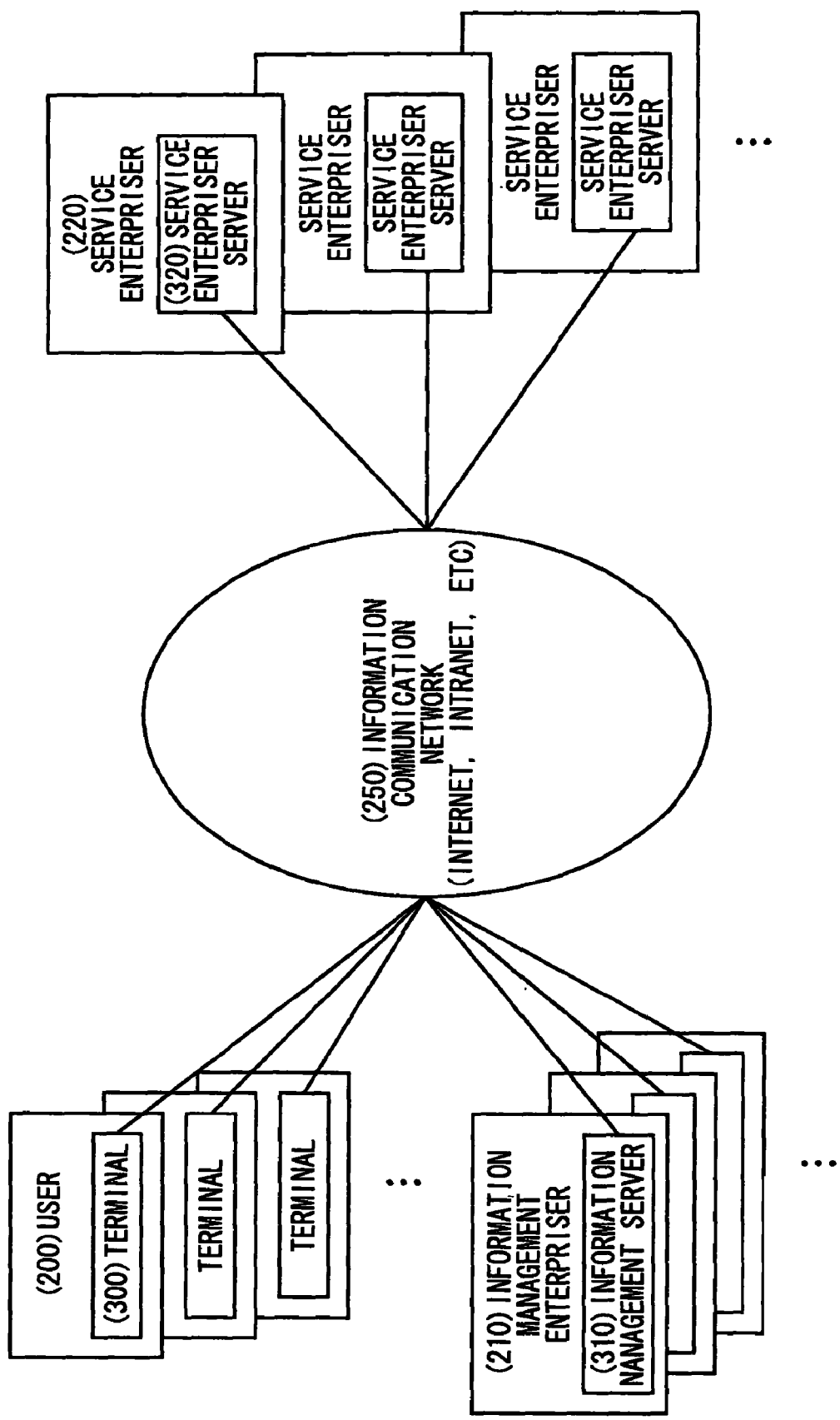
FIG. 1 is a block diagram showing a system structure of an embodiment of the invention.

As shown in FIG. 1, in an embodiment of the invention, a business model including three elements, namely, a user 200, an information management enterpriser 210, and a service enterpriser 220, is assumed, and a business model constitution consisting of the number of elements and a relation of roles described below is assumed.

1. Number of elements:

"User 200:Information management enterpriser 210:Service enterpriser 220=m:1:n"

2. Roles:

1) User 200

The user 200 has a role in which the user 200 can receive a service provided by the service enterpriser 220 through an information communication network 250. The user 200 is capable of receiving the service by entering into a contract with the service enterpriser 220.

2) Information Management Enterpriser 210

The information management enterpriser 210 is an enterpriser with which the user 200 needs to register user information first. There may not be a specific contract relation between the information management enterpriser 210 and the service enterpriser 220. As the information management enterpriser 210, an Internet provider or a communication carrier is assumed. The information management enterpriser 210 enters into a contract with various service enterprisers 220 and users 200 and provides an environment in which the service enterprisers 220 can provide the users 200 with services even if the service enterprisers 220 and the users 200 do not directly enter into a contract individually. This environment also includes provision of single sign-on authentication and the like. The information management enterpriser 210 also includes a portal site operation enterpriser and the like.

In the single sign-on authentication system, the information management enterpriser 210 has a function as an authentication server for authentication information of a user, the service enterpriser 220 inquires the information management enterpriser 210 about propriety of authentication information of a user (user ID information, password information, etc.) received from a terminal 300 or information corresponding the authentication information, and the service enterpriser 220 determines whether a service is to be provided according to a result of the inquiry. In that case, the service enterpriser 220 is authenticated by the information management enterpriser 210.

3) Service Enterpriser 220

The service enterpriser 220 is an enterpriser having a role of providing a service itself to the user 200. The service enterpriser 220 is capable of providing a service to the user 200 by entering into a contract with the user 200 individually. However, in the case in which the information management enterpriser 210 enters into a contract with a large number of users 200, and the information management enterpriser 210 is a communication carrier or a portal site operation enterpriser that also provides an SSO authentication service or the like, the service enterpriser 220 is also capable of providing the users 200 of services only through a contract with the information management enterpriser 210.

Next, a system structure for realizing this business model is assumed. Individual elements, the number of elements, and a role are as described below. Note that, explanations will be made using FIGS. 2, 3, 4, and 5 as required.

1. Number of Elements

"Terminal 300:Information management server 310:Service enterpriser server 320=m:1:n"

2. Role:

1) Terminal 300

The terminal 300 is a system, a program, or an apparatus connected to the information communication network 250 that is required by the user 200 to receive a service. In the invention, the terminal 300 has the following terminal function and the like.

Figure 2:
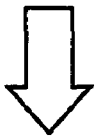
FIG. 2 is a schematic diagram explaining transmission of a user interface screen in the embodiment of the invention.

(a) The terminal 300 is a terminal that has a function of acquiring registration information from the information management server 310 with depression of an information quotation button 350 in FIG. 2 or depression of a "YES" button of an information quotation selection button 360 in FIG. 4 as a trigger, and a function of the information quotation button 350 and the information quotation selection button 360.

(b) The terminal 300 is a terminal that has a function of automatically reflecting the information acquired in (a) on an information input column 380 of an information registration screen 370. Note that it is possible to select the information to be automatically reflected by, for example, selecting or checking information in advance.

(c) The terminal 300 is a terminal that has a function of correcting an item automatically reflected in (b) and inputting information, which is not automatically reflected, to the information input column 380 and correcting the information.

(d) The terminal 300 in a terminal that has a function of registering information with a service enterpriser using an information input support function according to the invention.

2) Information Management Server 310

The information management server 310 is a system, a program, or an apparatus that is held by the information management enterpriser 210 and connected to the information communication network 250 that is required by the information management enterpriser 210 to manage registration information received from the terminal 300. In the invention, a server having the following information management server function and the like is an object.

(a) The information management server 310 is a server that has a function of registering information on the user 200 received from the terminal 300 and holding and managing the information.

(b) The information management server 310 is a server that has a function of receiving a quotation request for information on the user 200, which is registered in the information management server 310, from the terminal 300 and returning (transmitting) registration information on the user 200 to the terminal 300 in response to the request.

(c) The information management server 310 is a server that has an authentication function with respect to the user 200 and the terminal 300 that user the terminal 300 when the terminal 300 tries to make contact with the information management server 310. Note that a form of authentication does not matter.

3) Service Enterpriser Server 320

The service enterpriser server 320 is a system, a program, and an apparatus that is connected to the information communication network 250 that is required by the service enterpriser 220 to provide the user 200 with a service. However, in the invention, a server having the following service enterpriser server function and the like is an object.

(a) The service enterpriser server 320 is a server that has a function of generating information necessary for displaying the information registration screen 370, which has the information quotation button 350 explained in FIG. 2 or a button or the like equivalent to the information quotation button 350, on the terminal 300 and transmitting the information to the terminal 300.

(b) The service enterpriser server 320 is a server that has a function of generating information necessary for displaying an information quotation selection screen 390, which has the information quotation selection button 360 explained in FIG. 4 or a button or the like equivalent to the information quotation selection button 360, or the information registration screen 370 on the terminal 300 and transmitting the information to the terminal 300.

4) Information Communication Network 250

The information communication network 250 is a network realizable by the invention that is necessary for connecting the terminal 300, the information management server 310, and the service enterpriser server 320 each other, and is the Internet or an Intranet.

Operations of the embodiment of the invention described above will be explained with reference to FIG. 1. Thereafter, details of the operations will be explained using FIG. 2 and the subsequent figures. In addition, a communication path explained here may be encrypted partly or entirely from the viewpoint of security.

1. When the user 200 performs information registration with respect to the service enterpriser 220, the information registration screen 370 is displayed on the terminal 300 according to information transmitted from the service enterpriser 220. Then, the user 200 judges whether information registered in the information management enterpriser 210 is quoted and inputted for information registration in the service enterpriser 220.

2. In the case in which the user 200 judges that the information is quoted and inputted for the information registration in the service enterpriser 220, the user 200 presses the information quotation button 350 in FIG. 2. When the user 200 presses the information quotation button 350, since the terminal 300 accesses the information management server 310 to acquire necessary information, the user 200 waits until the information is quoted and automatically inputted on the information registration screen 370 on the terminal 300. Note that, here, the user 200 can also select information to be cited and inputted individually out of the registration information. In the case in which the user 200 does not press the information quotation button 350 or the like, the user 200 inputs information required to be registered to the service enterpriser 220 and transmits the information to the service enterpriser server 320 using the terminal 300.

3. When the information is quoted and automatically inputted on the information registration screen 370, the user 200 inputs only necessary information, which is not quoted and automatically inputted, and transmits the information to the service enterpriser server 320 using the terminal 300.

4. The service enterpriser server 320 having received the necessary information from the terminal 300 executes registration processing for the information and returns (transmits) a result of the registration processing to the terminal 300.

Figure 3:
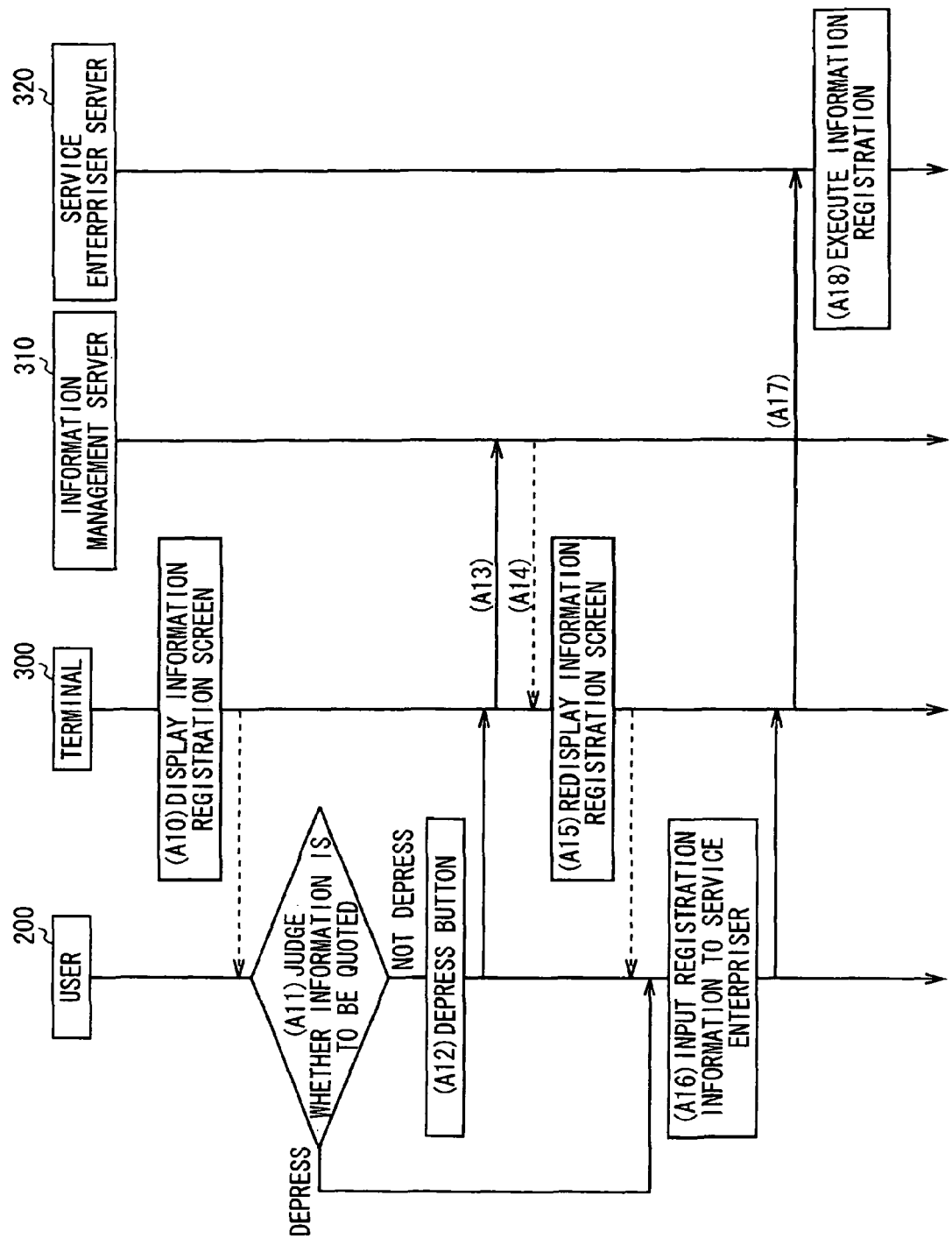
FIG. 3 is a flowchart explaining a flow of processing of the embodiment of the invention.

Operations of the embodiment of the invention will be explained with reference to FIGS. 2 and 3. Note that reference numerals such as (A10) written in FIG. 3 are attached in association with the respective operations. All of these individual operations are combined, whereby the embodiment of the invention is realized.

FIG. 2 shows an image of transition of a user interface screen in the embodiment, and FIG. 3 shows a flow of processing in the case in which user information registration for a certain service enterpriser is performed.

1. The terminal 300 displays the information registration screen 370 that is required in the case in which the user 200 performs information registration with respect to the service enterpriser 220 (step A10). The information registration screen 370 has columns in which an email address, a password, a name, an address, and a telephone number are inputted as information input columns 380. As shown in FIG. 2A, in an initial screen, no input item is displayed for the information input columns 380. In addition, the information quotation button 350 is displayed in a part of the screen.

2. The user 200 judges whether information registered in the information management enterpriser 210 is quoted and inputted for information registration with respect to the service enterpriser 220 (step A11).

3. When the user judges that the information is quoted and inputted for information registration in the service enterpriser 220, the user 200 presses the information quotation button 350 in FIG. 2 (step A12). When the user 200 does not press the information quotation button 350, steps (A12) to (A15) are skipped, and processing proceeds to step (A16). In this case, the user 200 performs an input operation so as to fill all or essential information input columns 380.

4. The terminal 300, which has received depression of the information quotation button 350 by the user 200, transmits an acquisition request for registration information on the user 200 to the information management server 310 in order to acquire information registered in the information registration server 310 (step A13).

5. The information management server 310, which has received the acquisition request for the registration information on the user 200 from the terminal 300, retrieves information on the user 200 stored and held by the information management server 310 itself and returns registration information on the user 200 to the terminal 300 (step A14). Note that the connection from the terminal 300 to the information management server 310 is made by inputting user authentication information. The information management server 310 performs authentication with respect to this connection, and the registration information on the user 200 is returned to the terminal 300 only when the authentication is established.

6. The terminal 300 automatically inputs and reflects the information returned from the information management server 310 on the information registration screen 370 and, if necessary, redisplays the information registration screen 370 (step A15). FIG. 2B shows the information registration screen 370 after the automatic input and reflection. Almost all the information input columns 380 are filled with automatically inputted and quoted information 130.

7. The user 200, who has confirmed the information quotation and automatic input to the information registration screen 370 by the system, inputs un-inputted information, which remains after the information quotation and automatic input, to the information input columns 380 and instructs the terminal 300 to execute registration (step A16). As shown in FIG. 2B, for example, automatically inputted and quoted information 400 is set in input columns other than the input column for a password. Therefore, the user 200 completes the information input work for membership or customer registration only by input of a password.

8. The terminal 300, which has received the instruction to execute registration, transmits information for registering the user 200 and an information registration request to the service enterpriser server 320 (step A17).

9. The service enterpriser server 320, which has received the request and the information for registering the user 200 from the terminal 300, executes registration processing for the information (step A18).

In the embodiment described above, a case in which a format of the registration information received from the information management server 310 in steps A17 and A18 and a registration information format requested by the service enterpriser server 320 are identical and a case in which the formats are different will be described.

In order to make these formats identical, first, a method in which the service enterpriser server 320 matches a format requested by the service enterpriser server 320 itself to a registration information format defined by the information management server 310 is conceivable. Conversely, it is also possible that the information management server 310 matches a format of the information management server 310 itself to registration information formats defined by the respective service enterpriser servers 320. In this case, in step A13, the terminal 300 is required to transmit identification information, which can identify the service enterpriser server 320 planned to be used in future, together with the acquisition request. Then, in step A14, the information management server 310 returns the registration information of a format, which corresponds to the service enterpriser server 320 planned to be used, to the terminal 300.

In the case in which these formats are different, the terminal 300 can use a method of displaying two screens, namely, a registration information screen received from the information management server 310 and a registration information screen requested from the service enterpriser server 320 and performing copy and paste on the terminal 300 based on judgment by the user.

Alternatively, a matching function for converting registration information received from the information management server 310 into registration information requested by the service enterpriser server 320 may be given to the terminal 300. In this case, the terminal 300 is required to grasp a registration information format, which is requested by the service enterpriser server 320 planned to be used, in advance. Alternatively, it is also possible to adopt a method of, after receiving a registration information format from the service enterpriser server 320 in response to a transmitted membership registration request, converting the registration information format according to the registration information format and transmitting the registration information format to the service enterpriser server 320 in step A17.

In both the cases, in step A17, the terminal 300 transmits a registration information format to the service enterpriser server 320 together with a membership registration request. Note that the registration information format means a data format in a communication protocol to the end, and a data storage method in each of the terminal 300, the information management server 310, and the service enterpriser server 320 is arbitrary.

Figure 5:
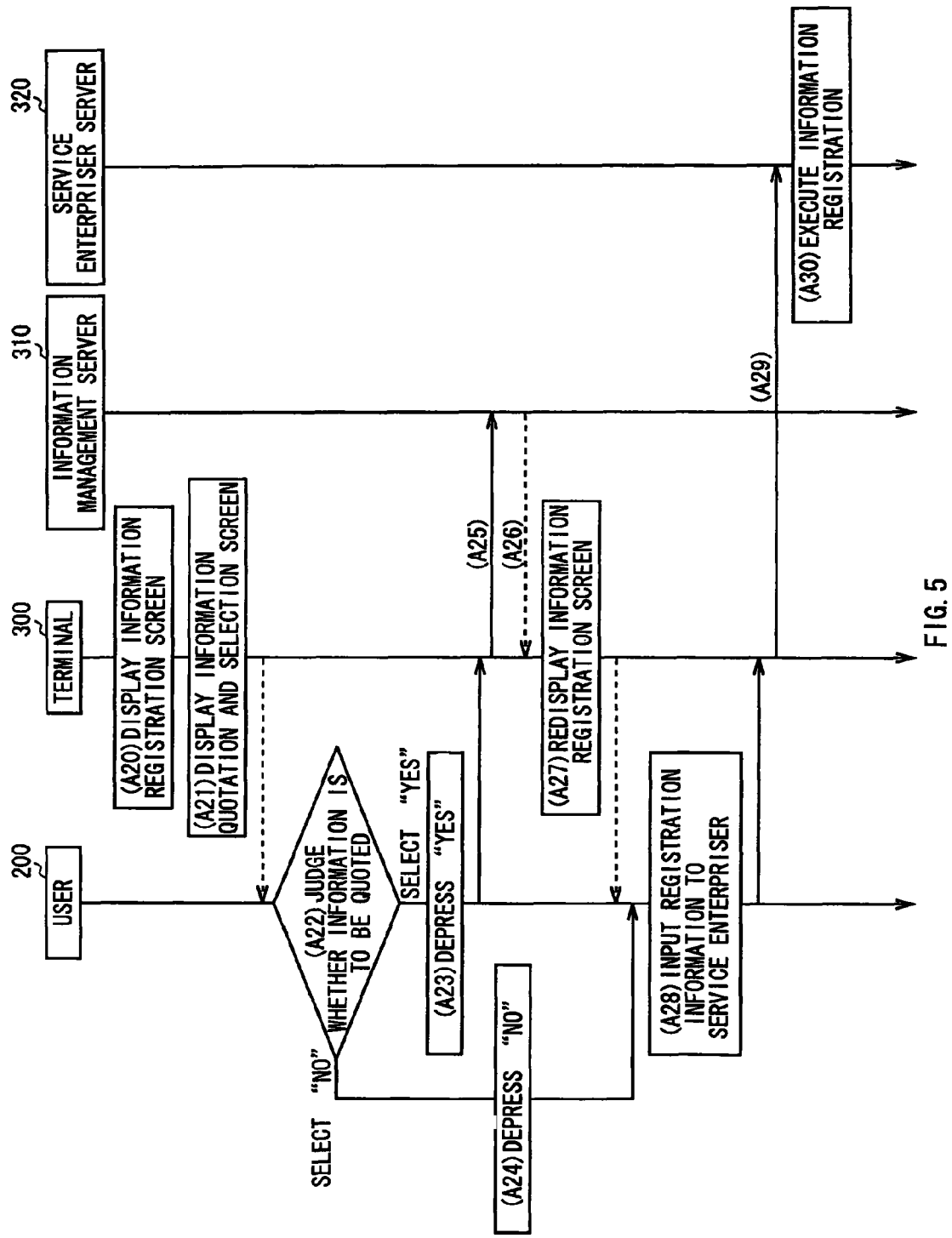
FIG. 5 is a flowchart explaining a flow of processing of another embodiment of the invention.

Next, another embodiment of the invention will be explained with reference to FIGS. 4 and 5. FIG. 4 shows an image of transition of a user interface screen in another embodiment. FIG. 5 shows a flow of processing in the case in which user information registration for a certain service enterpriser 220 is performed.

1. The terminal 300 displays the information registration screen 370 that is required in the case in which the user 200 performs information registration with respect to the service enterpriser 220 (step A20). The information registration screen 370 has columns in which an email address, a password, a name, an address, and a telephone number are inputted as the information input columns 380. As shown in FIG. 4A, in an initial screen, no input item is displayed for the information input columns 380.

2. The terminal 300 also displays the information quotation selection screen 390 before the user 200 starts input to this information registration screen 370 and immediately after the information registration screen 370 is displayed (see FIG. 4B) and urges the user 200 to judge whether information registered in the information management enterpriser 210 is to be quoted (step A21).

3. The user 200 performs judgment on whether the information registered in the information management enterpriser 210 is to be quoted and inputted in order to register the information in the service enterpriser 220 (step A22).

4. If it is judged in step A22 that the information is to be quoted and inputted for information registration in the service enterpriser 220, the user 200 presses "YES" in the information quotation selection button 360 in the information quotation selection screen 390 shown in FIG. 4B (step A23). When the user 200 does not press "YES" in the information quotation selection button 360, the user 200 presses "NO" (step A24), steps A25 to A27 are skipped, and processing proceeds to step A28.

5. The terminal 300, which has received depression of "YES" in the information quotation selection button 360 by the user 200, transmits an acquisition request for registration information on the user 200 to the information management server 310 in order to acquire information registered in the information management server 310 (step A25).

6. The information management server 310, which has received the acquisition request for registration information on the user 200 from the terminal 300, retrieves information on the user 200 stored and held by the information management server 310 itself and returns the registration information on the user 200 to the terminal 300 (step A26). Note that connection from the terminal 300 to the information management server 310 is made by inputting user authentication information, the information management server 310 performs authentication for this connection, and the registration information on the user 200 is returned to the terminal 300 only when the authentication is established.

7. The terminal 300 automatically inputs and reflects the information returned from the information management server 310 on the information registration screen 370 and, if necessary, redisplays the information registration screen 370 (step A27). FIG. 4C shows the information registration screen 370 after the automatic input and reflection. Almost all the information input columns 380 are filled with automatically inputted and quoted information 400.

8. The user 200, who has confirmed the information quotation and automatic input to the information registration screen 370 by the system, inputs un-inputted information, which remains after the information quotation and automatic input, to the information input columns 380 and instructs the terminal 300 to execute registration (step A28). As shown in FIG. 4C, for example, automatically inputted and quoted information 400 is set in input columns other than the input column for a password. Therefore, the user 200 completes the information input work for membership or customer registration only by input of a password.

9. The terminal 300, which has received the instruction to execute registration, transmits information for registering the user 200 and an information registration request to the service enterpriser server 320 (step A29).

10. The service enterpriser server 320, which has received the request and the information for registering the user 200 from the terminal 300, executes registration processing for the information (step A30).

The invention is not limited to the embodiments and the like of the invention described above, and various modifications and applications are possible within a range not departing from the spirit of the invention. For example, with respect to registration information that the information management server 310 returned to the terminal 300, an effective period of relatively short time from a point when the registration information is returned until the registration information is transmitted to the service enterpriser server 320 may be set.

(2) Second Embodiment

Figure 6:
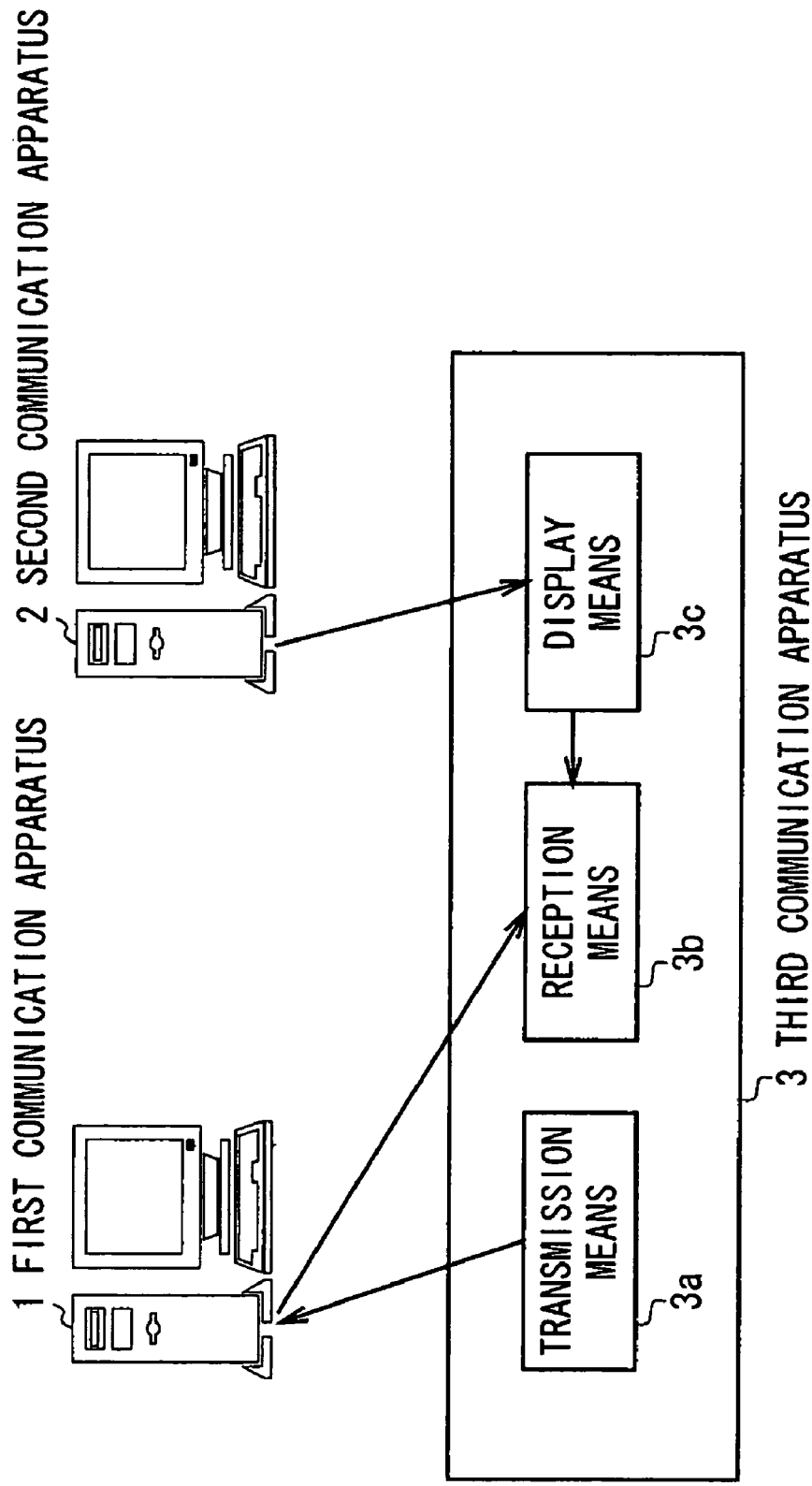
FIG. 6 is a principle diagram explaining a principle of the invention.

FIG. 6 is a principle diagram explaining a principle of the invention. As shown in FIG. 6, a third communication apparatus 3 has transmitting means 3*a*, receiving means 3*b*, and displaying means 3*c*. The third communication apparatus 3 can communicate with a first communication apparatus 1 and a second communication apparatus 2.

The first communication apparatus 1 provides a user, who uses the third communication apparatus 3, with a first service. The first communication apparatus 1 stores first customer information that is registered by the user in order to receive the first service.

The second communication apparatus 2 provides the user, who uses the third communication apparatus 3, with a second service. The second communication apparatus 2 stores first customer information that is registered by the user in order to receive the second service.

The third communication apparatus 3 is connected to the first communication apparatus 1 and the second communication apparatus 2. The transmitting means 3*a* of the third communication apparatus 3 transmits request information for requesting to receive the first service to the first communication apparatus 1 together with identification information of the user. The receiving means 3*b* receives customer information necessary for user registration of the first service from the first communication apparatus 1 because the request information is transmitted. When the customer information necessary for user registration for the first service is already included in the second customer information of the second communication apparatus 2 because, for example, the user has performed user registration for the second service, the displaying means 3*c* displays the customer information in the second customer information on an input screen on which user registration is performed.

Operations in the principle diagram will be hereinafter explained. It is assumed that the user, who uses the third communication apparatus 3, has already made user registration in the second communication apparatus 2.

To receive the first service, the user sends request information requesting to receive the first service to the first communication apparatus 1 together with the identification information of the user.

The first communication apparatus 1 transmits the customer information necessary for registration of the first service to the first communication apparatus 1 according to the request information of the third communication apparatus 3.

The receiving means 3b of the third communication apparatus 3 receives the customer information necessary for registration of the first service from the first communication apparatus 1.

When the customer information necessary for user registration for the first service is already included in the second customer information, the displaying means 3c of the third communication apparatus 3 displays customer information of the second customer information on the input screen on which user registration is performed.

In this way, since the customer information included in the second customer information among the customer information necessary for registration of the first service is displayed on the input screen on which user registration is performed, the user only has to input remaining customer information, and input of the customer information can be facilitated.

Next, an embodiment of the invention will be explained in detail with reference to the drawings. Processing for saving information on a tune or a set of tunes in a secondary storage will be hereinafter referred to as clip. In addition, information saved by the clip will be referred to as clip information.

Figure 7:
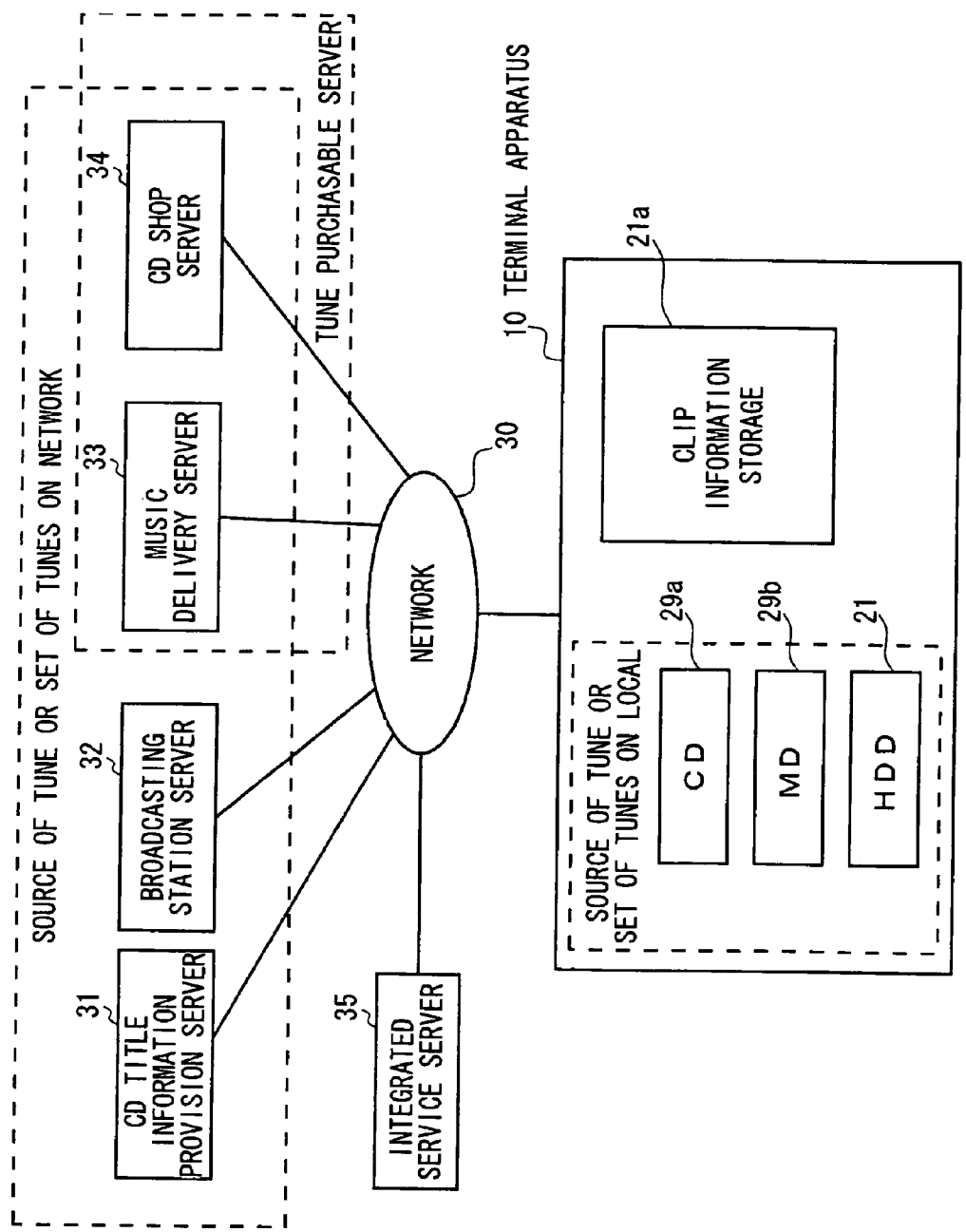
FIG. 7 is a diagram showing a network system according to the embodiment of the invention.

FIG. 7 is a diagram showing a network system according to an embodiment of the invention. A terminal apparatus 10 and an integrated service server 35 are connected to various servers via a network 30. The network 30 is, for example, the Internet. As the servers, there are a CD title information provision server 31, a broadcasting station server 32, a music delivery server 33, a CD shop server 34, and the like.

The CD title information provision server 31 performs a delivery service for tune information of a-commercially available CD. The broadcasting station server 32 is a server managed by a broadcasting station of FM broadcast, television (TV) broadcast, and the like. The broadcasting station server 32 performs a service for providing information on programs to be broadcast, now-on-air, and on-air list that is information related to tunes already broadcast. The music delivery server 33 is a server that performs a service for delivering digital data of a tune. The CD shop server 34 is a server that performs acceptance of orders and the like for mail-order sales of CDs and also performs a delivery service for voice data and the like for trial listening.

These respective servers perform services for providing information on a tune or a set of tunes on the network 30. In other words, the respective servers function as sources of a tune or a set of tunes on the network 30.

Note that the servers shown in FIG. 7 are examples of apparatuses that provide sources of a tune or a set of tunes via the network 30. In other words, any apparatus can function as a source of a tune or a set of tunes on the network 30 as long as the apparatus accesses a source of a tune or a set of tunes on the network 30 from other apparatuses.

In addition, the music delivery server 33 and the CD shop server 34 are tune purchasable servers can be purchased and are provided with a function for selling voice data of a tune or voice data of a set of tunes on line. If a user operates the terminal apparatus 10 to access the tune purchasable servers, the user can actually purchase a tune or a set of tune via the network 30. The user of the terminal apparatus 10 can download voice data from the music delivery server 33 by performing a purchase procedure with respect to the music delivery server 33. In addition, the user of the terminal apparatus 10 is capable of having a CD delivered to the user's home by performing a purchase procedure with respect to the CD shop server 34.

The terminal apparatus 10 holds sources of a tune or a set of tunes on a local in recording media such as a CD 29a, an MD (Mini Disc; trademark) 29b, and a hard disk driver (HDD) 21. These sources vary depending on a kind and a purpose of the terminal apparatus 10.

Note that the sources of a tune or a set of tunes on a local shown in FIG. 7 is an example. In other words, the terminal apparatus 10 can cause any recording medium present in a local of the terminal apparatus 10 to function as a source of a tune or a set of tunes on a local by recording a tune or a set of tunes in such a recording medium.

In addition, the terminal apparatus 10 is provided with a clip information storing device 21a that stores clipped clip information. The clip information storing device 21a is a secondary storage of the terminal apparatus 10. For example, the terminal apparatus 10 can cause a part of a storage area of the HDD 21 or the like to function as the clip information storing device 21a.

Incidentally., the terminal apparatus 10 in this embodiment is also provided with a function as an audio apparatus that has a reproducing function for a tune.

Figure 8:
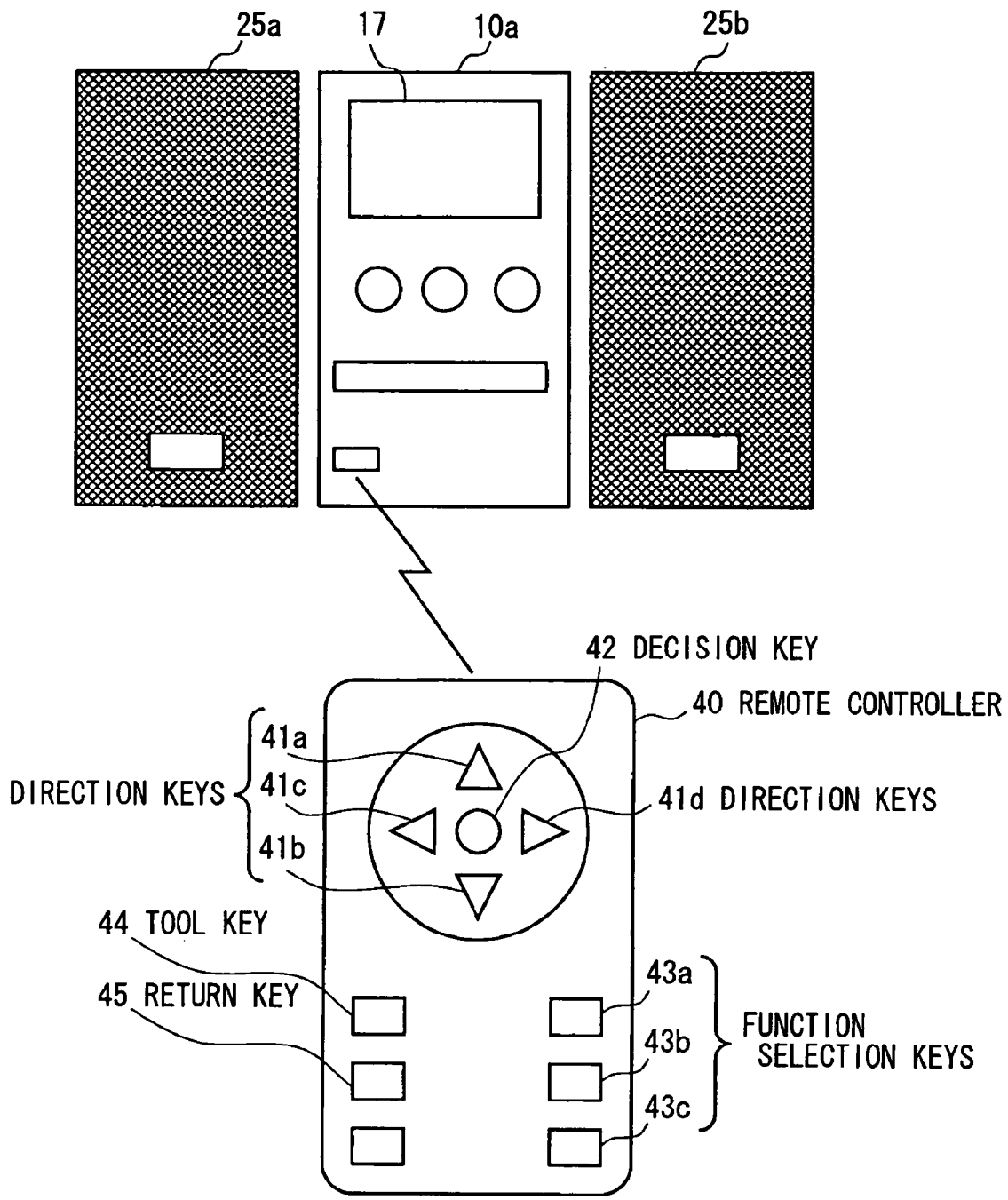
FIG. 8 is a diagram showing an appearance of a terminal apparatus.

FIG. 8 is a diagram showing an appearance of a terminal apparatus. As shown in FIG. 8, the terminal apparatus 10 according to this embodiment has the same appearance as a general system component. The terminal apparatus 10 includes an apparatus body 10a, speakers 25a and 25b, and a remote controller 40. The apparatus body 10a is provided with a reproducing function for a CD, a recording and reproducing function for an MD, and a receiving function for FM broadcast and TV broadcast. A voice signal generated by the apparatus body 10a is sent to the speakers 25a and 25b, whereby sound is outputted from the speakers 25a and 25b.

In addition, a display device 17 is provided in the apparatus body 10a. Tune information on a tune being reproduced, clip information saved by the clip, and the like are displayed on the display device 17.

The remote controller 40 is an input device for remotely operating the apparatus body 10a. Plural operation keys are provided in the remote controller 40. When an operation key is pressed by a user, the remote controller 40 transmits a signal corresponding to the pressed operation key to the apparatus body 10a with radio communication means such as an infrared ray.

As the operation keys, there are direction keys 41a to 41d, a decision key 42, function selecting keys 43a to 43c, a tool key 44, a return key 45, and the like.

The direction keys 41a to 41d are used for, for example, moving a place where a cursor or a focus displayed on the display device 17 is placed. The four direction keys 41a to 41d correspond to directions of up, down, left, and right, respectively, and the cursor or the like moves in a direction corresponding to a pressed direction key.

The decision key 42 is used for, for example, deciding contents displayed on the display device 17.

The function selecting keys 43a to 43c are used for selection of a function. For example, the three function selection keys 43a to 43c are respectively associated with an adding function, a tuner function, and a local content managing function. When a function selecting key is pressed, the apparatus body 10a changes to an operation mode of a function corresponding to the pressed function selecting key.

The tool key 44 is a button for displaying a tool menu on the display device 17. A command corresponding to contents displayed on the display device 17 is displayed in the tool menu. A user operates the direction keys 41a to 41d to select an arbitrary command and further presses the decision key 42, whereby processing corresponding to the selected command is executed in the apparatus body 10a.

The return key 45 is a button for returning contents displayed on the display device 17 to an immediately preceding state.

Note that various operation keys can be provided in the remote controller 40 other than those shown in FIG. 8. For example, as such operation keys, there are a volume adjustment key, a reproduction key for a CD, a stop key, and the like.

Next, an internal structure of the terminal apparatus 10 will be explained.

Figure 9:
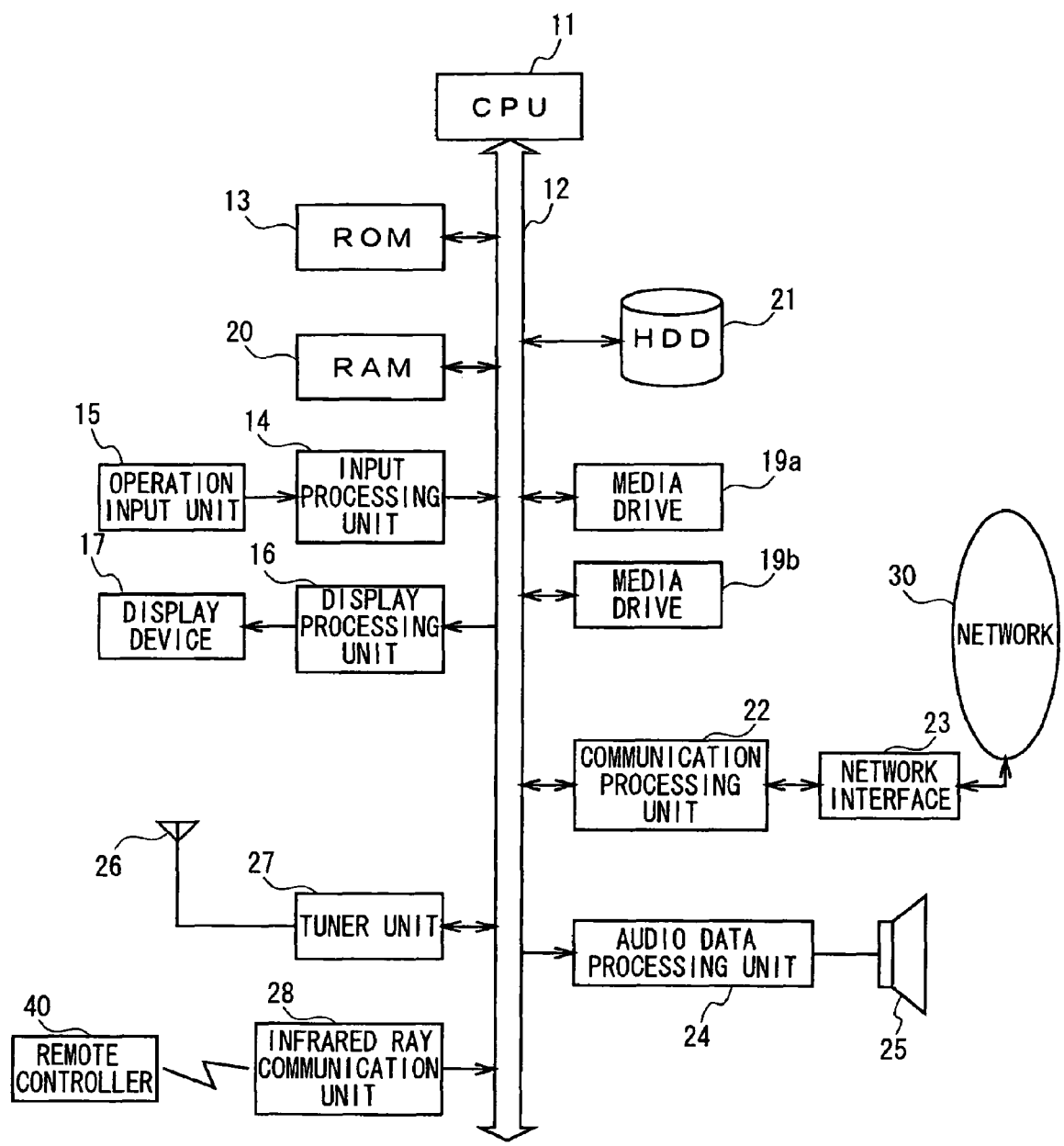
FIG. 9 is a hardware block diagram of the terminal apparatus.

FIG. 9 is a hardware block diagram of a terminal apparatus. The terminal apparatus 10 shown in FIG. 9 make it possible to manage, record, and reproduce various sources such as a tune.

A CPU (Central Processing Unit) 11 performs control and arithmetic processing of the entire terminal apparatus 10 on the basis of a started program. For example, the CPU 11 performs a communication operation via the network 30, an input/output operation with respect to a user, content reproduction and clip from a medium, content storage in a HDD 21 and management therefor, information retrieval via the network 30 based on clip information, and the like. Note that, as recordable and reproducible content data that the terminal apparatus 10 of this embodiment cope with, there are content data of audio and content data of moving images. The CPU 11 exchanges a control signal and data with respective circuit sections via a bus 12.

In a ROM (Read Only Memory) 13, an operation program that the CPU 11 should execute, a program loader, various operation coefficients, parameters used in a program, and the like are stored. In addition, a program that the CPU 11 should execute is expanded in a RAM (Random Access Memory) 20. In addition, the RAM 20 is also used as a data area and a task area that are required when the CPU 11 executes various kinds of processing.

An operation input unit 15 has various operators and the like such as operation keys, a jog dial, and a touch panel provided in a housing of the terminal apparatus 10. Note that a keyboard or a mouse for GUI (Graphical User Interface) operation may be provided in the terminal apparatus 10 as the operation input unit 15. Information inputted by the operation input unit 15 is subjected to predetermined processing in an input processing unit 14 and transmitted to the CPU 11 as an operation command. The CPU 11 performs required arithmetic operations and control such that an operation as an apparatus corresponding to the inputted operation command is obtained.

A display device for example such as a liquid crystal display is connected to a display control unit 16 as the display device 17. Various kinds of information are displayed on the display device 17. When the CPU 11 supplies display information to the display processing unit 16 according to various operation states, an input state, and a communication state, the display processing unit 16 causes the display device 17 to execute a display operation on the basis of supplied display data. For example, contents of tune information delivered from a server or the like and contents of clip information are displayed on the display device 17. In addition, in the case in which retrieval for a tune via the network 30 is performed, a result of the retrieval is displayed on the display device 17.

Media drives 19a and 19b are drives that can record and reproduce (or only reproduce depending on a recording medium) contents of a tune or the like recording in a portable recording medium. Note that a type of a recording medium that each of the media drives 19a and 19b are capable of recording or reproducing is not limited to one. In other words, the media drives 19a and 19b are also capable of performing recording and reproduction with respect to plural types of recording media. For example, the media drive 19a performs reproduction of a CD and DVD, and the media drive 19b performs recording and reproduction of an MD.

Note that the portable recording medium recording contents of a tune or the like should not be limited to an optical recording medium such as a CD or a DVD. For example, as such a recording medium, a recording medium constituted by a semiconductor memory such as a flash memory having stored therein contents can be used. In that case, a reader writer of the flash memory is connected to the bus 12.

A user can appreciate a tune by inserting a recording medium (a CD, a DVD, an MD, etc.) having recorded therein arbitrary contents into the media drives 19a and 19b and applying a predetermined operation to the remote controller 40. For example, when the user operates the remote controller 40 and instructs reproduction by the media driver 19a, the CPU 11 instructs the media drive 19a to reproduce contents. In response to the instruction, the media drive 19a accesses designated contents from the inserted recording medium to read out and executes the contents.

In the case in which the contents read out in this way is audio contents, after decode processing or the like is applied to the contents by processing of the CPU 11 as required, the contents is transferred to an audio data processing unit 24. The audio data processing unit 24 applies processing sound field processing such as equalizing or processing such as volume adjustment, D/A conversion, or amplification to the audio data and outputs the audio data from a speaker unit 25. Note that the speaker unit 25 includes plural speakers 25a and 25b as shown in FIG. 8 and can output voices in stereo.

In addition, contents reproduced by the media drives 19a and 19b can also be accumulated in the HDD 21 as audio data file by control of the CPU 11. Note that, as a format of this audio data file, the audio data may be digital audio data of 16 bit quantization at a sampling frequency 44.1 KHz in a CD format. Such contents may be compressed audio data of a format, to which compression processing is applied in accordance with a predetermined system, in order to save a capacity of the HDD 21. In addition, although a compression system is not limited at all, an ATRAC (Advanced TRansform Acoustic Coding; trademark) system, an MP3 (MPEG Audio Layer-3) system, an AAC (Advanced Audio Coding) system, a WMA (Windows Media Audio) system, a RealAUDIO G2 Music Codec system, and the like can be adopted.

A tuner unit 27 is, for example, an AM/FM radio tuner and demodulates a broadcast signal received by an antenna 26 on the basis of control of the CPU 11. It is needless to mention that the tuner unit 27 may be a tuner as a television tuner, a satellite broadcast tuner, a digital broadcast tuner, or the like. A demodulated broadcast voice signal is subjected to required processing in the audio data processing unit 24 and outputted from the speaker unit 25 as a broadcast voice.

A communication processing unit 22 performs encode processing for transmit data and decode processing for receive data on the basis of control of the CPU 11. A network interface 23 transmits the transmit data encoded in the communication processing unit 22 to a predetermined external network applicable apparatus via the network 30. In addition, the network interface 23 delivers a signal, which is transmitted from the external network applicable apparatus via the network 30, to the communication processing unit 22. The communication processing unit 22 transfers the received information to the CPU 11. As information to be received via the network 30, for example, there are tune information of a program being broadcast in FM or the like and information of a tune included in a title of a CD or the like.

An infrared ray communication unit 28 performs communication with the remote controller 40 using radio communication means such as an infrared ray. The infrared ray communication unit 28 applies predetermined processing to a signal sent from the remote controller 40 and transfers the signal to the CPU 11 as an operation command. The CPU 11 performs required arithmetic operation and control such that an operation as an apparatus responding to an inputted operation command is obtained.

Note that the structure of the terminal apparatus 10 is not limited to this structure in FIG. 9 and more various structures are possible. For example, an interface with peripheral devices according to a communication system such as a USB (Universal Serial Bus), IEEE1394, or Bluetooth may be provided in the terminal apparatus 10. The terminal apparatus 10 can also store audio contents downloaded via the network 30 by the network interface 23 or audio contents transferred through the interface such as the USB or the IEEE1394 in the HDD 21. In addition, a terminal used for connection of a microphone or an external headphone, a video output terminal applicable at the time of DVD reproduction, a line connection terminal, an optical digital connection terminal, and the like may be provided in the terminal apparatus 10. In addition, a PCMCIA slot, a memory card slot, and the like may be formed in the terminal apparatus 10 to make it possible to exchange data with an external information processing apparatus and an audio apparatus.

Figure 10:
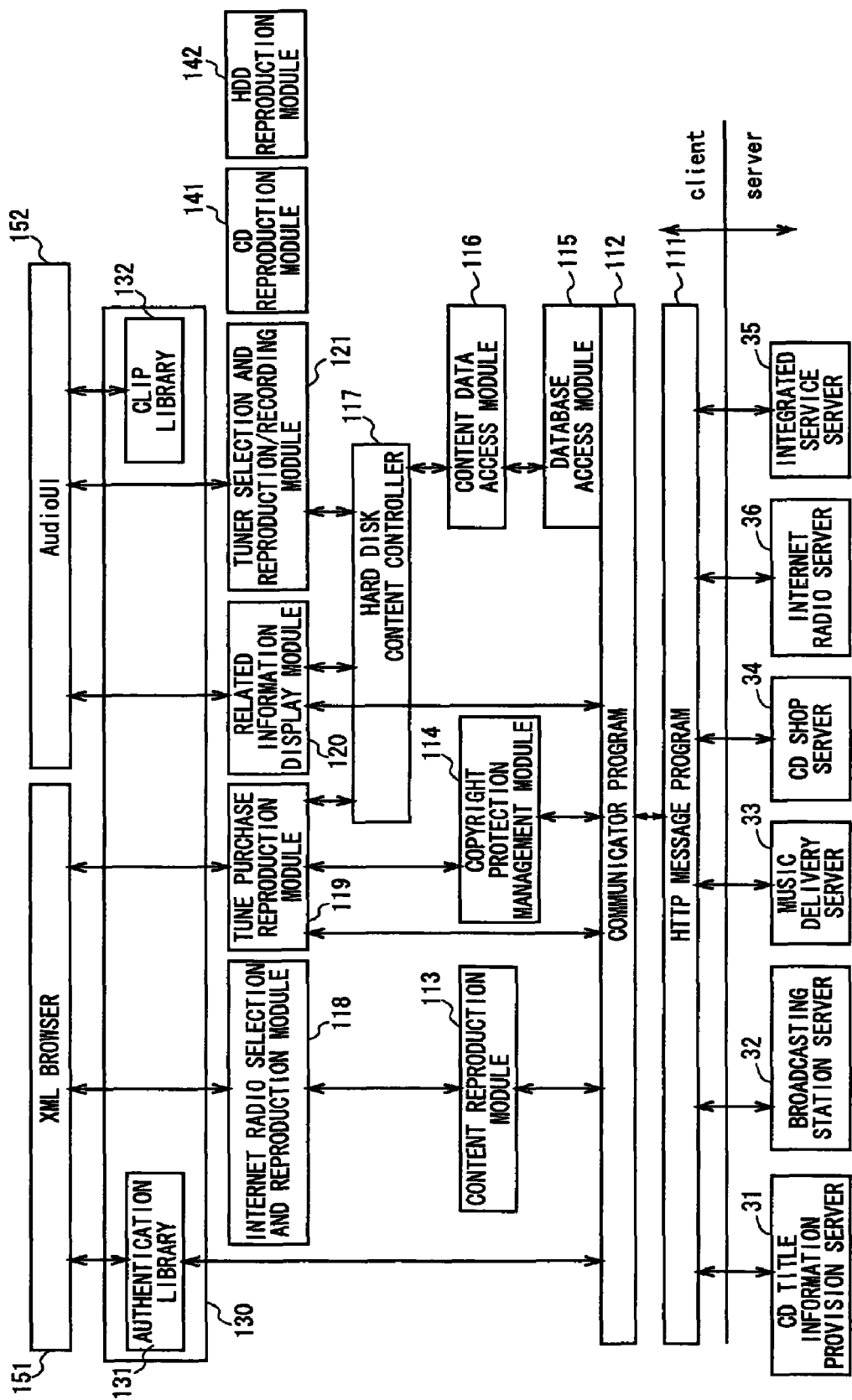
FIG. 10 is a diagram showing a program module structure of the terminal apparatus.

FIG. 10 is a diagram showing a program module structure of a terminal apparatus. As shown in FIG. 10, a program module of the terminal apparatus 10 is constituted so as to operate on an OS. The terminal apparatus 10 can utilize functions of program modules to communicate with the CD title information provision server 31, the broadcasting station server 32, the music delivery server 33, the CD shop server 34 that sells CDs, the integrated service server 35 that performs various kinds of integrated services, an Internet radio server 36, and other various servers.

An HTTP (Hyper Text Transfer Protocol) message program 111 performs exchanges with various servers such as the CD title information provision server 31, the broadcasting station server 32, the CD shop server 34, and the integrated service server 35 in HTTP communication. A communicator program 112 is a communication module that performs various kinds of communication with the integrated service server 35 and the like.

In an upper level (function close to a user interface) of the communicator program 112, a content reproduction module 113 that interprets and reproduces codec of contents and a copyright protection management module 114 that handles information on copyright protection are located. In an upper level of the content reproduction module 113, an Internet radio selection and reproduction module 118 that performs selection and reproduction of the Internet radio is provided. In an upper level of the copyright protection management module 114, a tune purchase and reproduction module 119 that controls purchase of a tune and reproduction of a trial listening tune is provided.

In an upper level of the Internet radio selection and reproduction module 118 and the tune purchase and reproduction module 119, an XML (extensible Markup Language) browser 151 is provided. The XML browser 151 interprets contents of an XML file sent from various servers and performs screen display on the display apparatus 17. In addition, contents of input performed by a user with respect to the terminal apparatus 10 when the terminal apparatus 10 is in an integrated service use mode are interpreted by the XML browser 151. Then, a processing request or the like corresponding to the contents of input is passed from the XML browser 151 to other modules. For example, a tune, which is selected by the user via the XML browser 151 is subjected to purchase processing in the tune purchase and reproduction module 119 and written in the HDD 21 via a hard disk content controller 117.

An authentication library 131 of a library 130 is connected to the communicator program 112. The authentication library 131 performs authentication processing for the integrated service server 35 and the other various servers.

Moreover, in upper levels of the communicator program 112, a database access module 115, a content data access module 116, and the hard disk content controller 117 are provided. The database access module 115 accesses various databases established in the HDD 21. The content data access module 116 accesses contents stored in the HDD 21. The hard disk content controller 117 manages the contents stored in the HDD 21.

In an upper level of the hard disk content controller 117, a related information display module 120, a tuner selection and reproduction/recording module 121, and the tune purchase and reproduction module 119 are provided. The related information display module 120 displays a title and an artist name of a tune broadcast by a radio station on the display device 17. The tuner selection and reproduction/recording module 121 selects a radio station and records contents of a tune received from the radio station in the HDD 21.

For example, a tune received from a selected radio station via an audio user interface (AudioUI) 152 is written in the HDD 21 via the content data access module 116.

The related information display module 120 receives a title and an artist name of a tune, which is currently broadcast by a radio station, as related information from the CD title information provision server 31, the broadcasting station server 32, and the like through the HTTP message program 111 using the tuner selection and reproduction/recording module 121 and displays this related information on the display device 17 via the audio user interface 152.

Note that the related information displayed on the display device 17 via the audio user interface 152 can be temporarily stored in a clip library 132 of the library 130. In addition, finally, the related information can also be stored in the HDD 21 via the database access module 115 in accordance with an instruction from a user.

Moreover, as program modules of the terminal apparatus 10, a CD reproduction module 141 for reproducing a CD and an HDD reproduction module 142 for reproducing the HDD 21 are included. The CD reproduction module 141 and the HDD reproduction module 142 output results of reproduction from the CD and the HDD via the audio data processing unit 24 and the speaker unit 25.

In the terminal apparatus 10 with such a structure, it is possible to acquire related information from the servers and clip the related information. Note that it is also possible to perform retrieval and purchase processing of a tune simultaneously with the clip.

Next, an internal structure of the integrated service server 35 will be explained.

Figure 11:
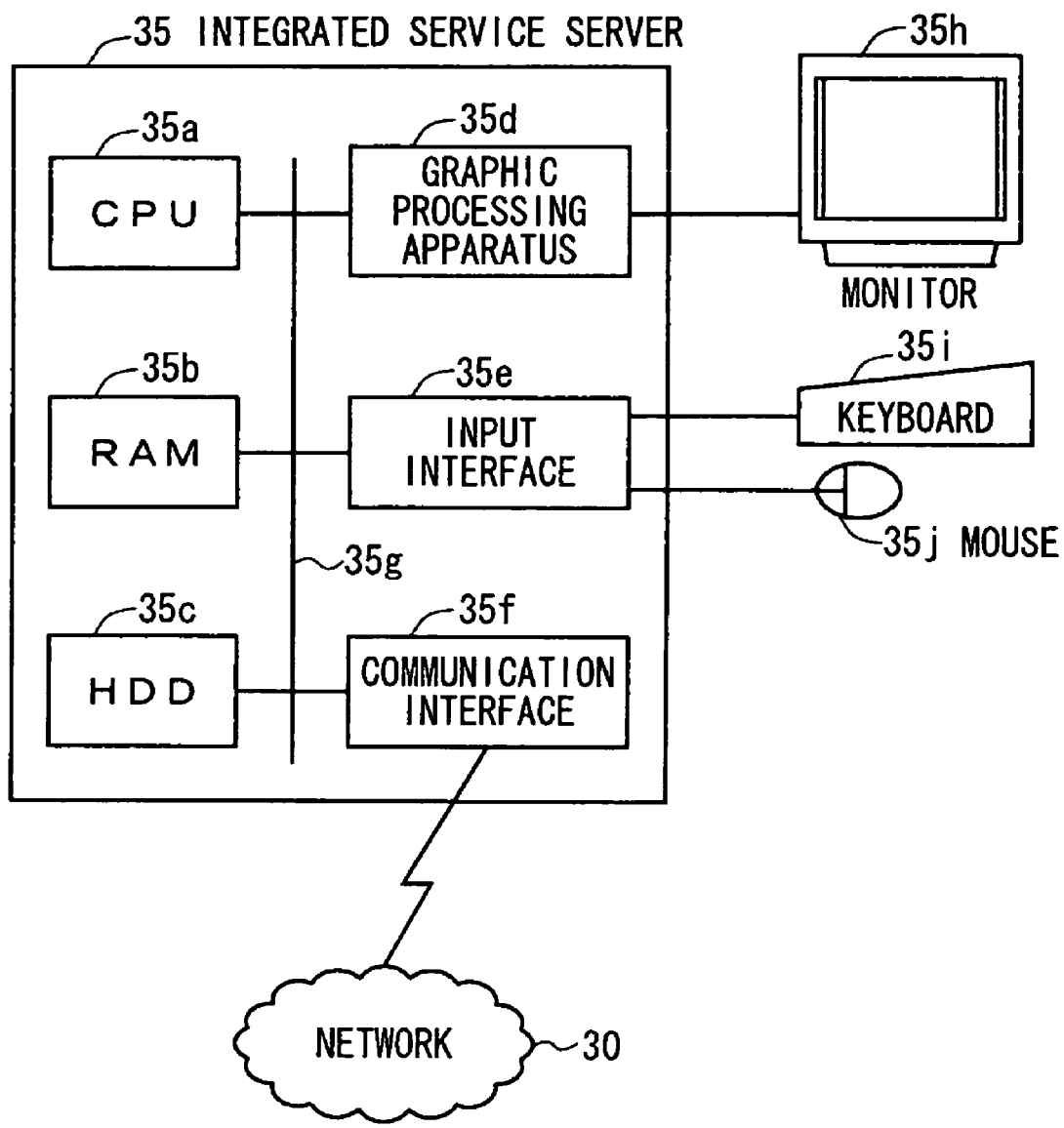
FIG. 11 is a hardware block diagram of an integrated service server.

FIG. 11 is a hardware block diagram of an integrated service server. The integrated service server 35 shown in FIG. 11 is entirely controlled by a CPU 35*a*. A RAM 35*b*, a hard disk drive 35*c*, a graphic processing device 35*d*, an input interface 35*e*, and a communication interface 35*f* are connected to the CPU 35*a* via a bus 35*g*.

At least a part of a program of an OS (Operating System), which is executed by the CPU 35*a*, or an application program, which provides the terminal apparatus 10 with various kinds of information, is temporarily stored in the RAM 35*b*. In addition, various data necessary for processing by the CPU 35*a* are saved in the RAM 35*b*. An OS, an application program, which provides information, and the like are stored in the HDD 35*c*.

A monitor 35*h* is connected to the graphic processing device 35*d*. The graphic processing device 35*d* causes a display screen of the monitor 35*h* to display an image in accordance with an instruction from the CPU 35*a*. A keyboard 35*i* and a mouse 35*j* are connected to the input interface 35*e*. The input interface 35*e* transmits a signal sent from the keyboard 35*i* or the mouse 35*j* to the CPU 35*a* via the bus 35*g*.

A communication interface 35*f* is connected to the network 30. The communication interface 35*f* performs communication with the terminal apparatus 10 and the various servers via the network 30.

Note that the CD title information provision server 31, the broadcasting station server 32, the music delivery server 33, and the CD shop server 34 can also be realized by the same hardware block as FIG. 11.

Next, exchange of customer information in the terminal apparatus 10 will be explained. A user has to perform user registration with respect to the respective servers in order to receive services of the respective servers. The user inputs customer information necessary for the user registration from the terminal apparatus 10 and sends the customer information to a server and acquires a user ID and a password. At this point, the user has to input a terminal ID to the terminal apparatus 10. The terminal ID is an identifier for identifying each terminal apparatus when the user owns plural terminal apparatuses and inputted by the user. The terminal ID is transmitted to the server by the CPU 11 and registered in the server and, at the same time, stored in the ROM 13 or the HDD 21. The server identifies the terminal apparatus used by the user according to the terminal ID and transmits and receives information. In the following explanation, it is assumed that the user has performed user registration for a service provided by the integrated service server 35 and registered customer information. Further, it is assumed that the user performs user registration for a service provided by the CD title information provision server 31 anew.

The CPU 11 receives a password and a user ID, which the user acquired when the user made user registration in the integrated service server 35, via the operation input unit 15 and the input processing unit 14. In addition, the CPU 11 acquires a terminal ID at the time when the user made user registration in the integrated service server 35 from the ROM 13 or the HDD 21.

The CPU 11 transmits the received password and user ID and the acquired terminal ID to the CD title information provision server 31, from which the user intends to receive a service anew, together with a request signal for requesting to receive a service.

The CPU 11 receives customer information necessary for user registration from the CD title information provision server 31 via the network interface 23 and the communication processing unit 22 because the CPU 11 transmitted the password, the user ID, the terminal ID, and the request signal. The customer information is, for example, a name, an age, and an address of the user.

In the case in which customer information of the user already registered in the integrated service server 35 overlaps the customer information necessary for user registration of the CD title information provision server 31, the CPU 11 receive the overlapping customer information from the integrated service server 35. The CPU 11 displays the customer information overlapping the customer information necessary for user registration on the display device 17 via the display processing unit 16. Consequently, the user has to input only the customer information necessary for user registration that is not displayed on the display device 17.

The CPU 11 transmits the customer information of the user received from the integrated service server 35 and the customer information inputted anew to the CD title information provision server 31 via the communication processing unit 22 and the network interface 23.

Consequently, the CPU 11 causes the input screen of the display device 17 to display customer information included in the customer information registered in the integrated service server 35 among the customer information necessary for registration for the service of the CD title information provision server 31. Thus, the CPU 11 has to input only the remaining customer information to the user and can facilitate input of customer information.

In addition, if customer information is registered once, input of the customer information after that is facilitated. Thus, the terminal apparatus 10 does not require a keyboard provided with operation keys for character input, and the remote controller 40 including necessary operation keys and operation keys provided in a housing are sufficient.

Note that, although the exchange of customer information between the integrated service server 35 and the CD title information provision server 31 has been explained, exchange of customer information can be performed in the same manner among other servers shown in FIG. 7.

In addition, a server providing each service may have screen data for inputting common customer information. Each server stores customer information of a user held by the server itself in a part of a screen of the server where customer information is inputted and transmits the customer information to the terminal apparatus 10. The terminal apparatus 10 receives image data sent from the server and displays the image data on the display device 17. Since customer information already registered in the server is displayed on the display device 17, the user has to input only customer information required anew.

In addition, the CPU 11 may store the customer information, which is inputted when the user performs user registration, in the ROM 13 or the HDD 21. When the user intends to receive a new service, the CPU 11 displays the customer information stored in the ROM 13 or the HDD 21 on the display device 17. Consequently, the user has to input only the customer information required to be inputted anew, and input of customer information can be facilitated.

In addition, in the above explanation, the customer information registered in the integrated service serve 35 is transmitted to the terminal apparatus 10, and the customer information is transmitted from the terminal apparatus 10 to the CD title information provision server 31. However, the customer information may be transmitted directly from the integrated service server 35 to the CD title information provision server 31 without the intervention of the terminal apparatus 10. This is effective, for example, in a case in which customer information required by the integrated service server 35 and customer information required by the CD title information provision server 31 are the same. However, the integrated service server 35 notifies the terminal apparatus 10 that transmission of customer information is to be performed and obtains confirmation of the user. This is for preventing the customer information from being exchanged when the user does not know that the customer information is exchanged. The CPU 11 displays a screen for receiving permission for transmission of the customer information on the display device 17 according to the notification from the integrated service server 35 and receives propriety of transmission from the user via the operation input unit 15 and the input processing unit 14.

In addition, the CPU 11 does not have to display all pieces of customer information on the display device 17, and the user may select and input customer information such as an address and a telephone number in order on an input screen.

Next, exchange of customer information in a server will be explained. It is assumed that the user has performed user registration for a service provided by the integrated service server 35. Further, it is assumed that the user performs user registration for a service provided by the CD title information provision server 31 anew. Note that customer information at the time when the user performed user registration is stored in the HDD 35c of the integrated service server 35.

When the CPU of the CD title information provision server 31 receives a request signal for requesting to receive a new service and a user ID, a password, and a terminal ID at the time when the user made user registration in the integrated service server 35 from the terminal apparatus 10, the CPU transmits customer information necessary for user registration to the terminal apparatus 10.

The CPU 35a of the integrated service server 35 transmits customer information common to the customer information required by the CD title information provision server 31, which is stored in the HDD 35c, to the terminal apparatus 10 via the communication interface 35f in response to a request from the terminal apparatus 10. Consequently, customer information included in the customer information of the integrated service server 35 among the customer information necessary for user registration of the CD title information provision server 31 is displayed on the display device 17 of the terminal apparatus 10. The user only has to input and send remaining customer information necessary for user registration of the CD title information provision server 31. The CD title information provision server 31 receives the customer information from the terminal apparatus 10 and stores the customer information in the HDD 35c.

Note that, although the exchange of customer information between the integrated service server 35 and the CD title information provision server 31 has been explained, exchange of customer information can be performed in the same manner among the other servers shown in FIG. 7.

In addition, the integrated service server 35 and the CD title information provision server 31 periodically update customer information stored in therein, respectively. For example, customer information is compared between the servers at every fixed period. Both the servers mutually transmit and receive a user ID, a password, a terminal ID of a user and perform authentication. Then, if there is customer information of an unregistered user in one server, the other server transmits registered customer information. In this case, the other server may notify the terminal apparatus 10 that update of customer information is to be performed and obtain confirmation of the user. This is for preventing customer information from being exchanged when the user does not know that the customer information is exchanged.

Figure 12:
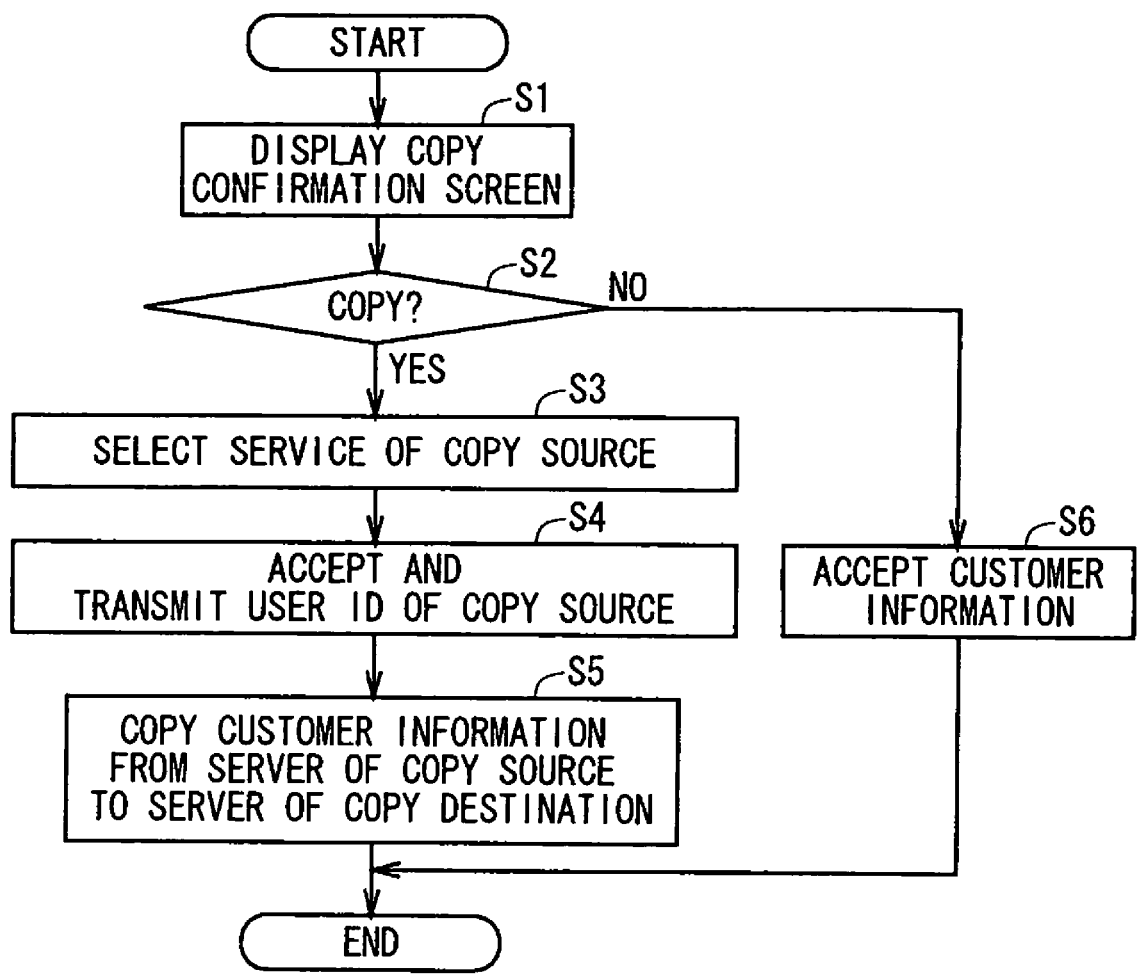
FIG. 12 is a flowchart showing a flow of processing for copying customer information from one server to the other server with a permission of a user.

Next, a case in which customer information is copied (transmitted) from one server to the other server with permission of the user will be explained using a flowchart. FIG. 12 is a flowchart showing a flow of processing for copying customer information from one server to the other server with permission of a user.

First, as preconditions, it is assumed that the user has made registration for a service A of the integrated service server 35, and the user intends to make registration for a service B of the music delivery server 33 anew. When the user starts registration, the CPU 11 displays a copy confirmation screen on the display device 17 (step S1).

Figure 13:
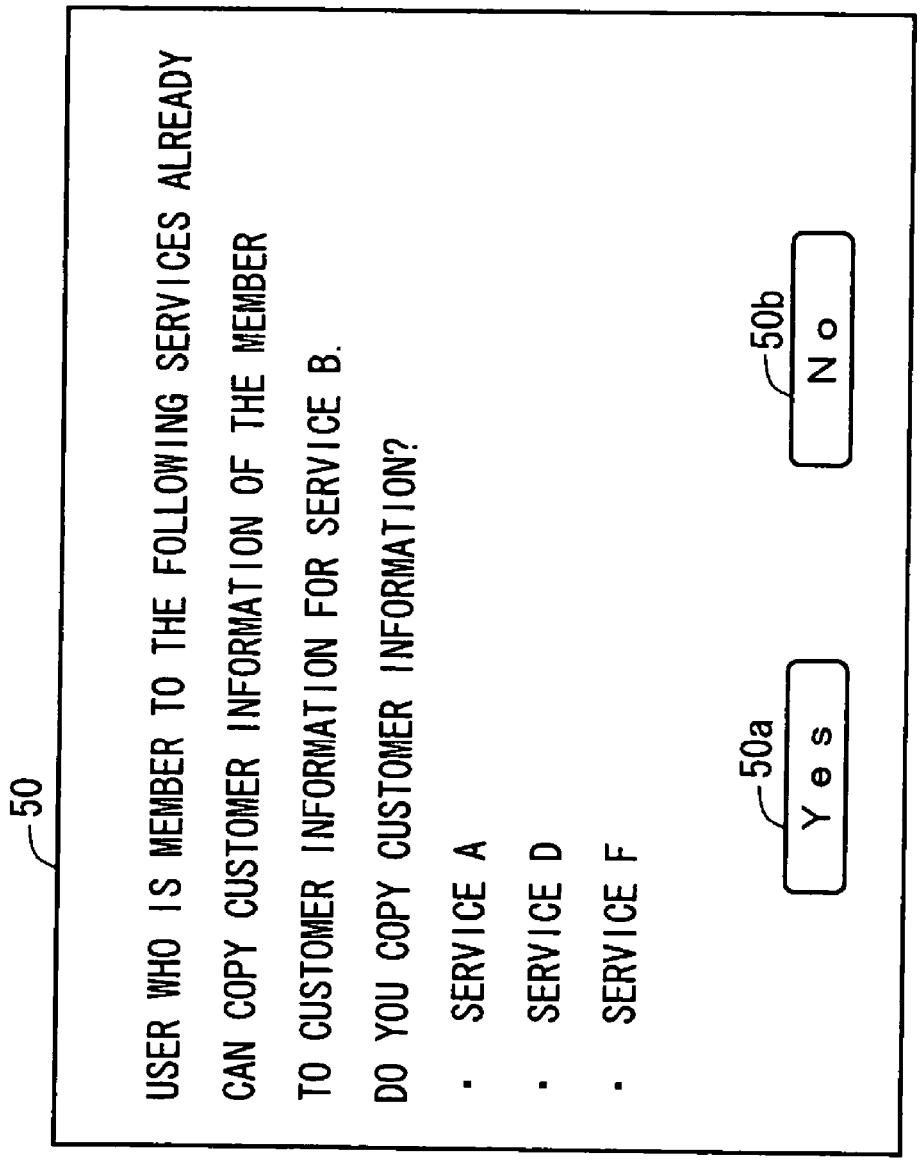
FIG. 13 is a diagram showing a copy confirmation screen.

FIG. 13 is a diagram showing a copy confirmation screen. As shown in the copy confirmation screen 50, services A, D, and F, which can be copy sources, are displayed on the display device 17. In addition, buttons 50a and 50b for asking whether customer information of a customer admitted to these services and registered is to be copied to a new service B (music delivery server 33) are displayed. The CPU 11 accepts whether the customer information is to be copied as the button 50a or 50b is pressed (e.g., a cursor on a screen is placed by the direction keys 41a to 41d of the remote controller 40 and the decision key 42 is depressed) (step S2).

If the CPU 11 accepts from the user in step S2 that the customer information is not to be copied, that is, if the button 50b is depressed, for example, the CPU 11 accepts customer information directly from the user via the remote controller 40 (step S6).

If the CPU 11 accepts from the user in step S2 that the customer information is to be copied, that is, if the button 50a is depressed, the CPU 11 causes the user to select a service to be a copy source of the customer information (step S3). The CPU 11 accepts a user ID of the selected service (which is assumed to be the service A in this example) and transmits the user ID to the integrated service server 35 that provides the service A (step S4). The integrated service server 35, which provides the service A serving as the copy source, copies customer information corresponding to the user ID to the music delivery server 33 that provides the service B serving as a copy destination (step S5). This completes the user registration. Consequently, it becomes possible to save the user's labor of inputting customer information anew.

Figure 14:
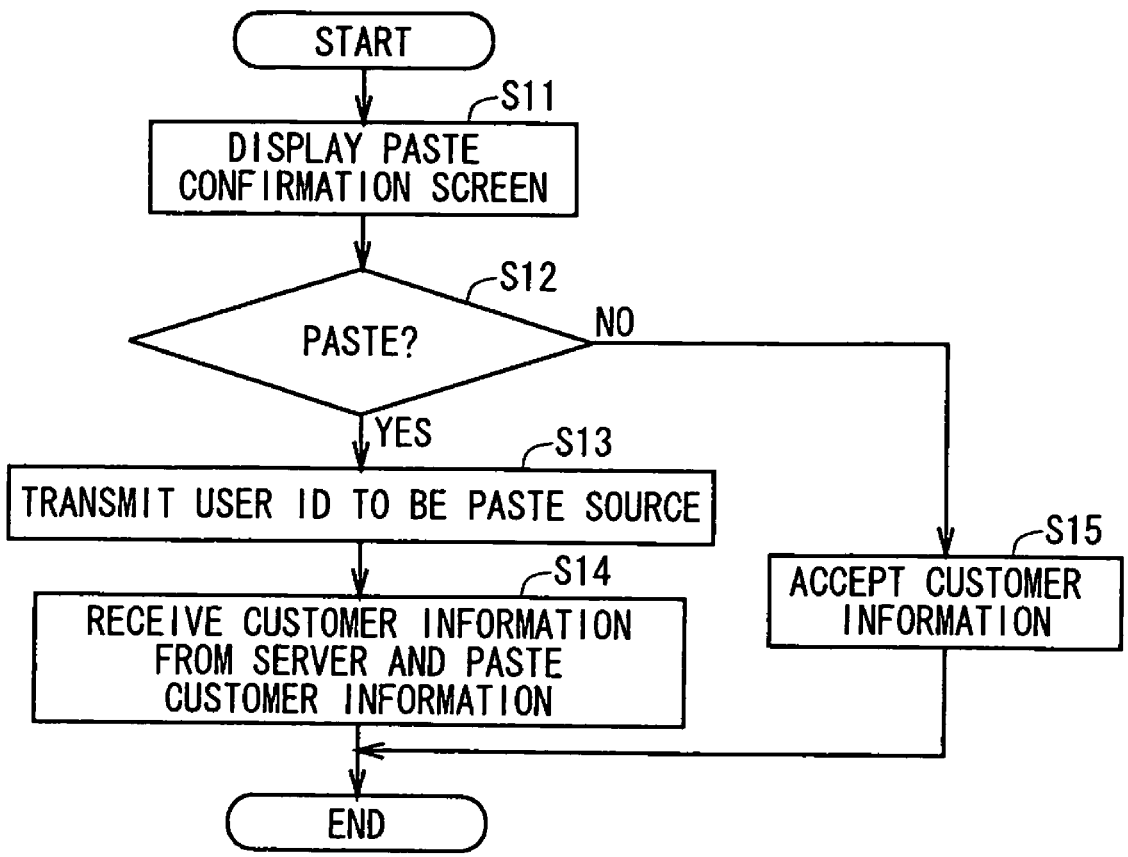
FIG. 14 is a flowchart showing a flow of processing of input support for customer information.

Next, a case in which customer information registered in a server is transmitted to the terminal apparatus and displayed on the display device 17 to perform input support for the customer information will be explained using a flowchart. FIG. 14 is a flowchart showing a flow of processing of input support for customer information.

First, as preconditions, it is assumed that a user has performed user registration for a service of the integrated service server 35 and intends to made registration for a service of the music delivery server 33 anew. When user registration is started, first, a paste confirmation screen is displayed (step S11).

Figure 15:
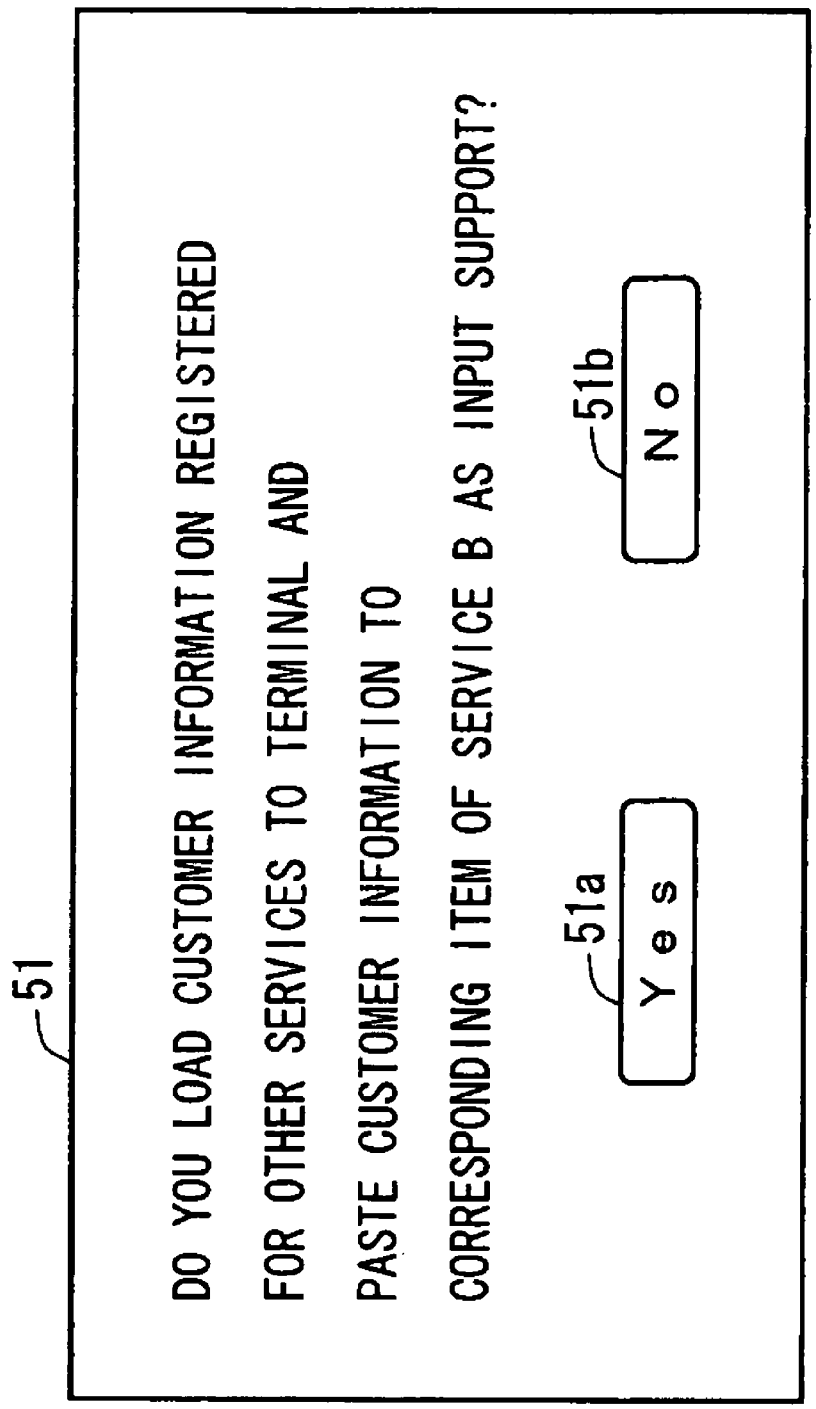
FIG. 15 is a diagram showing a paste confirmation screen.

FIG. 15 is a diagram showing the paste confirmation screen. As shown in a copy confirmation screen 51, an indication asking whether customer information currently registered in a service is to be loaded to the terminal apparatus 10 and pasted (display the customer information) is displayed on the display device 17. In addition, buttons 51a and 51b for asking whether the customer information is to be pasted are displayed. The CPU 11 accepts whether the customer information is to be pasted as the button 51a or 51b is depressed (step S12).

If the CPU 11 accepts from the user in step S12 that the customer information is not to be pasted, that is, if the button 51b is depressed, the CPU 11 displays a screen for directly accepting customer information from the user on the display device 17 and accepts the customer information (step S15).

If the CPU 11 accepts from the user in step S12 that the customer information is to be pasted, that is, if the button 51a is depressed, the CPU 11 accepts a user ID registered in the integrated service server 35 from the user and transmits the user ID to the integrated service server 35 (step S13). The integrated service server 35 transmits customer information corresponding to the user ID to the terminal apparatus 10.

The terminal apparatus 10 receives the customer information from the integrated service server 35 and displays (pastes) the customer information on the display device 17 (step S14).

Consequently, the user's labor of inputting customer information can be saved. Moreover, since an intension of the user is confirmed, occurrence of a problem in terms of customer information management can be prevented cooperating with the servers providing various services and the terminal apparatus 10.

Note that it is also possible that customer information at the time when user registration is made in the integrated service server 35 is stored in the ROM 13 or the HDD 21 of the terminal apparatus 10, and customer information stored in the ROM 13 or the HDD 21 is displayed on the screen of the display device 17.

Figure 16:
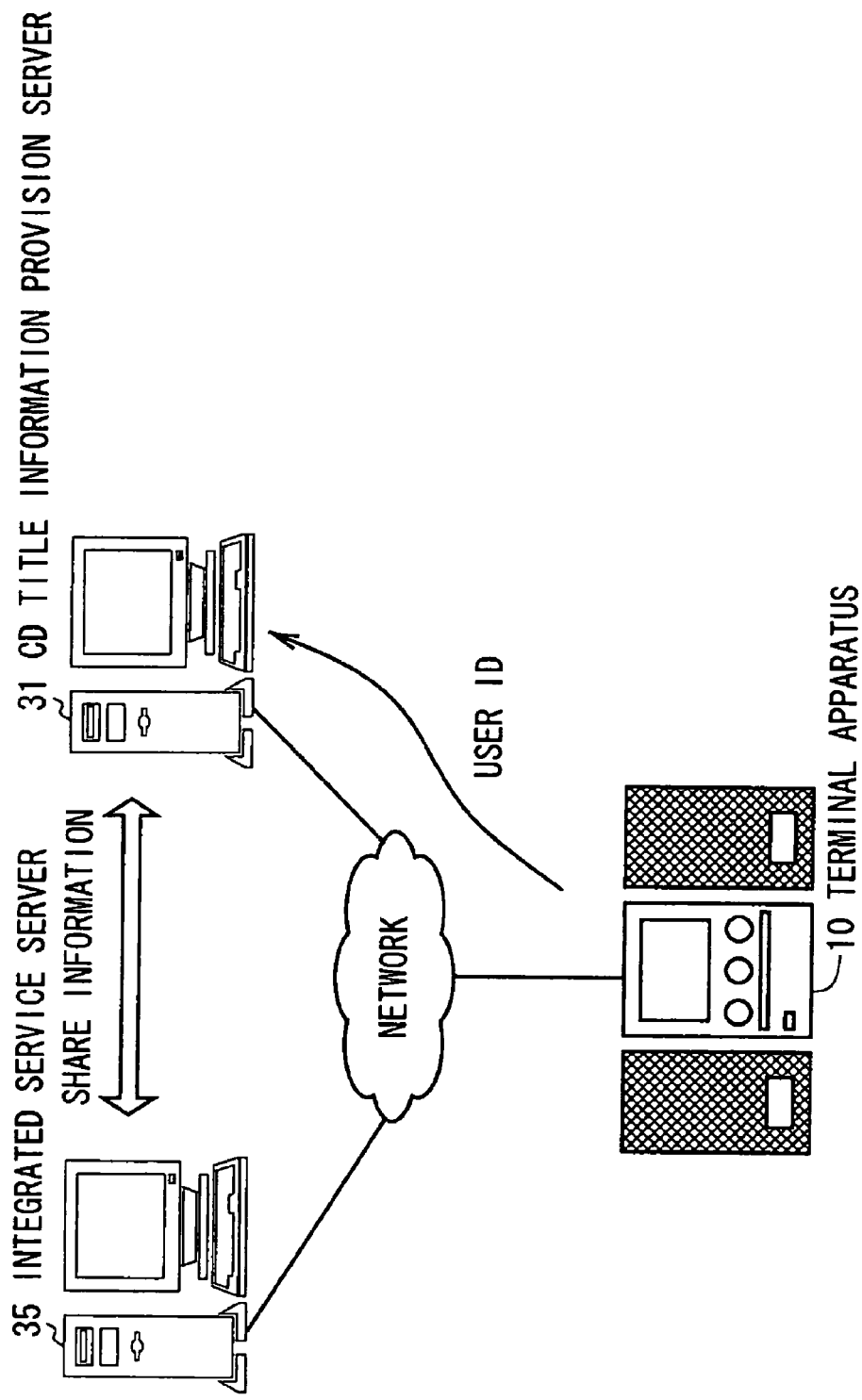
FIG. 16 is a diagram explaining collaboration of services.

Next, collaboration of services will be explained. FIG. 16 is a diagram explaining collaboration of services. The integrated service server 35 and the CD title information provision server 31 shown in the figure are made capable of sharing user identification information such as a user ID, a password, and a terminal ID and customer information. A server, which does not have the user identification information and the customer information, can receive the user identification information from a user to thereby refer to customer information corresponding to the received user identification information from a server having the user identification information and the customer information.

For example, it is assumed that a user using the terminal apparatus 10 has made user registration in the integrated service server 35. In order to receive a service of the CD title information provision server 31 anew, the user sends a user ID at the time when the user made user registration in the integrated service server 35 to the CD title information provision server 31 from the terminal apparatus 10. When the CD title information provision server 31 receives the user ID, the CD title information provision server 31 refers to customer information corresponding to the received user ID that is registered in the integrated service server 35. Consequently, the user is capable of receiving the service of the CD title information provision server 31.

In this way, by allowing the integrated service server 35 and the CD title information provision server 31 to share the user identification information and the customer information, the user can receive the service of the CD title information provision server 31 anew without inputting customer information.

Note that, in FIG. 16, the integrated service server 35 and the CD title information provision server 31 are explained. However, by allowing the various servers shown in FIG. 7 to share user identification information and customer information, the user becomes capable of receiving various services without inputting customer information.

(3) Third Embodiment

Next, a third embodiment of the invention will be hereinafter described in detail.

In such a third embodiment, in a music related service provision system capable of providing various services concerning music, a client terminal of a user who has a contract with an operator of this music related service provision system can receive various services concerning music provided by various servers such as a music data delivery server via a network such as the Internet under management of a portal server that manages the client terminal.

Note that in this third embodiment, the client terminal corresponds to the terminal 300 described above in the first embodiment and the terminal apparatus 10 described above in the second embodiment.

In addition, the portal server corresponds to the information management server 310 described above in the first embodiment and the integrated service server 35 described above in the second embodiment.

Moreover, the various servers such as the music data delivery server capable of providing various services concerning music corresponds to the service enterpriser server 320 described above in the first embodiment and the music delivery server 33 described above in the second embodiment.

Incidentally, the music data delivery server is capable of providing music data delivery service for delivering music data, which consists of a format such as ATRAC3 (Adaptive Transform Acoustic Coding 3), AAC (Advanced Audio Coding), WMA (Windows Media Audio), RealAUDIO G2 Music Codec, MP3 (MPEG Audio Layer-3), to the client terminal as the various services concerning music.

Figure 17:
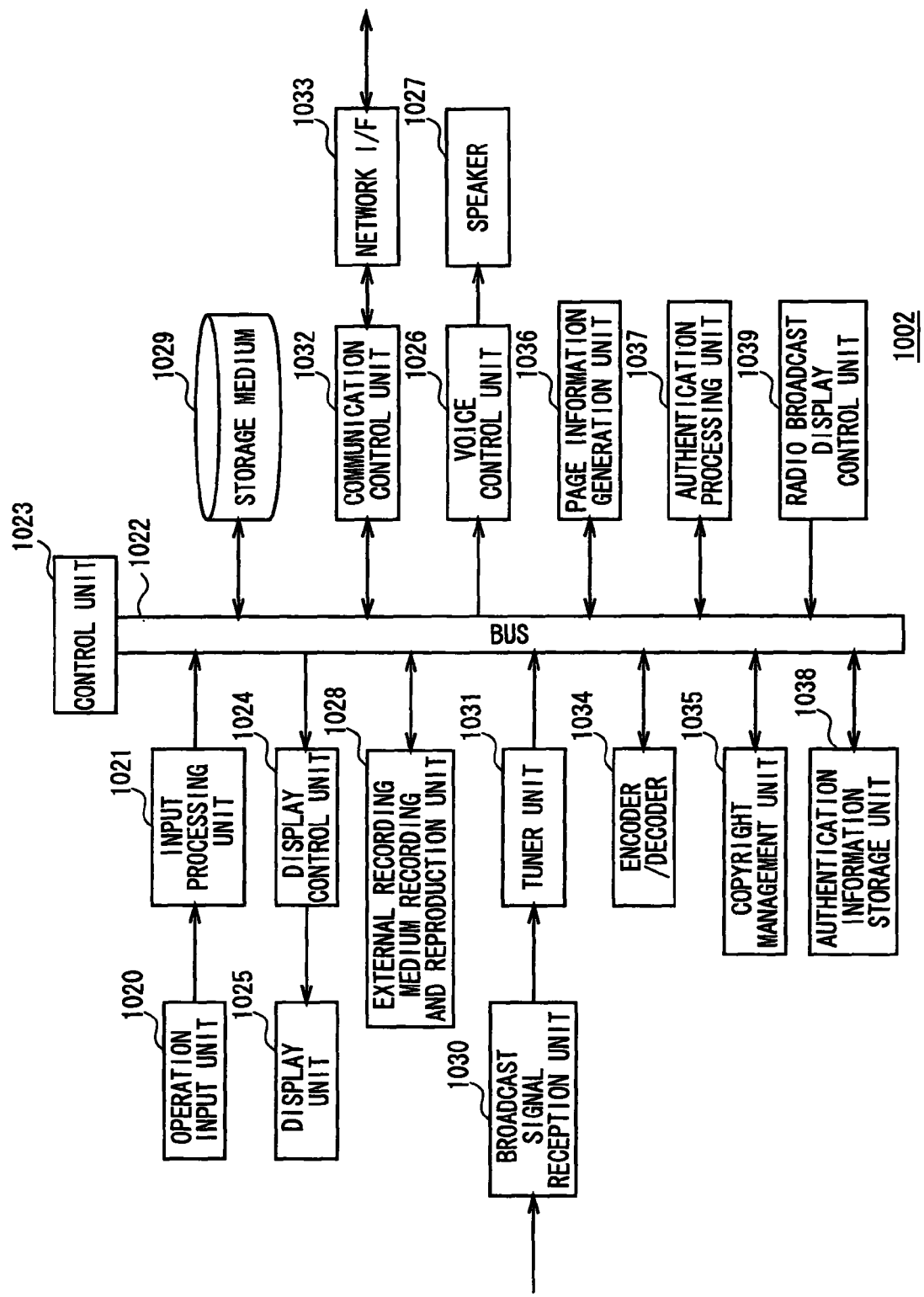
FIG. 17 is a block diagram showing a hardware structure according to a functional circuit block of a client terminal.

Here, first, a hardware structure according to a functional circuit block of a client terminal will be explained. As shown in FIG. 17, in a client terminal 1002, when an operation input unit 1020 consisting of various operations buttons provided on a housing surface thereof or a remote controller (not shown) is operated by a user, the operation input unit 1020 recognizes the operation and sends an operation input signal corresponding to the operation to an input processing unit 1021.

The input processing unit 1021 converts the operation input signal given from the operation input unit 1020 into a specific operation command and sends the operation command to a control unit 1023 via a bus 1022.

On the basis of operation commands and control signals given from respective circuits connected via the bus 1022, the control unit 1023 controls operations of these respective circuits.

A display control unit 1024 applies digital analog conversion processing to video data that is supplied via the buss 1022 and sends an analog video signal obtained as a result of the digital analog conversion processing to a display unit 1025.

The display unit 1025 is a display device such as a liquid crystal display and may be directly attached to the housing surface or may be externally attached.

Then, when a result of processing by the control unit 1023 or various video data is supplied as an analog video signal via the display control unit 1024, the display unit 1025 displays a video based on the analog video signal.

A voice control unit 1026 applies digital analog conversion processing to voice data that is supplied via the bus 1022 and sends an analog voice signal obtained as a result of the digital analog conversion processing to a speaker 1027. The speaker 1027 outputs a voice based on the analog voice signal supplied from the voice control unit 1026.

An external recording medium recording and reproduction unit 1028 is a recording and reproduction unit that reads out content data recorded in an external recording medium such as a CD, a memory stick (registered trademark) containing a flash memory in an armor case, or the like and reproduces the content data or records content data of a recording object in the external recording medium.

When the external recording medium recording and reproduction unit 1028 reads out video data from the external recording medium as content data, the external recording medium recording and reproduction unit 1028 supplies the read-out video data to the display control unit 1024 via the bus 1022.

Consequently, the display control unit 1024 converts the video data, which is read out from the external recording medium as the content data by the external recording medium recording and reproduction unit 1028, into an analog video signal and supplies the analog video signal to the display unit 1025.

In addition, when the external recording medium recording and reproduction unit 1028 reads out voice data from the external recording medium as content data, the external recording medium recording and reproduction unit 1028 supplies the read-out voice data to the voice control unit 1026 via the bus 1022.

Consequently, the voice control unit 1026 converts the voice data, which is read out from the external recording medium as the content data by the external recording medium recording and reproduction unit 1028, into an analog voice signal and supplies the analog voice signal to the speaker 1027.

Moreover, the control unit 1023 can send the content data, which is read out from the external recording medium by the external recording medium recording and reproduction unit 1028, to a storage medium 1029 inside the client terminal 1002 via the bus 1022 and store the content data in the storage medium 1029 (such storage of content data in the storage medium 1029 will be hereinafter referred to as clipping).

Then, when the control unit 1023 reads out video data such as image data or video data from the storage medium 1029 as content data, the control unit 1023 supplies the read-out video data to the display control unit 1024 via the bus 1022.

In addition, when the control unit 1023 reads out voice data such as audio data from the storage medium 1029 as content data, the control unit 1023 supplies the read-out voice data to the voice control unit 1026 via the bus 1022.

In addition to this, the control unit 1023 can read out music data from the storage medium 1029 and transfers the music data to the external recording medium recording and reproduction unit 1028 to thereby cause the external recording medium recording and reproduction unit 1028 to record the music data in the external recording medium.

A broadcast signal reception unit 1030 receives a radio broadcast wave transmitted from each radio station and supplies the radio broadcast wave to a tuner unit 1031.

Under the control of the control unit 1023, the tuner unit 1031 extracts, for example, a radio broadcast signal of a broadcast frequency corresponding to a radio station designated via the operation input unit 1020 out of the radio broadcast wave received via the broadcast signal reception unit 1030, applies predetermined reception processing to the radio broadcast signal, and sends a voice data obtained as a result of the reception processing to the voice control unit 1026 via the bus 1022.

The voice control unit 1026 can converts the voice data given from the tuner unit 1031 into an analog voice signal and send the analog voice signal to the speaker 1027 to thereby cause the speaker 1027 to output a program voice of a radio program being broadcast in the radio station and cause a user to listen to the program voice of the radio program.

In addition, the control unit 1023 can send the voice data obtained in the tuner unit 1031 to the storage medium 1029 and store the voice data to thereby record a program voice of a radio program.

Moreover, the control unit 1023 can make connection to a network via a communication control unit 1032 and a network interface 1033 sequentially and access various servers such as a portal server and a music data delivery server thereof on the network. Consequently, the control unit 1023 transmits and receives various kinds of information and various data to and from the portal server and the other various servers.

An encoder/decoder unit 1034 decodes compressed and encoded content data, which is received from the network via the network interface 1033 and the communication control unit 1032 sequentially, or compressed and encoded content data, which is read out from the storage medium 1029 or an external recording medium, and sends the content data to the display control unit 1024 and the voice control unit 1026.

In addition, the encoder/decoder unit 1034 compresses and encodes content data, which are not compressed and encoded, read out from the external recording medium, voice data given from the tuner unit 1031, or the like and sends the compressed and encoded content data to the storage medium 1029.

Consequently, the content data compressed and encoded by the encoder/decoder unit 1034 is stored in the storage medium 1029 under the control of the control unit 1023.

A copyright management unit 1035 generates copyright management information corresponding to content data downloaded from the network via the network interface 1033 and the communication control unit 1032 sequentially or copyright management information corresponding to content data read out from the external recording medium by the external recording medium recording and reproduction unit 1028.

The copyright management information generated by the copyright management unit 1035 is registered in the storage medium 1029 in association with the content data under the control of the control unit 1023.

In addition, when content data associated with copyright management information is checked out between the storage medium 1029 and a specific external recording medium or when content data associated with the copyright management information is checked in between the specific external recording medium and the storage medium 1029, the copyright management unit 1035 updates contents of copyright management information corresponding to the content data appropriately to thereby protect a copyright with respect to the content data.

A page information generation unit 1036 interprets page information of an XML (extensible Markup Language) file, an HTML (Hyper Text Markup Language) file, or the like, which is received from the network via the network interface 1033 and the communication control unit 1032 sequentially, generates video data for display on the display unit 1025, and sends the generated video data to the display control unit 1024.

An authentication processing unit 1037 performs authentication processing such as transmitting authentication information to a portal server and other servers on the network, which are connected via the network interface 1033, via the communication control unit 1032 and the network interface 1033 sequentially.

An authentication information storage unit 1038 stores authentication information that is required when the authentication processing unit 1037 accesses the portal server and the other servers.

A radio broadcast display control unit 1039 transmits a request signal for requesting radio broadcast information on a radio broadcast being received for trial listening by a user to a radio broadcast information delivery server (not shown) corresponding to a radio station, which is broadcasting the radio broadcast being received, via the communication control unit 1032 and the network interface 1033 sequentially.

As a result, the radio broadcast display control unit 1039 receives the radio broadcast information, which is transmitted from the radio broadcast information delivery server on the network, via the network interface 1033 and the communication control unit 1032 sequentially and sends the received radio broadcast information to the display control unit 1024 to thereby cause the display unit 1025 to display the radio broadcast information including such as a program name of the radio program being received and a title and an artist name of a tune being received.

Figure 18:
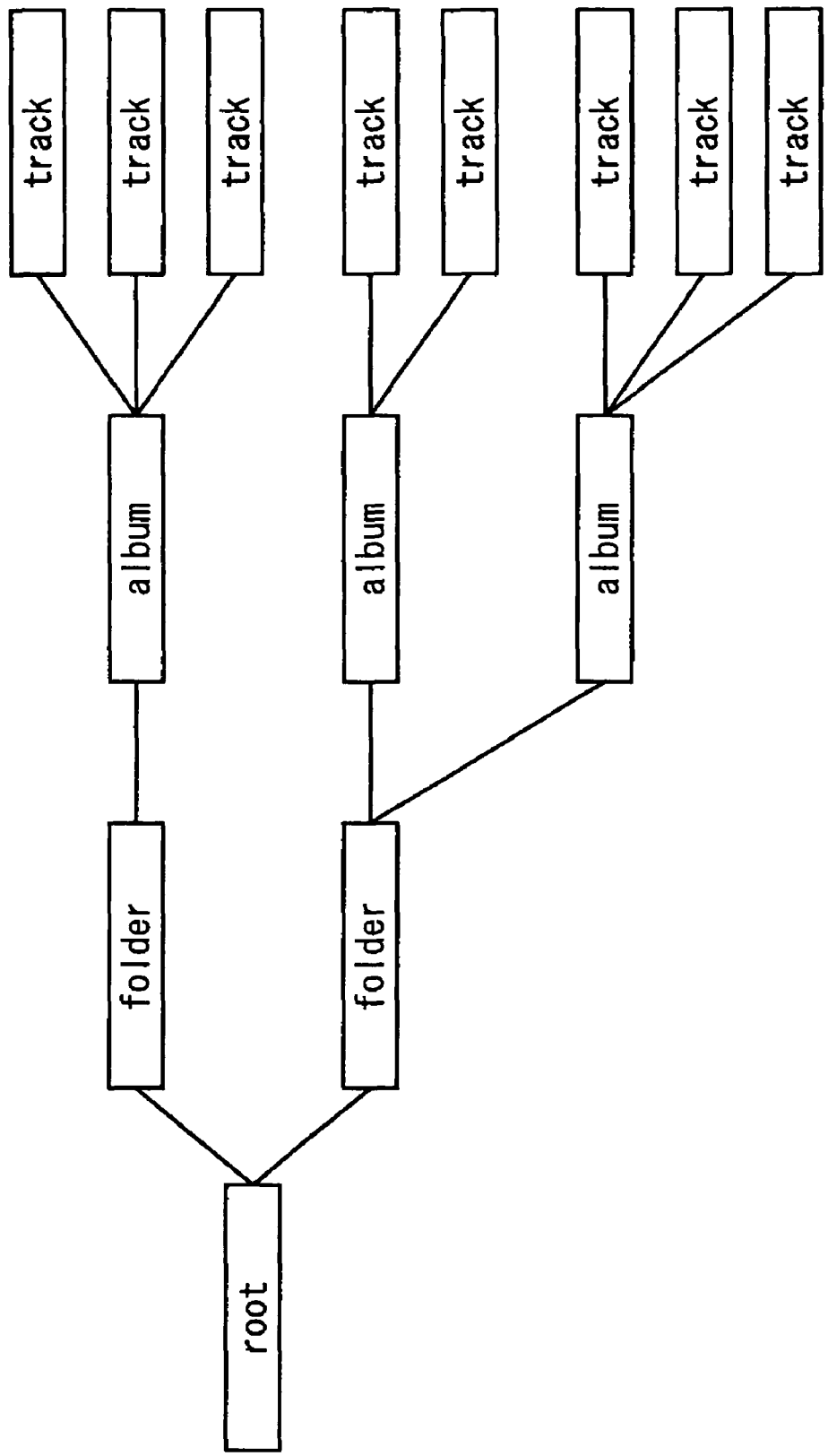
FIG. 18 is a schematic diagram showing a directory structure.

Incidentally, the control unit 1023 of the client terminal 1002 with such a structure is adapted to manage content data stored in the storage medium 1029 in a directory structure shown in FIG. 18. First, "folder" directories of an arbitrary number within a defined range are created in a lower layer of a "root" directory. The "folder" directories are created in association with, for example, a genre to which contents belong, an owning user, and the like.

"album" directories of an arbitrary number within a defined range are created in a lower layer of the "folder" directories, and the "album" directories are adapted to be associated with, for example, each album title. One or more "track" files, which are assumed to belong to the "album" directories, are stored in a lower layer of the "album" directories, and the "track" files indicate one tune, that is, contents.

Directory management for such content data is performed by a database file stored in the storage medium 1029.

Figure 19:
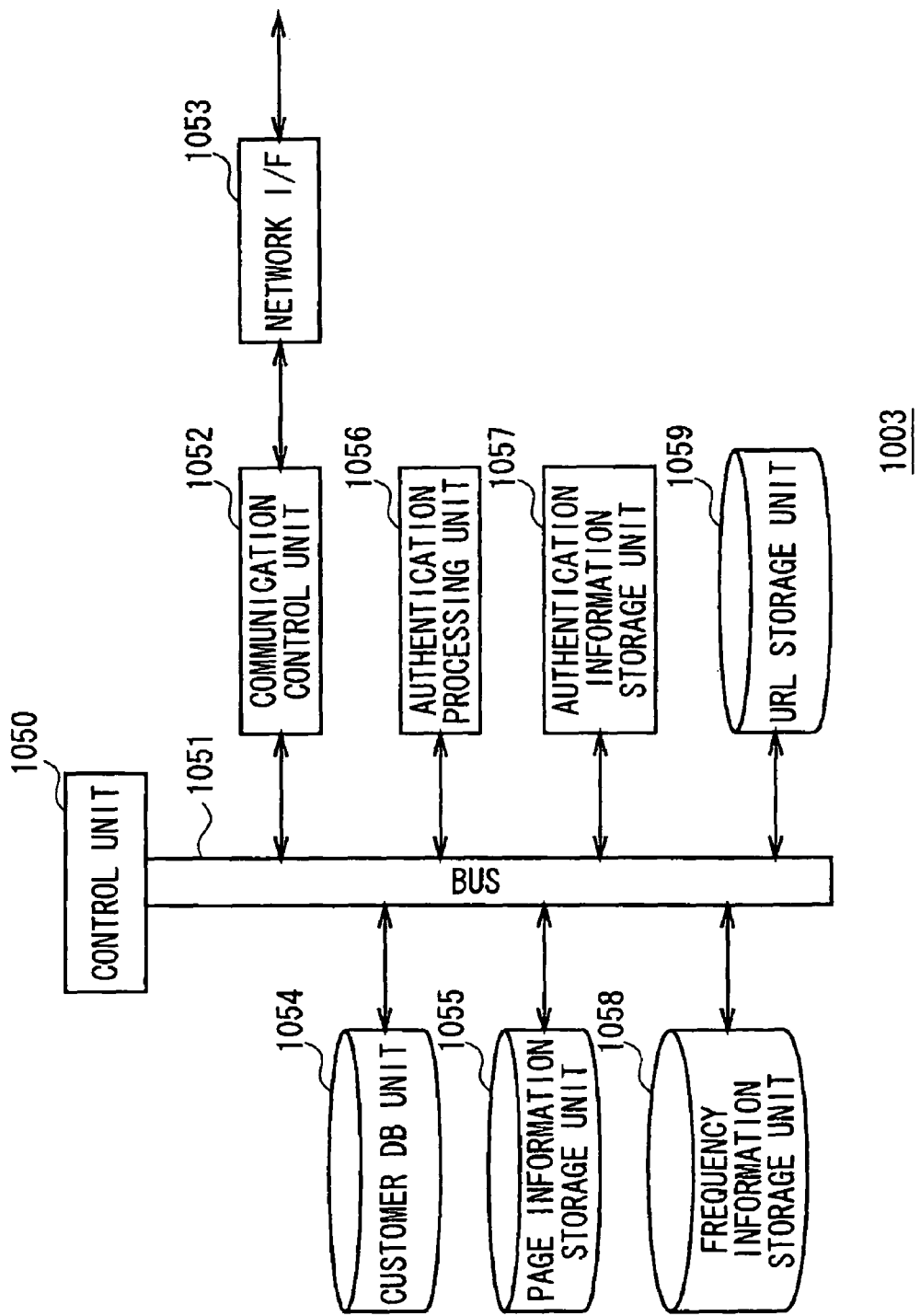
FIG. 19 is a block diagram showing a hardware structure according to a functional circuit block of a portal server.

Next, a hardware structure according to a functional circuit block of a portal server 1003 will be explained using FIG. 19. A control unit 1050 in the portal server 1003 controls operations of respective circuits connected via a bus 1051.

A communication control unit 1052 transmits and receives various kinds of information to and from the client terminal 1002 and the music data delivery server 1004 via a network interface 1053 under the control of the control unit 1050.

In a customer database unit 1054, user ID (Identification) information and password information of users, who have completed a contract with an operator of a music related service provision system, are registered as customer information in association with each other.

Page information and the like managed by the operator of the music related service provision system are stored in a page information storage unit 1055.

Note that the page information is written in a language such as XML and includes URL (uniform Resource Locator) information for accessing various servers such as the music data delivery server 1004.

An authentication processing unit 1056 receives the user ID information and the password information, which are transmitted from the client terminal 1002, via the network interface 1053 and the communication control unit 1052 sequentially. Then, as user authentication processing, the authentication processing unit 1056 confirms whether the received user ID information and password information are registered in the customer database unit 1054 as customer information.

Then, when the authentication processing unit 1056 ends the user authentication processing, the authentication processing unit 1056 issues portal authentication result information (authentication session ID information to be described later) indicating a result of the user authentication processing and temporarily stores the issued portal authentication result information in an authentication information storage unit 1057.

In this case, when a user is authenticated as a regular user as a result of the user authentication processing by the authentication processing unit 1056, the control unit 1050 transmits page information for a contractor stored in the page information storage unit 1055 to the client terminal 1002 together with the portal authentication result information via the communication control unit 1052 and the network interface 1053 sequentially.

Note that the control unit 1050 may be constituted to, when the user is not authenticated as a regular user as a result of the user authentication processing by the authentication processing unit 1056, transmits authentication error information to the client terminal 1002 together with authentication failure notification page information indicating failure of authentication stored in the page information storage unit 1055 via the communication control unit 1052 and the network interface 1053 sequentially.

In addition, as a result of the authentication processing with respect to a user being executed from various servers such as the music data delivery server, the authentication processing unit 1056 receives portal authentication result information (authentication ticket to be described later), which is acquired and transmitted from the client terminal 1002 of the user, via the network interface 1053 and the communication control unit 1052 sequentially. Then the authentication processing unit 1056 compares the received portal authentication result information and the portal authentication result information corresponding to the user temporarily stored in the authentication information storage unit 1057.

Consequently, the authentication processing unit 1056 executes confirmation processing for confirming whether the portal authentication result information is regular portal authentication result information as authentication processing with respect to the portal authentication result information received from the various servers such as the music data delivery server and returns confirmation result information indicating a result of the confirmation to the various servers such as the music data delivery server via the communication control unit 1052 and the network interface 1053 sequentially.

In a frequency information storage unit 1058, area codes such as postal code numbers capable of specifying areas, frequency information indicating broadcast frequencies of radio broadcasts receivable in the areas indicated by the area codes, names of radio stations (hereinafter referred to as radio station names) broadcasting the radio-broadcasts, and call signs serving as identification information unique for the respective radio stations are stored in association with one another.

In a URL storage unit 1059, call sings for respective radio stations for radio broadcasts and URL information, which, concerning radio programs currently being broadcast provided by radio stations corresponding to the call signs, is capable of acquiring radio broadcast information including such as program names of the radio programs and titles of tunes being on air at a present point in the radio programs (hereinafter specifically referred to as now-on-air information), are stored in association with each other.

Figure 20:
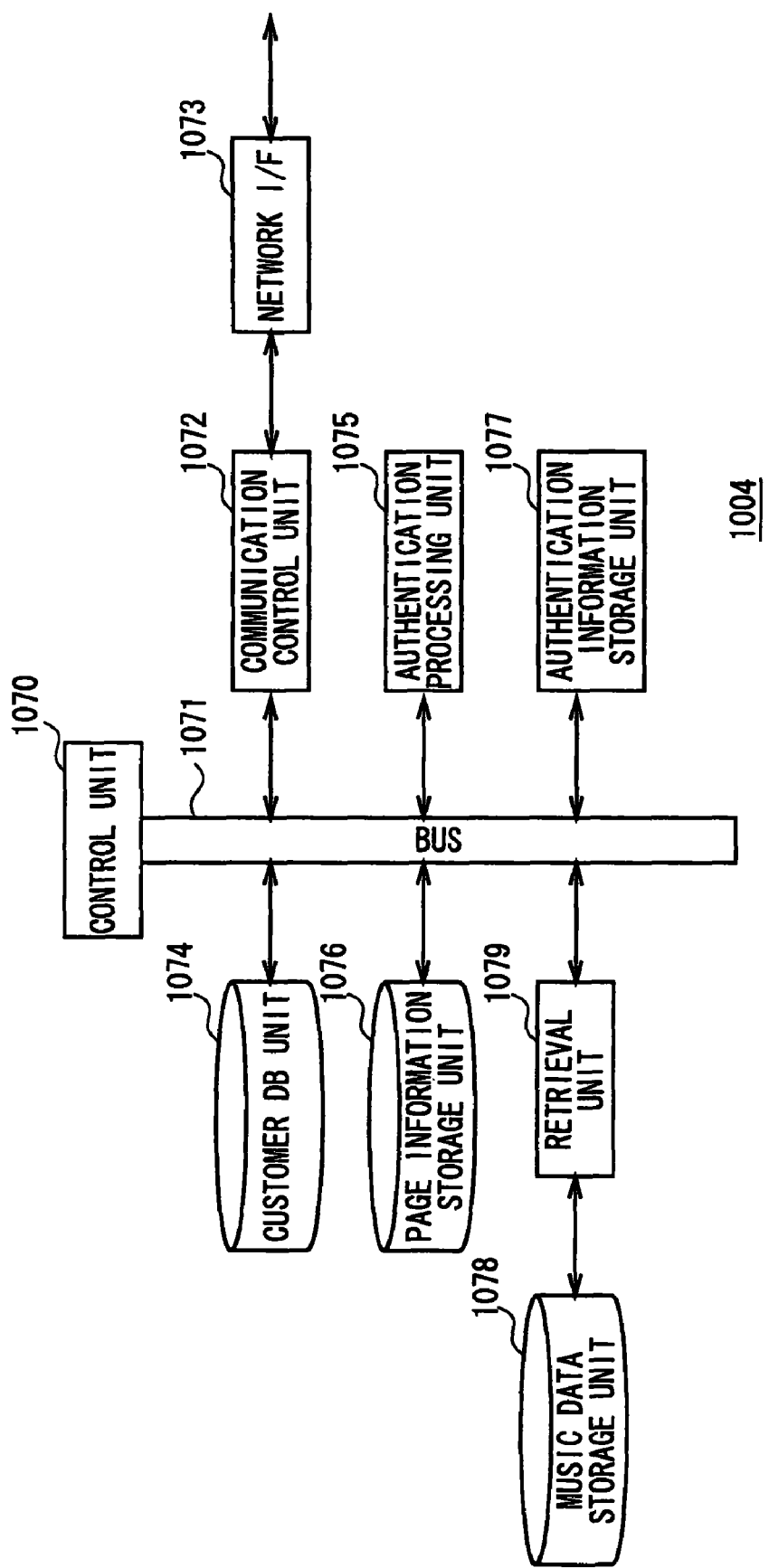
FIG. 20 is a block diagram showing a hardware structure according to a functional circuit block of a music data delivery server.

Next, a hardware structure according to a functional circuit block of the music data delivery server 1004 will be explained using FIG. 20. A control unit 1070 in the music data delivery server 1004 controls operations of respective circuits connected via a bus 1071.

The communication control unit 1072 transmits and receives various kinds of information and various data such as content data to and from the client terminal 1002, the portal server 1003, and the like via a network interface 1073 under the control of the control unit 1070.

In a customer database unit 1074, user ID information and password information of users, who have completed a contract with an operator of the music data delivery server 1004, are registered as customer information in association with each other. However, in the case in which an authentication processing unit 1075 has a function of subjecting a user to authentication processing on the basis of portal authentication result information issued by the portal server 1003, which is transmitted from the client terminal 1002, the customer database unit 1074 may not be provided.

In a page information storage unit 1076, page information and the like for music data delivery introducing downloadable music data, which are managed by the music data delivery server 1004, are stored.

Incidentally, the page information for music data delivery is written in a language such as XML and can cause a user using the client terminal 1002 to select music data that the user desires to download.

Then, the control unit 1070 receives a page information acquisition request signal for requesting the page information for music data delivery, which is transmitted from the client terminal 1002, via the network interface 1073 and the communication control unit 1072 sequentially. Then, the control unit 1070 transmits the page information for music data delivery stored in the page information storage unit 1076 to the client terminal 1002 via the communication control unit 1702 and the network interface 1073 sequentially in response to the received page information acquisition request signal.

The authentication processing unit 1075 receives user ID information and password information of a user using the client terminal 1002, which is transmitted from the client terminal 1002, via the network interface 1073 and the communication control unit 1072 sequentially. Then, as user authentication processing, the authentication processing unit 1075 confirms whether the received user ID information and password information are registered as customer information in the customer database unit 1074.

In addition, as a user authentication method different from the user authentication processing using user ID information and password information, the authentication processing unit 1075 receives portal authentication result information (authentication ticket to be described later) issued by the portal server 1003, which is transmitted from the client terminal 1002, via the network interface 1073 and the communication control unit 1072 sequentially and transmits the received portal authentication result information to the portal server 1003 via the communication control unit 1072 and the network interface 1073 sequentially.

Then, in response to the transmission of the portal authentication result information to the portal server 1003, the authentication processing unit 1075 receives confirmation result information, which is returned from the portal server 1003 as a result of authentication processing (i.e., the above-described confirmation processing) for the portal authentication result information being executed, via the network interface 1073 and the communication control unit 1072 sequentially and confirms whether the user is a regular user who has already completed a contract with an operator of a music related service provision system on the basis of the received confirmation result information.

In this way, when the user authentication processing ends, the authentication processing unit 1075 issues server authentication result information (service session ID information to be described later) indicating a result of the user authentication processing.

In this case, when the user is authenticated as a regular user as a result of the user authentication processing by the authentication processing unit 1075, the control unit 1070 transmits page information for music data delivery stored in the page information storage unit 1076 as page information for a contractor to the client terminal 1002 together with server authentication result information via the communication control unit 1072 and the network interface 1073 sequentially.

On the other hand, when the user is not authenticated as a regular user as a result of the user authentication processing by the authentication processing unit 1075, the control unit 1070 transmits authentication error information to the client terminal 1002 together with authentication failure notification page information indicating failure of authentication, which is stored in the page information storage unit 1076, via the communication control unit 1072 and the network interface 1073 sequentially.

Incidentally, in an authentication information storage unit 1077, server authentication result information issued by the authentication processing unit 1075 is temporarily stored and various kinds of authentication information, which is required by the authentication processing unit 1075 when a user using the client terminal 1002 is subjected to user authentication processing, is stored.

In a music data storage unit 1078, plural music data compressed and encoded in the above-described ATRAC3 format, the MP3 format, or the like are stored in association with retrieval keys for respective kinds of content ID information or the like.

As a result of the page information for music data delivery being transmitted to the client terminal 1002, when a retrieval key for retrieval of music data desired to be downloaded transmitted from the client terminal 1002 is stored, and a download request signal for requesting download of the music data desired to be downloaded is received via the network interface 1073 and the communication control unit 1072 sequentially, a retrieval unit 1079 extracts the retrieval key from the received download request signal.

Then, the retrieval unit 1079 retrieves the music data desired to be downloaded corresponding to retrieval conditions indicated by the retrieval key out of the plural music data in the music data storage unit 1078 on the basis of such a retrieval key.

Consequently, the control unit 1070 transmits the retrieved music data desired to be downloaded to the client terminal 1002 via the communication control unit 1072 and the network interface 1073 sequentially.

In addition, in this case, the control unit 1070 transmits charging information for charging processing for the user arising out of the download of music data to the client terminal 1002 to a charging server 1008 via the communication control unit 1072 and the network interface 1073 sequentially to thereby cause the charging server 1008 to execute charging processing corresponding to the download of the music data for the user.

Next, outlines of processing to be executed between the client terminal 1002 and the portal server 1003 and processing to be executed between the client terminal 1002 and the various servers such as the music data delivery server 1004 will be explained using sequence charts shown in FIGS. 21 to 26.

Figure 21:
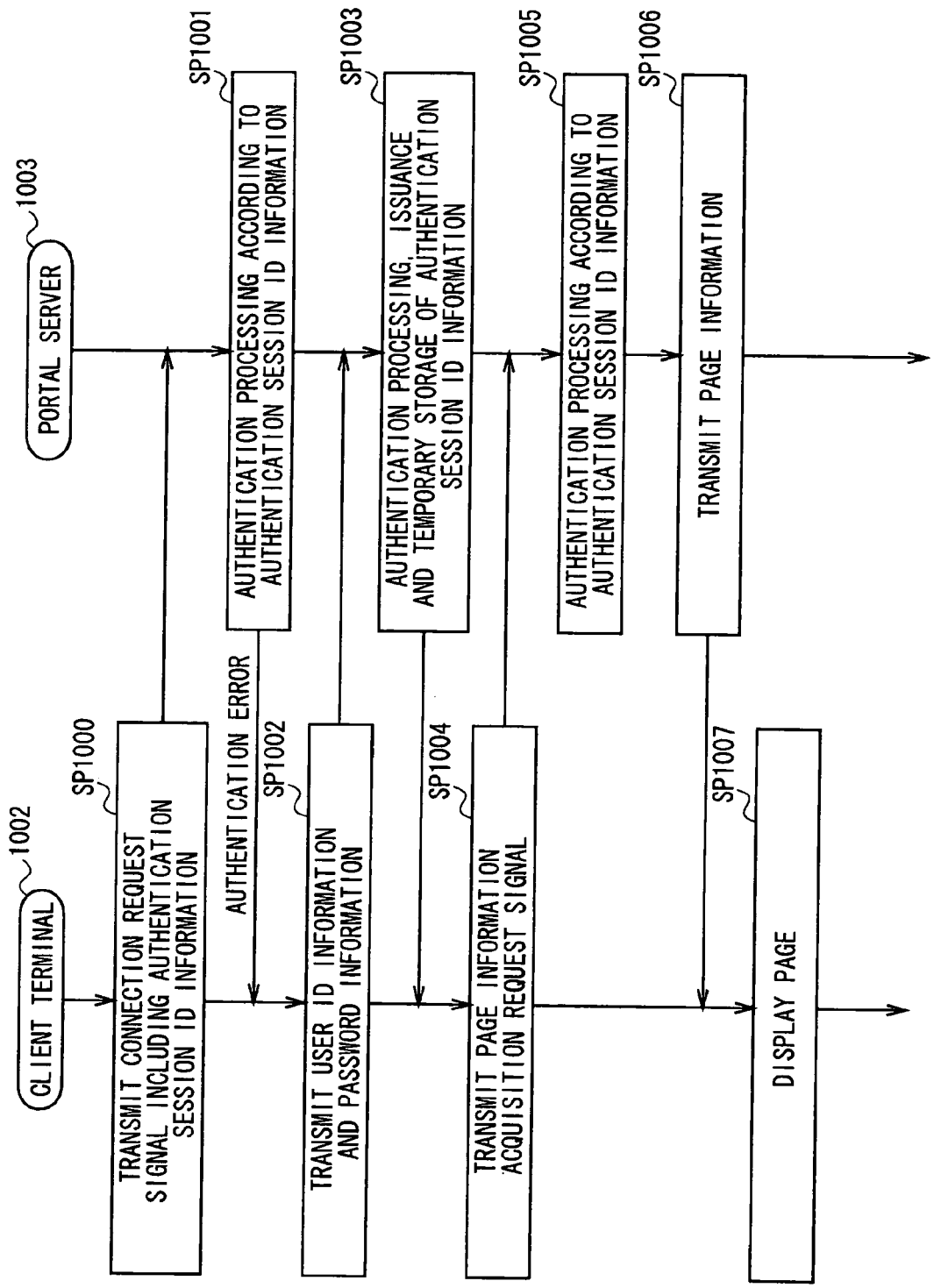
FIG. 21 is a sequence chart showing a user authentication processing procedure between the client terminal and the portal server.

First, a user authentication processing procedure to be executed between the client terminal 1002 and the portal server 1003 will be explained using FIG. 21.

In the client terminal 1002 of a user who has a contract with an operator of a music related service provision system, when an operation input signal recognized by the operation input unit 1020 is converted into an operation command by the input processing unit 1021 and given to the control unit 1023, for example, in response to an operation for inputting a power supply being applied to the client terminal 1002 or a specific operation button of the operation input unit 1020 being depressed by the user, the control unit 1023 starts authentication request processing.

When the authentication request processing is started in the client terminal 1002, in step SP1000, the control unit 1023 generates a connection request signal, in which authentication session ID information or the like temporarily stored in the authentication information storage unit 1038 in advance is stored, and transmits the generated connection request signal to the portal server 1003 via the communication control unit 1032 and the network interface 1033 sequentially.

Incidentally, the authentication session ID information is identification information that is issued by the portal server 1003 as information for identification of individual communication connection states (i.e., sessions) every time the client terminal 1002 and the portal server 1003 perform communication connection for execution of various kinds of processing such as user authentication processing.

Note that a predetermined term of validity (e.g., about one minute) with a point of issuance by the portal server 1003 as a reference is set for such authentication session ID information in using the authentication session ID information for user authentication processing and the like.

Therefore, when the client terminal 1002, which has acquired authentication session ID information from the portal server 1003, cannot present the authentication session ID information to the portal server 1003 within the term of validity, it is judged by the portal server 1003 that a communication connection state specified by the authentication session ID information is disconnected.

Consequently, the portal server 1003 prevents authentication session ID information issued in the past from being used illegally for user authentication processing and the like by a user who does not have a contract with the operator of the music related service provision system.

In addition, the authentication session ID information temporarily stored in the authentication information storage unit 1038 is authentication session ID information issued by the portal server 1003 when the client terminal 1002 and the portal server 1003 performed communication connection for execution of user authentication processing and the like before.

When a connection request signal is transmitted from the client terminal 1002, in response to this connection request signal, in step SP1001, the control unit 1050 of the portal server 1003 receives the connection request signal via the network interface 1053 and the communication control unit 1052 sequentially and sends authentication session ID information or the like stored in the received connection request signal to the authentication processing unit 1056.

Then, under the control of the control unit 1050, the authentication processing unit 1056 executes user authentication processing on the basis of the authentication session ID information or the like received from the client terminal 1002 as a connection request signal.

As a result, when it cannot be authenticated by the authentication processing unit 1056 that a user using the client terminal 1002 is a regular user because, for example, a term of validity of the authentication session ID information or the like received from the client terminal 1002 is expired, the control unit 1050 transmits authentication error information indicating an authentication error to the client terminal 1002 via the communication control unit 1052 and the network interface 1053 sequentially.

In step SP1002, when the control unit 1023 of the client terminal 1002 receives the authentication error information transmitted from the portal server 1003 via the network interface 1033 and the communication control unit 1032 sequentially, the control unit 1023, responding thereto, reads out user ID information, password information, and the like stored in the authentication information storage unit 1038 in response to the authentication error information and transmits the read-out user ID information, password information, and the like to the portal server 1003 via the communication control unit 1032 and the network interface 1033 sequentially.

In step SP1003, the control unit 1050 of the portal server 1003 receives the user ID information, the password information, and the like, which are transmitted from the client terminal 1002, via the network interface 1053 and the communication control unit 1052 sequentially and transmits the received user ID information, password information, and the like to the authentication processing unit 1656.

Consequently, under the control of the control unit 1050, as user authentication processing, the authentication processing unit 1056 detects whether the user ID information, the password information, and the like received from the client terminal 1002 are included in customer information registered in the customer database unit 1054.

As a result, when the authentication processing unit 1056 authenticates that the user using the client terminal 1002 is a regular user, under the control of the control unit 1050, the authentication processing unit 1056 issues authentication session ID information or the like with respect to a communication connection state between the client terminal 1002 and the portal server 1003 at the present point as portal authentication result information and temporarily stores the authentication session ID information or the like issued to the client terminal 1002 in the authentication information storage unit 1057.

Then, the control unit 1050 transmits the authentication session ID information or the like, which is issued by the authentication processing unit 1056 to the client terminal 1002, to the client terminal 1002 via the communication control unit 1052 and the network interface 1053 sequentially.

In step SP1004, the control unit 1023 of the client terminal 1002 receives the authentication session ID information or the like, which is transmitted from the portal server 1003, via the network interface 1033 and the communication control unit 1032 sequentially and sends the received authentication session ID information or the like to the authentication processing unit 1037.

Then, the authentication processing unit 1037 temporarily stores the authentication session ID information or the like received from the portal server 1003 in the authentication information storage unit 1038 under the control of the control unit 1023.

Consequently, the control unit 1023 receives a page information acquisition request signal for requesting page information to the portal server 1003 from the portal server 1003 and transmits the page information acquisition request signal to the portal server 1003 together with the authentication session ID information and the like temporarily stored in the authentication information storage unit 1038 via the communication control unit 1032 and the network interface 1033 sequentially.

In step SP1005, the control unit 1050 of the portal server 1003 receives the page information acquisition request signal and the authentication session ID information or the like, which is transmitted from the client terminal 1002, via the network interface 1053 and the communication control unit 1052 sequentially and sends the received authentication session ID information or the like to the authentication processing unit 1056.

Consequently, under the control of the control unit 1050, the authentication processing unit 1056 compares the authentication session ID information or the like received from the client terminal 1002 and the authentication session ID information or the like, which is issued to the client terminal 1002 in the above-described step SP1003 and temporarily stored in the authentication information storage unit 1057, to execute user authentication processing.

As a result, in step SP1006, when the authentication processing unit 1056 authenticates that the user using the client terminal 1002 is a regular user, the authentication processing unit 1056 judges that the page information acquisition request from the client terminal 1002 is a legal request and extends the term of validity for the authentication session ID information or the like issued to the client terminal 1002.

Consequently, the control unit 1050 reads out page information requested to be acquired by the user from the page information storage unit 1055 and transmits the read-out page information to the client terminal 1002 together with the authentication session ID information or the like, for which the term of validity is extended by the authentication processing unit 1056, via the communication control unit 1052 and the network interface 1053 sequentially.

In step SP1007, the control unit 1023 of the client terminal 1002 receives the page information transmitted from the portable server 1003 and the authentication session ID information or the like, for which the term of validity is extended, via the network interface 1033 and the communication control unit 1032 sequentially, sends the received page information to the page information generation unit 1036, and sends the authentication session ID information or the like, for which the term of validity is extended, to the authentication processing unit 1037.

The page information generation unit 1036 generates video data of a page, in which links to the various servers such as the music data delivery server 1004 are embedded, on the basis of the page information given from the control unit 1023 and sends the generated video data to the display control unit 1024.

Consequently, the display control unit 1024 applies digital analog conversion processing to the video data given from the page information generation unit 1036 and sends an obtained analog video signal to the display unit 1025 to thereby cause the display unit 1025 to display a page of the portal server 1003 as a video based on the analog video signal.

In addition, under the control of the control unit 1023, in the authentication information storage unit 1038, the authentication processing unit 1037 temporarily stores the authentication session ID information or the like, for which the term of validity is extended, received from the portal server 1003 overwriting the authentication session ID information or the like on the authentication session ID information or the like before the term of validity is extended to thereby update the authentication session ID information or the like temporarily stored in the above-described step SP1004 to the authentication session ID information or the like for which the term of validity is extended.

Figure 22:
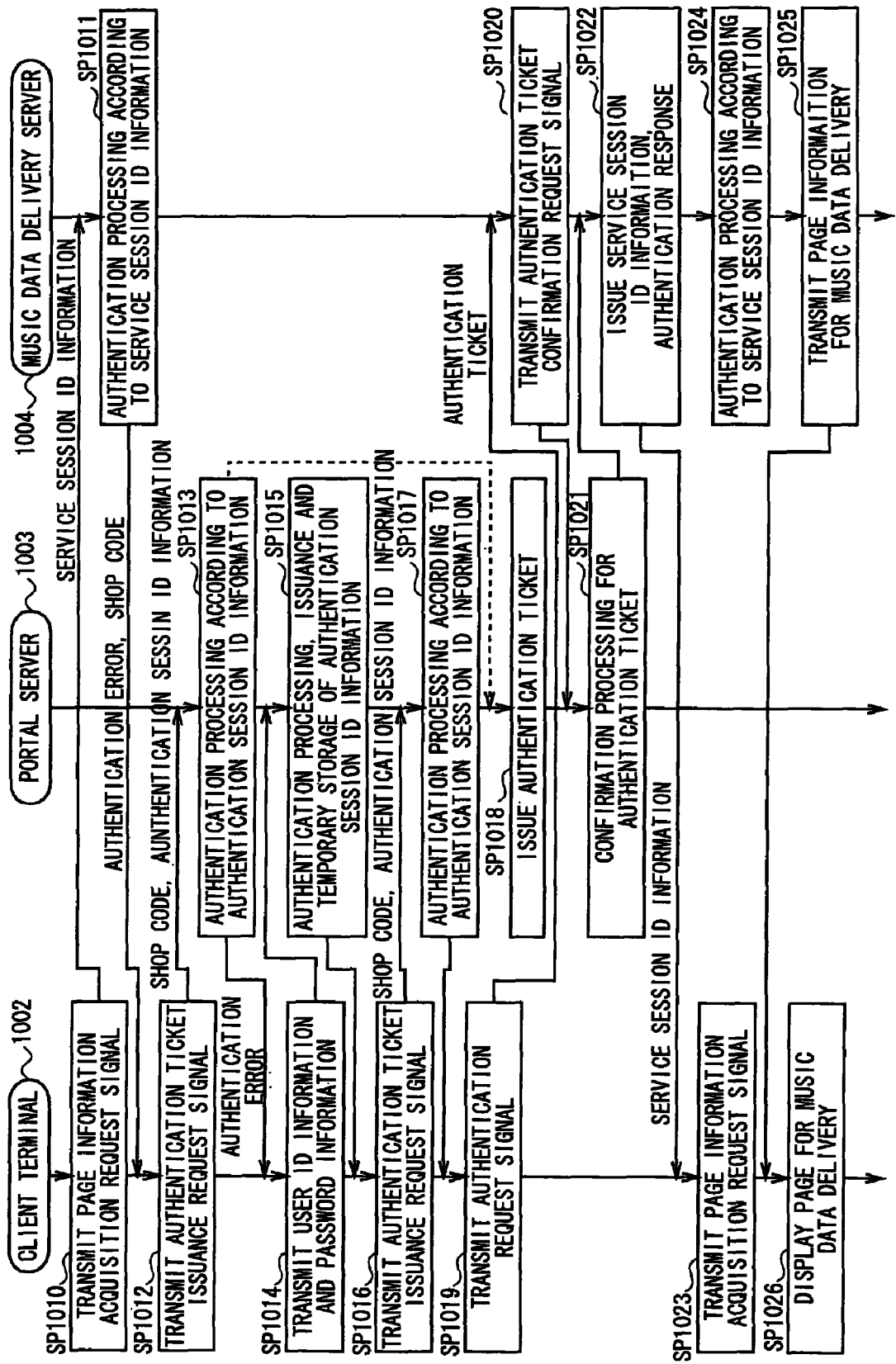
FIG. 22 is a sequence chart showing a user authentication processing procedure between the client terminal and the music data delivery server.

Next, in FIG. 22, user authentication processing, which is executed between the client terminal 1002 and the various servers such as the music data delivery server 1004, will be hereinafter explained.

In this case, as such user authentication processing, there is user authentication processing that is executed by the client terminal 1002 temporarily acquiring page information from the portal server 1003 as described above concerning FIG. 21 and subsequently accessing the various servers such as the music data delivery server 1004 according to links embedded in the page information (this will be hereinafter referred to as indirect access authentication processing).

In addition, as such user authentication processing, there is also user authentication processing that is executed by the client terminal 1002 directly accessing the various servers such as the music data delivery server 1004 according to URL information or the like registered as a bookmark in advance without acquiring page information of the portal server 1003 (this will be hereinafter referred to as direct access authentication processing).

However, the indirect access authentication processing can be executed in the same procedure regardless of how the client terminal 1002 and the various servers such as the music data delivery server 1004 are combined.

In addition, the direct access authentication processing can also be executed in the same procedure regardless of how the client terminal 1002 and the various servers such as the music data delivery server 1004 are combined.

Then, in the indirect access authentication processing and the direct access authentication processing, only a method of acquisition of URL information used for accessing the various servers such as the music data delivery server 1004 in the client terminal 1002 is different. After the acquisition of the URL information, both the indirect access authentication processing and the direct access authentication processing can be executed in the same procedure.

Therefore, in the following explanation, for simplification of explanation, the music data delivery server 1004 is used as a representative of an access destination of the client terminal 1002, and the indirect access authentication processing and the direct access authentication processing are collectively explained as one piece of user authentication processing.

First, in step SP1010, the control unit 1023 of the client terminal 1002 transmits service session ID information or the like read out from the authentication information storage unit 1038 to the music data delivery server 1004 together with a page information acquisition request signal for requesting to acquire page information for music data delivery via the communication control unit 1032 and the network interface 1033 sequentially in accordance with URL information embedded in page information as links, URL information already registered as a bookmark, or the like.

Incidentally, the service session ID information is identification information that is issued by the various servers such as the music data delivery server 1004, to which the client terminal 1002 accesses, as information for identification of individual communication connection states (i.e., sessions) every time the client terminal 1002 and the various servers such as the music data delivery server 1004 perform communication connection for execution of various kinds of processing such as user authentication processing.

Note that a predetermined term of validity (e.g., about one minute) with a point of issuance by the various servers such as the music data delivery serer 1004 as a reference is set for such service session ID information in using the service session ID information for user authentication processing and the like as in the above-described authentication session ID information.

Therefore, when the client terminal 1002, which has acquired service session ID information from the various servers such as the music data delivery server 1004, cannot present the service session ID information to the various servers such as the music data delivery server 1004 of an issuance source within the term of validity, it is judged by the various servers such as the music data delivery server 1004 of the issuance source that a communication connection state specified by the service session ID information is disconnected.

Consequently, the various servers such as the music data delivery server 1004 prevent service session ID information issued in the past from being used illegally for user authentication processing and the like by a user who does not have a contract with the operator of the music related service provision system.

In addition, the service session ID information temporarily stored in the authentication information storage unit 1038 is service session ID information issued by the various servers such as the music data delivery server 1004 of an access destination of the client terminal 1002 and the various servers such as the music data delivery server 1004 when the client terminal 1002 and the various servers such as the music data delivery server 1004 performed communication connection for execution of user authentication processing and the like before.

In step SP1011, the control unit 1070 of the music data delivery server 1004 receives the page information acquisition request signal and the service session ID information or the like transmitted from the client terminal 1002 via the network interface 1073 and the communication control unit 1072 sequentially and sends the received service session ID information or the like to the authentication processing unit 1075.

Under the control of the control unit 1070, the authentication processing unit 1075 compares the service session ID information or the like received from the client terminal 1002 and service session ID information or the like temporarily stored in the authentication information storage unit 1077 already to execute user authentication processing.

As a result, when the user using the client terminal 1002 cannot be authenticated as a regular user because, for example, a term of validity of the service session ID information received from the client terminal 1002 has already been expired, the authentication processing unit 1075 judges that an acquisition request for page information for music data delivery from the client terminal 1002 is not a legal request.

Then, when the user using the client terminal 1002 is not authenticated as a regular user by the authentication processing unit 1075, the control unit 1070 transmits authentication error information indicating authentication error and a shop code identifying the music data delivery server 1004 to the client terminal 1002 via the communication control unit 1072 and the network interface 1073 sequentially.

In step SP1012, the control unit 1023 of the client terminal 1002 receives the authentication error information and the shop code, which are transmitted from the music data delivery server 1004, via the network interface 1033 and the communication control unit 1032 sequentially, recognizes that the user is not authenticated as a regular user in the music data delivery server 1004 according to the received authentication error information, and temporarily stores the shop code received from the music data delivery server 1004 in the authentication information storage unit 1038.

Then, the control unit 1023 generates an authentication ticket issuance request signal for requesting issuance of an authentication ticket for accessing the music data delivery server 1004 to the portal server 1003 and transmits the generated authentication ticket issuance request signal to the portal server 1003 together with the shop code of the music data delivery server 1004 and the authentication session ID information or the like, which has already been received from the portal server 1003 and temporarily stored in the authentication information storage unit 1038, via the communication control unit 1032 and the network interface 1033 sequentially.

In step SP1013, the control unit 1050 of the portal server 1003 receives the authentication ticket issuance request signal, the shop code, and the authentication session ID information or the like, which is transmitted from the client terminal 1002, via the network interface 1053 and the communication control unit 1052 sequentially and sends these to the authentication processing unit 1056.

Consequently, under the control of the control unit 1050, the authentication processing unit 1056 compares the authentication session ID information or the like received from the client terminal 1002 and the authentication session ID information or the like temporarily stored in the authentication information storage unit 1057 already to execute user authentication processing.

As a result, for example, when a term of validity of the authentication session ID information received from the client terminal 1002 has already been expired, and it cannot be authenticated that the user using the client terminal 1002 is a regular user, the authentication processing unit 1056 judges that an authentication ticket issuance request from the client terminal 1002 is not a legal request.

Then, when the user using the client terminal 1002 is not authenticated as a regular user by the authentication processing unit 1056, the control unit 1050 transmits authentication error information indicating an authentication error to the client terminal 1002 via the communication control unit 1052 and the network interface 1053 sequentially.

On the other hand, when the authentication processing unit 1056 authenticates the user using the client terminal 1002 as a regular user because, for example, a term of validity of the authentication session ID information received from the client terminal 1002 has not been expired yet, the authentication processing unit 1056 judges that the authentication ticket issuance request from the client terminal 1002 is a legal request.

Then, when the user using the client terminal 1002 is authenticated as a regular user by the authentication processing unit 1056, the control unit 1050 shifts to step SP1018 to be described later.

In step SP1014, when the control unit 1023 of the client terminal 1002 receives the authentication error information transmitted from the portal server 1003 via the network interface 1033 and the communication control unit 1032 sequentially, the control unit 1023 of the client terminal 1002 reads out user ID information, password information, and the like stored in the authentication information storage unit 1038 and transmits the read-out user ID information, password information, and the like to the portal server 1003 via the communication control unit 1032 and the network interface 1033 sequentially.

In step SP1015, the control unit 1050 of the portal server 1003 receives the user ID information, the password information, and the like, which are transmitted from the client terminal 1002, via the network interface 1053 and the communication control unit 1052 sequentially and sends the received user ID information, password information, and the like to the authentication processing unit 1056.

Consequently, under the control of the control unit 1050, the authentication processing unit 1056 detects whether the user ID information, the password information, and the like received from the client terminal 1002 are included in customer information registered in the customer database unit 1054 to execute user authentication processing.

As a result, when the authentication processing unit 1056 authenticates the user using the client terminal 1002 as a regular user, under the control of the control unit 1050, as portal authentication result information, the authentication processing unit 1056 issues authentication session ID information or the like with respect to a communication connection state between the client terminal 1002 and the portal server 1003 at the present point and temporarily stores the authentication session ID information or the like issued to the client terminal 1002 in the authentication information storage unit 1057.

Then, the control unit 1050 transmits the authentication session ID information or the like, which is issued to the client terminal 1002 by the authentication processing unit 1056, via the communication control unit 1052 and the network interface 1053 sequentially to the client terminal 1002.

In step SP1016, the control unit 1023 of the client terminal 1002 receives the authentication session ID information or the like, which is transmitted from the portal server 1003, via the network interface 1033 and the communication control unit 1032 sequentially and temporarily stores the received authentication session ID information or the like in the authentication information storage unit 1038 using the authentication processing unit 1037.

Then, the control unit 1023 generates an authentication ticket issuance request signal for requesting issuance of an authentication ticket to the portal server 1003 again and transmits the generated authentication ticket issuance request signal to the portal server 1003 together with the shop code temporarily stored in the authentication information storage unit 1038 already and the authentication session ID information or the like temporarily stored at this point via the communication control unit 1032 and the network interface 1033 sequentially.

Here, in this embodiment, in the client terminal 1002, a shop code is temporarily stored in the authentication information storage unit 1038. However, the invention is not limited to this, and a shop code is sequentially transmitted and received in executing the processing of steps SP1012 to SP1016 between the client terminal 1002 and the portal server 1003, whereby it is possible to transmit a shop code to the portal server 1003 in step SP1016 even if a shop code is not temporarily stored in the authentication information storage unit 1038 in the client terminal 1002.

In step SP1017, the control unit 1050 of the portal server 1003 receives the authentication ticket issuance request signal, the shop code, and the authentication session ID information or the like, which is transmitted from the client terminal 1002, via the network interface 1053 and the communication control unit 1052 sequentially and sends these to the authentication processing unit 1056.

Consequently, under the control of the control unit 1050, the authentication processing unit 1056 compares the authentication session ID information or the like received from the client terminal 1002 and the authentication session ID information or the like temporarily stored in the authentication information storage unit 1057 already to execute user authentication processing.

As a result, when the authentication processing unit 1056 authenticates that the user using the client terminal 1002 as a regular user because, for example, a term of validity of the authentication session ID information or the like received from the client terminal 1002 has not been expired yet, the authentication processing unit 1056 judges that an authentication ticket issuance request from the client terminal 1002 is a legal request.

Then, when it is authenticated by the authentication processing unit 1056 that the user using the client terminal 1002 is a regular user, the control unit 1050 shifts to the next step SP1018.

In step SP1018, under the control of the control unit 1050, on the basis of the shop code and the authentication ticket issuance request signal received from the client terminal 1002 in step SP1017 described above, the authentication processing unit 1056 issues an authentication ticket or the like, which makes it possible to access the music data delivery server 1004 indicated by the shop code as portal authentication result information.

Then, under the control of the control unit 1050, the authentication processing unit 1056 temporarily stores the issued authentication ticket or the like in the authentication information storage unit 1057 and extends the term of validity of the authentication session ID information or the like issued to the client terminal 1002.

Consequently, the control unit 1050 transmits the authentication ticket or the like to the client terminal 1002 together with the authentication session ID information or the like, for which the term of validity is extended by the authentication processing unit 1056, via the communication control unit 1052 and the network interface 1053 sequentially.

In step SP1019, the control unit 1023 of the client terminal 1002 receives the authentication ticket or the like transmitted from the portal server 1003 and the authentication session ID information or the like, for which the term of validity has been extended, via the network interface 1033 and the communication control unit 1032 sequentially and sends the received authentication session ID information to the authentication processing unit 1037.

Then, the control unit 1023 transmits the authentication ticket or the like received form the portal server 1003 to the music data delivery server 1004 together with an authentication request signal via the communication control unit 1032 and the network interface 1033 sequentially.

In addition, in this case, under the control of the control unit 1023, in the authentication information storage unit 1038, the authentication processing unit 1037 temporarily stores the authentication session ID information or the like, for which the term of validity is extended, received from the portal server 1003 overwriting the authentication session ID information or the like on the authentication session ID information or the like before the term of validity is extended to thereby update the authentication session ID information or the like temporarily stored in the above-described step SP1016 to the authentication session ID information or the like for which the term of validity is extended.

In step SP1020, the control unit 1070 of the music data delivery server 1004 receives the authentication request signal and the authentication ticket or the like, which are transmitted from the client terminal 1002, via the network interface 1073 and the communication control unit 1072 sequentially.

Then, the control unit 1070 transmits the authentication ticket or the like received from the client terminal 1002 to the portal server 1003 together with an authentication ticket confirmation request signal for requesting confirmation of the authentication ticket or the like via the communication control unit 1072 and the network interface 1073 sequentially.

In step SP1021, the control unit 1050 of the portal server 1003 receives the authentication ticket confirmation request signal and the authentication ticket or the like, which are transmitted from the music data delivery server 1004, via the network interface 1053 and the communication control unit 1052 sequentially and sends the received authentication ticket confirmation request signal and authentication ticket or the like to the authentication processing unit 1056.

Then, under the control of the control unit 1050, in response to the authentication ticket confirmation request signal, the authentication processing unit 1056 compares the authentication ticket or the like received from the music data delivery server 1004 and an authentication ticket or the like temporarily stored in the authentication information storage unit 1057 already to execute confirmation processing with respect to the authentication ticket received from the music data delivery server 1004.

As a result, when the authentication ticket or the like received from the music data delivery server 1004 is confirmed as a regular authentication ticket or the like by the authentication processing unit 1056, the control unit 1050 transmits confirmation result information indicated that the authentication ticket or the like is confirmed as a regular authentication ticket or the like to the music data delivery server 1004 via the communication control unit 1052 and the network interface 1053 sequentially.

In step SP1022, the control unit 1070 of the music data delivery server 1004 receives the confirmation result information, which is transmitted from the portal server 1003, via the network interface 1073 and the communication control unit 1072 sequentially and sends the received confirmation result information to the confirmation processing unit 1075.

Consequently, under the control of the control unit 1070, in response to the confirmation result information, the authentication processing unit 1075 issues service session ID information or the like with respect to a communication connection state between the client terminal 1002 and the music data delivery server 1004 at the present point as server authentication result information and temporarily stores the issued service session ID information or the like in the authentication information storage unit 1077.

In addition, the control unit 1070 transmits the service session ID information or the like, which are issued to the client terminal 1002 by the authentication processing unit 1075, to the client terminal 1002 via the communication control unit 1072 and the network interface 1073 sequentially.

In step SP1023, the control unit 1023 of the client terminal 1002 receives the service session ID information or the like, which are transmitted from the music data delivery server 1004, via the network interface 1033 and the communication control unit 1032 sequentially and causes the authentication processing unit 1037 to temporarily store the received service session ID information or the like in the authentication information storage unit 1038.

Consequently, the control unit 1023 transmits a page information acquisition request signal for requesting page information for music data delivery to the music data delivery server 1004 together with the service session ID information or the like, which are received from the music data delivery server 1004 and temporarily stored in the authentication information storage unit 1038, via the communication control unit 1032 and the network interface 1033 sequentially.

In step SP1024, the control unit 1070 of the music data delivery server 1004 receives the page information acquisition request signal and the service session ID information or the like, which are transmitted from the client terminal 1002, via the network interface 1073 and the communication control unit 1072 sequentially and sends the received service session ID information or the like to the authentication processing unit 1075.

Consequently, under the control of the control unit 1070, the authentication processing unit 1675 compares the service session ID information or the like received from the client terminal 1002 and the service session ID information or the like, which have already been issued to the client terminal 1002 and temporarily stored in the authentication information storage unit 1077 in step SP1022 described above, to execute user authentication processing.

As a result, when the authentication processing unit 1075 authenticates the user using the client terminal 1002 as a regular user because, for example, a term of validity of the service session ID information or the like received from the client terminal 1002 has not been expired yet, the authentication processing unit 1075 judges that the acquisition request for page information for music data delivery from the client terminal 1002 is a legal request.

Then, when the user using the client terminal 1002 is authenticated as a regular user by the authentication processing unit 1075, the control unit 1070 shifts to the next step SP1025.

In step SP1025, the control unit 1070 reads out the page information for music data delivery requested to be acquired by the user from the page information storage unit 1076 and causes the authentication processing unit 1075 to extend the term of validity of the service session ID information or the like issued to the client terminal 1020.

Then, the control unit 1070 transmits the page information for music data delivery read out from the page information storage unit 1076 to the client terminal 1002 together with the service session ID information or the like, for which the term of validity are extended by the authentication processing unit 1075, via the communication control unit 1072 and the network interface 1073 sequentially.

In step SP1026, the control unit 1023 of the client terminal 1002 receives the page information for music data delivery transmitted from the music data delivery server 1004 and the service session ID information or the like, for which the term of validity is extended, via the network interface 1033 and the communication control unit 1032 sequentially, sends the received page information for music data delivery to the page information generation unit 1036, and sends the service session ID information or the like received from the music data deliver server 1004 to the authentication processing unit 1037.

Consequently, under the control of the control unit 1023, in the authentication information storage unit 1038, the authentication processing unit 1037 temporarily stores the service session ID information or the like, for which the term of validity is extended, received from the music data delivery server 1004 overwriting the service session ID information or the like on the service session ID information or the like before the term of validity is extended to thereby update the service session ID information or the like temporarily stored in the above-described step SP1023 to the service session ID information or the like for which the term of validity is extended.

In addition, the page information generation unit 1036 generates video data based on the page information for music data delivery and sends the generated video data to the display control unit 1024.

Consequently, the display control unit 1024 applies digital analog conversion processing to video data given from the page information generation unit 1036 and sends an obtained analog video signal to the display unit 1025 to thereby display a page for music data delivery on the display unit 1025 as a video based on the analog video signal.

Next, a first information registration processing procedure at the time when the client terminal 1002 registers registration information of a user using the client terminal 1002 in the music data deliver server 1004 will be explained using a sequence chart shown in FIG. 23.

Note that, prior to execution of such a first information registration processing procedure, the control unit 1050 of the portal server 1003 registers registration information including various kinds of information such as individual information like a name, an address, a telephone number, an email address, and a password of a user using the client terminal 1002 in the customer data base unit 1054 to thereby permit the user, who has completed registration of the registration information, to use the portal server 1003. In other words, the control unit 1050 of the portal server 1003 allows the user using the client terminal 1002 to receive a service from the portal server 1003.

In step SP1100, for example, when a control command for selecting a part of a top page managed by the music data delivery server 1004 displayed on the display unit 1025 is inputted from the input processing unit 1021, the control unit 1023 of the client terminal 1002 generates a registration screen acquisition request signal for requesting to acquire an information registration screen that is used for registration of the registration information of the user in allowing the user to receive a music data delivery service from the music data delivery server 1004.

Then, the control unit 1023 transmits the registration screen acquisition request signal to the music data delivery server 1004 together with the service session ID information or the like, which has already been issued by the music data delivery server 1004 and temporarily stored in the authentication information storage unit 1038, via the communication control unit 1032 and the network interface 1033 sequentially.

In step SP1101, the control unit 1070 of the music data delivery server 1004 receives the registration screen acquisition request signal and the service session ID information or the like, which are transmitted from the client terminal 1002, via the network interface 1073 and the communication control unit 1072 sequentially and sends the received service session ID information or the like to the authentication processing unit 1075.

Consequently, under the control of the control unit 1070, the authentication processing unit 1075 compares the service session ID information or the like received from the client terminal 1002 and the service session ID information or the like temporarily stored in the authentication information storage unit 1077 already to execute user authentication processing.

As a result, when the user using the client terminal 1002 is authenticated as a regular user by the authentication processing unit 1075, the control unit 1070 causes the authentication processing unit 1075 to extend the term of validity of the service session ID information or the like issued to the client terminal 1002 and shifts to the next step SP1102.

In step SP1102, the control unit 1070 transmits information registration screen data of an information registration screen stored in, for example, the customer database unit 1074 or the page information storage unit 1076 to the client terminal 1002 together with the service session ID information or the like, for which the term of validity is extended by the authentication processing unit 1075, via the communication control unit 1072 and the network interface 1073 sequentially.

In step SP1103, the control unit 1023 of the client terminal 1002 receives the information registration screen data and the service session ID information or the like with the extended term of validity, which are transmitted from the music data delivery server 1004, via the network interface 1033 and the communication control unit 1032 sequentially.

Then, the control unit 1023 sends the service session ID information or the like received from the music data delivery server 1004 to the authentication processing unit 1037.

Consequently, under the control of the control unit 1023, in the authentication information storage unit 1038, the authentication processing unit 1037 temporarily stores the service session ID information or the like, for which the term of validity is extended, received from the music data delivery server 1004 overwriting the service session ID information or the like on the service session ID information or the like before the term of validity is extended to thereby update contents of the service session ID information or the like temporarily stored in the authentication information storage unit 1038.

In addition, the control unit 1023 sends the information registration screen data received from the music data delivery server 1004 to the display unit 1025 via the display control unit 1024 to thereby cause the display unit 1025 to display an information registration screen based on the information registration screen data and shifts to the next step SP1104.

Incidentally, at this point, none of the various kinds of information constituting the registration information of the user is inputted in plural input columns in the information registration screen displayed on the display unit 1025.

In step SP1104, the control unit 1023 of the client terminal 1002 generates an input support request signal that is capable of specifying a user using the client terminal 1002 (i.e., stores information capable of specifying a user such as user ID information) and requests input support for registration information of the user to the information registration screen displayed on the display unit 1025.

Then, the control unit 1023 transmits the input support request signal to the portal server 1003 together with the authentication session ID information or the like, which has already been issued by the portal server 1003 and temporarily stored in the authentication information storage unit 1038, via the communication control unit 1032 and the network interface 1033 sequentially.

In step SP1105, the control unit 1050 of the portal server 1003 receives the input support request signal and the authentication session ID information or the like, which are transmitted from the client terminal 1002, via the network interface 1053 and the communication control unit 1052 sequentially and sends the received authentication session ID information or the like to the authentication processing unit 1056.

Consequently, under the control of the control unit 1050, the authentication processing unit 1056 compares the authentication session ID information or the like received from the client terminal 1002 and the authentication session ID information or the like temporarily stored in the authentication information storage unit 1057 already to execute user authentication processing.

As a result, for example, when the authentication session ID information or the like received from the client terminal 1002 is within a term of validity and the user using the client terminal 1002 is authenticated as a regular user by the authentication processing unit 1056, the control unit 1050 shifts to the next step SP1106.

In step SP1106, the control unit 1050 retrieves registration information of the user, who requested input support for registration information, out of plural pieces of registration information in the customer database unit 1054 on the basis of the input support request signal received from the client terminal 1002.

In addition, the control unit 1050 causes the authentication processing unit 1056 to extend the term of validity of the authentication session ID information or the like issued to the client terminal 1002 and shifts to the next step SP1107.

In step SP1107, the control unit 1050 returns the retrieved registration information to the client terminal 1002 together with the authentication session ID information or the like, for which the term of validity is extended by the authentication processing unit 1056, via the communication control unit 1052 and the network interface 1053 sequentially.

In step SP1108, the control unit 1023 of the client terminal 1002 receives the registration information transmitted from the portal server 1003 and the authentication session ID information or the like, for which the term of validity is extended, via the network interface 1033 and the communication control unit 1032 sequentially.

Then, the control unit 1023 automatically inputs the various kinds of information constituting the registration information received from the portal server 1003 in the respective input columns in the information registration screen displayed on the display unit 1025 and shifts to the next step SP1109.

Incidentally, in such step SP1108, the control unit 1023 sends the authentication session ID information or the like received from the portal server 1003 to the authentication processing unit 1037. Consequently, under the control of the control unit 1023, in the authentication information storage unit 1038, the authentication processing unit 1037 temporarily stores the authentication session ID information or the like, for which the term of validity is extended, received from the portal server 1003 overwriting the authentication session ID information or the like on the authentication session ID information or the like before the term of validity is extended to thereby update contents of the authentication session ID information or the like temporarily stored in the authentication information storage unit 1038 already.

In step SP1109, when input columns, in which information is not inputted, are present in the information registration screen even if the respective pieces of information are automatically inputted to the respective input columns in the information registration screen, if information is manually inputted in the input columns, in which information is not inputted, on the information registration screen and a control command corresponding to a character string indicating the manually inputted information is inputted from the input processing unit 1021, whereby input of information in the input columns in the information registration screen is completed, the control unit 1023 gathers the various kinds of information, which are completed to be inputted in the respective input columns in the information registration screen, into registration information for registration with respect to the music data delivery server 1004.

Then, the control unit 1023 transmits such registration information to the music data delivery server 1004 together with the service session ID information or the like, which is received from the music data delivery server 1004 and temporarily stored in the authentication information storage unit 1038 in step SP1103 described above, via the communication control unit 1032 and the network interface 1033 sequentially.

In step SP1110, the control unit 1070 of the music data delivery server 1004 receives the registration information and the service session ID information or the like, which are transmitted from the client terminal 1002, via the network interface 1073 and the communication control unit 1072 sequentially and sends the received service session ID information or the like to the authentication processing unit 1075.

Consequently, under the control of the control unit 1070, the authentication processing unit 1075 compares the service session ID information or the like received from the client terminal 1002 and the service session ID information or the like temporarily stored in the authentication information storage unit 1077 already to execute user authentication processing.

As a result, when the user using the client terminal 1002 is authenticated as a regular user by the authentication processing unit 1075, the control unit 1070 shifts to the next step SP1111.

In step SP1111, the control unit 1070 registers the registration information received from the client terminal 1002 in the customer database unit 1074 to thereby update registered contents in the customer database unit 1074 and shifts to the next step SP1112.

In step SP1112, the control unit 1070 causes the authentication processing unit 1075 to extend the term of validity of the service session ID information or the like issued to the client terminal 1002.

Then, the control unit 1070 returns registration completion screen data, which indicates completion of registration of registration information for the user, to the client terminal 1002 together with the service session ID information or the like, for which the term of validity is extended by the authentication processing unit 1075, via the communication control unit 1072 and the network interface 1073 sequentially.

In step SP1113, the control unit 1023 of the client terminal 1002 receives the registration completion screen data and the service session ID information or the like with the term of validity extended, which are transmitted from the music data delivery server 1004, via the network interface 1033 and the communication control unit 1032 sequentially.

Then, the control unit 1023 sends the service session ID information or the like received from the music data delivery server 1004 to the authentication processing unit 1037.

Consequently, under the control of the control unit 1023, in the authentication information storage unit 1038, the authentication processing unit 1037 temporarily stores the service session ID information or the like, for which the term of validity is extended, received from the music data delivery server 1004 overwriting the service session ID information or the like on the service session ID information or the like before the term of validity is extended to thereby update contents of the service session ID information or the like temporarily stored in the authentication information storage unit 1038 already.

In addition, the control unit 1023 sends the registration completion screen data received from the music data delivery server 1004 to the display unit 1025 via the display control unit 1024 to thereby cause the display unit 1025 to display a registration completion screen based on the registration completion screen data.

Consequently, with the registration completion screen displayed on the display unit 1025, the control unit 1023 notifies the user that the registration of the registration information in the music data delivery server 1004 has been completed.

Figure 23:
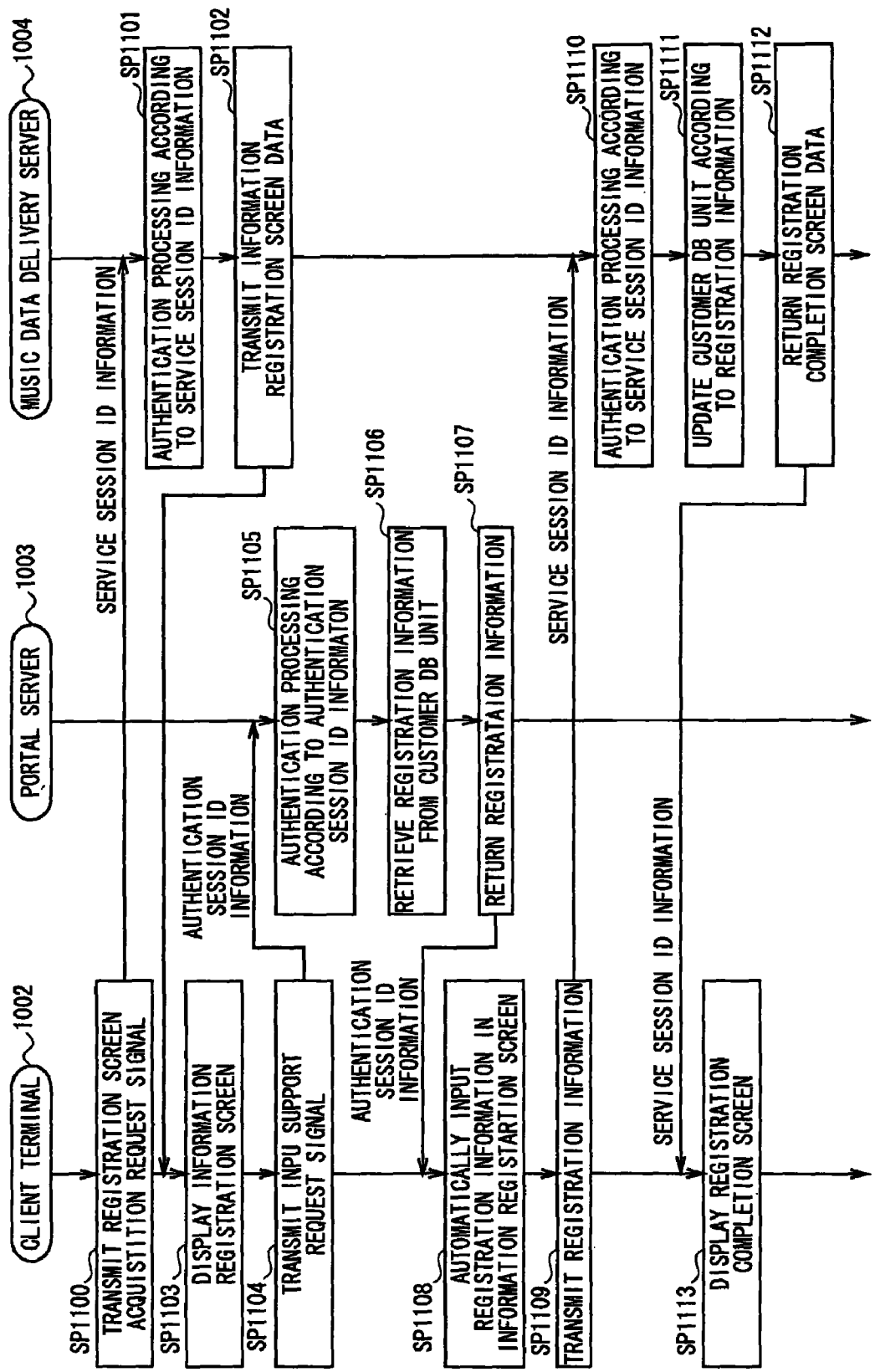
FIG. 23 is a sequence chart showing a first information registration processing procedure.
Figure 24:
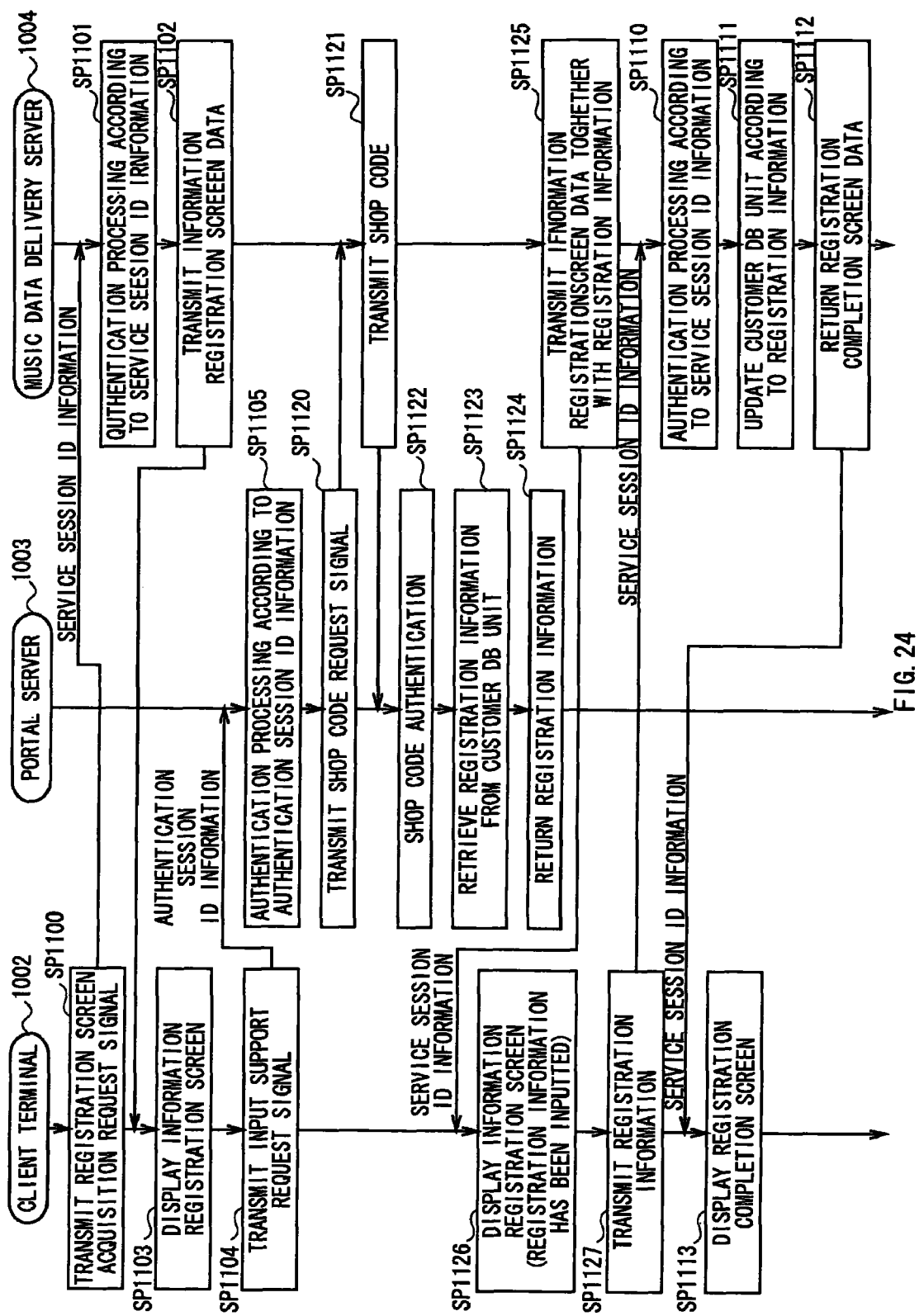
FIG. 24 is a sequence chart showing a second information registration processing procedure.

Next, a second information registration processing procedure at the time when the client terminal 1002 registers registration information or the like of a user using the client terminal 1002 in the music data deliver server 1004 will be explained using a sequence chart shown in FIG. 24 in which parts corresponding to those in FIG. 23 are denoted by the identical reference numerals and signs.

Note that, concerning such a second information registration processing procedure, again, the control unit 1050 of the portal server 1003 registers registration information on the user using the client terminal 1002 in the customer database unit 1054 in advance to thereby permit the user, who has completed registration of the registration information, to use the portal server 1003. In other words, the control unit 1050 of the portal server 1003 allows the user using the client terminal 1002 to receive a service from the portal server 1003.

In this case, in the second information registration processing procedure, after the client terminal 1002 and the music data delivery server 1004 execute the same processing as steps SP1100 to SP1104 described above sequentially, the portal server 1003 executes the same processing as step SP1105 described above.

Then, in step SP1005, when a user using the client terminal 1002 is authenticated as a regular user by the authentication processing unit 1056, the control unit 1050 of the portal server 1003 shifts to the next step SP1120.

In step SP1120, the control unit 1050 transmits a shop code request signal for requesting to acquire a shop code, which is capable of identifying the music data delivery server 1004, to the music data delivery server 1004 via the communication control unit 1052 and the network interface 1053 sequentially.

In step SP1121, the control unit 1070 of the music data delivery server 1004 receives the shop code request signal, which is transmitted from the portal server 1003, via the network interface 1073 and the communication control unit 1072 sequentially.

Then, in response to such a shop code request signal, the control unit 1070 transmits a shop code, which is capable of identifying the music data delivery server 1004 to which the control unit 1070 belongs, to the portable server 1003 via the communication control unit 1072 and the network interface 1073 already.

In step SP1122, the control unit 1050 of the portal server 1003 receives the shop code, which is sent from the music data delivery server 1004, via the network interface 1053 and the communication control unit 1052 sequentially and sends the received shop code to the authentication processing unit 1056.

For example, the authentication processing unit 1056 stores a shop code of the music data delivery server 1004 in the authentication information storage unit 1057 in advance.

Therefore, under the control of the control unit 1050, the authentication processing unit 1056 compares the shop code received from the music data delivery server 1004 and the shop code stored in the authentication information storage unit 1057 in advance to execute shop code authentication processing.

As a result, when the authentication processing unit 1056 authenticates the shop code received from the music data delivery server 1004 as a regular shop code because both the shop codes coincide with each other, the authentication processing unit 1056 judges that the music data delivery server 1004 currently communicating with the portal server 1003 is a regular music data delivery server 1004 participating in the music related service provision system.

Then, when it is judged by the authentication processing unit 1056 that the music data delivery server 1004 currently communicating with the portal server 1003 is a regular server in a system 1, the control unit 1050 shifts to the next step SP1123.

In step SP1123, the control unit 1050 retrieves registration information of a user, who has requested input support for registration information, out of plural pieces of registration information in the customer database unit 1054 on the basis of the input support request signal received from the client terminal 1002 in step SP1105 described above and shifts to the next step SP1124.

In step SP1124, the control unit 1050 transmits the retrieved registration information to the music data delivery server 1004 via the communication control unit 1052 and the network interface 1053 sequentially.

In step SP1125, the control unit 1070 of the music data delivery server 1004 receives the registration information, which is transmitted from the portable server 1003, via the network interface 1073 and the communication control unit 1072 sequentially.

Then, the control unit 1070 causes the authentication processing unit 1075 extends the term of validity of the service session ID information or the like issued to the client terminal 1002.

Consequently, the control unit 1070 transmits the registration information received from the portal server 1003 to the client terminal 1002 together with, for example, the information registration screen data stored in the customer database unit 1074 or the page information storage unit 1076 in advance and the service session ID information or the like, for which the term of validity is extended by the authentication processing unit 1075, via the communication control unit 1072 and the network interface 1073 sequentially.

In step SP1126, the control unit 1023 of the client terminal 1002 receives the registration information, the information registration screen data, and the service session ID information or the like with the extended term of validity, which are transmitted from the music data delivery server 1004, via the network interface 1033 and the communication control unit 1032 sequentially.

Then, the control unit 1023 sends the registration information and the information registration screen data received from the music data delivery server 1004 to the display unit 1025 via the display control unit 1024.

Consequently, the control unit 1023 displays an information registration screen based on the information registration screen data on the display unit 1025 in a state in which the various kinds of information constituting the registration information received from the music data delivery server 1004 are automatically inputted in respective input columns in the information registration screen and shifts to the next step SP1127.

Incidentally, in such step SP1126, the control unit 1023 sends the service session ID information or the like received from the music data delivery server 1004 to the authentication processing unit 1037. Consequently, under the control of the control unit 1023, in the authentication information storage unit 1038, the authentication processing unit 1037 temporarily stores the service session ID information or the like, for which the term of validity is extended, received from the music data delivery server 1004 overwriting the service session ID information or the like on the service session ID information or the like before the term of validity is extended to thereby update contents of the service session ID information or the like temporarily stored in the authentication information storage unit 1038 already.

Note that in such step SP1126, the control unit 1023 of the client terminal 1002 automatically inputs the various kinds of information constituting the registration information in the respective input columns in the information registration screen. However, the invention is not limited to this. In step SP1125 described above, the music data delivery server 1004 may transmit the information registration screen data to the client terminal 1002 in a state in which the various kinds of information constituting the registration information are automatically inputted to the respective input columns in the information registration screen.

In step SP1127, when input columns, in which information is not inputted, are present in the information registration screen even if the respective pieces of information are automatically inputted to the respective input columns in the information registration screen, if information is manually inputted in the input columns, in which information is not inputted, on the information registration screen and a control command corresponding to a character string indicating the manually inputted information is inputted from the input processing unit 1021, whereby input of information in the input columns in the information registration screen is completed, the control unit 1023 gathers the various kinds of information, which are completed to be inputted in the respective input columns in the information registration screen, into registration information for registration in the music data delivery server 1004.

Then, the control unit 1023 transmits such registration information to the music data delivery server 1004 together with the service session ID information or the like, which is received from the music data delivery server 1004 and temporarily stored in the authentication information storage unit 1038 in step SP1126 described above, via the communication control unit 1032 and the network interface 1033 sequentially.

Subsequently, in the second information registration processing procedure, the music data delivery server 1004 and the client terminal 1002 execute the same processing as steps SP1110 to SP1113 described above sequentially.

Consequently, as in the first information registration processing procedure described above, with the registration completion screen displayed on the display unit 1025 in step SP1113, the control unit 1023 of the client terminal 1002 notifies the user that the registration of the registration information in the music data delivery server 1004 has been completed.

Figure 25:
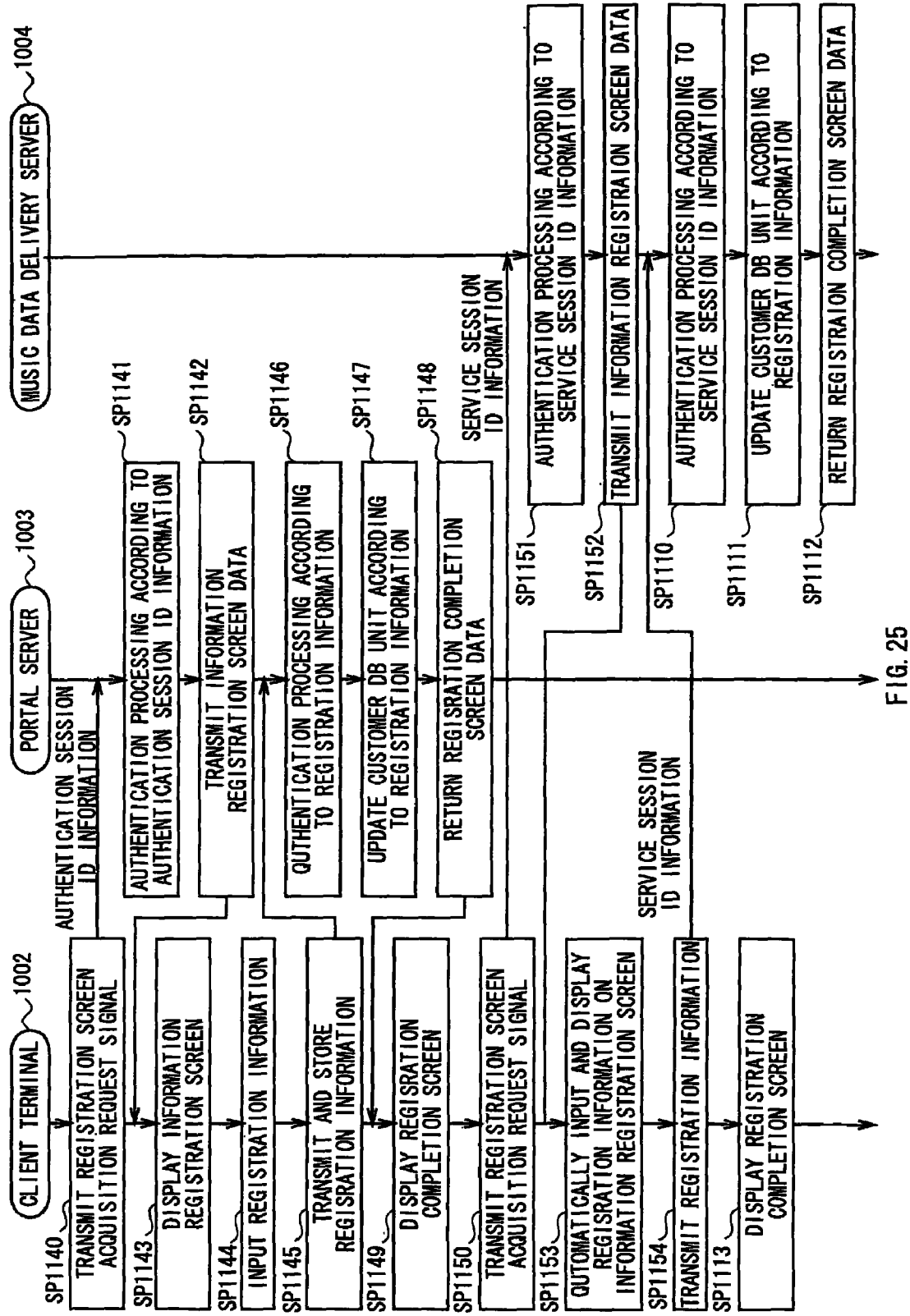
FIG. 25 is a sequence chart showing a third information registration processing procedure.

Next, a third information registration processing procedure at the time when the client terminal 1002 registers registration information or the like of a user using the client terminal 1002 in the music data deliver server 1004 will be explained using a sequence chart shown in FIG. 25 in which parts corresponding to those in FIG. 23 are denoted by the identical reference numerals and signs.

In step SP1140, for example, when a control command for selecting a part of a page of the portal server 1003 displayed on the display unit 1025 is inputted from the input processing unit 1021, the control unit 1023 of the client terminal 1002 generates a registration screen acquisition request signal for requesting to acquire an information registration screen that is used for registration of the registration information of the user in allowing the user to use the portal server 1003.

Then, the control unit 1023 transmits the registration screen acquisition request signal to the portal server 1003 together with the authentication session ID information or the like, which has already been issued by the portal server 1003 and temporarily stored in the authentication information storage unit 1038, via the communication control unit 1032 and the network interface 1033 sequentially.

In step SP1141, the control unit 1050 of the portal server 1003 receives the registration screen acquisition request signal and the authentication session ID information or the like, which are transmitted from the client terminal 1002, via the network interface 1053 and the communication control unit 1052 sequentially and sends the received authentication session ID information or the like to the authentication processing unit 1056.

Consequently, under the control of the control unit 1050, the authentication processing unit 1056 compares the authentication session ID information or the like received from the client terminal 1002 and the authentication session ID information or the like temporarily stored in the authentication information storage unit 1057 already to execute user authentication processing.

As a result, when the user using the client terminal 1002 is authenticated as a regular user by the authentication processing unit 1056, the control unit 1050 causes the authentication processing unit 1056 to extend the term of validity of the authentication session ID information or the like issued to the client terminal 1002 and shifts to the next step SP1142.

In step SP1142, the control unit 1050 transmits information registration screen data of an information registration screen stored in, for example, the customer database unit 1054 or the page information storage unit 1055 to the client terminal 1002 together with the authentication session ID information or the like, for which the term of validity is extended by the authentication processing unit 1056, via the communication control unit 1052 and the network interface 1053 sequentially.

In step SP1143, the control unit 1023 of the client terminal 1002 receives the information registration screen data and the authentication session ID information or the like with the extended term of validity, which are transmitted from the portal server 1003, via the network interface 1033 and the communication control unit 1032 sequentially.

Then, the control unit 1023 sends the authentication session ID information or the like received from the portal server 1003 to the authentication processing unit 1037.

Consequently, under the control of the control unit 1023, in the authentication information storage unit 1038, the authentication processing unit 1037 temporarily stores the authentication session ID information or the like, for which the term of validity is extended, received from the portal server 1003 overwriting the authentication session ID information or the like on the authentication session ID information or the like before the term of validity is extended to thereby update contents of the authentication session ID information or the like temporarily stored in the authentication information storage unit 1038 already.

In addition, the control unit 1023 sends the information registration screen data received from the portal server 1003 to the display unit 1025 via the display control unit 1024 to thereby cause the display unit 1025 to display an information registration screen based on the information registration screen data and shifts to the next step SP1144.

Incidentally, at this point, none of the various kinds of information constituting the registration information of the user is inputted in plural input columns in the information registration screen displayed on the display unit 1025.

In step SP1144, when a control command corresponding to a character string indicating the various kinds of information constituting the registration information of the user is inputted from the input processing unit 1021 in response to an operation with respect to the operation input unit 1020, the control unit 1023 of the client terminal 1002 inputs the various kinds of information constituting the registration information in the respective input columns in the information registration screen in response to the inputted control command and shifts to the next step SP1145.

In step SP1145, the control unit 1023 gathers the various kinds of information, which are completed to be inputted in the respective input columns in the information registration screen displayed on the display unit 1025, into registration information and transmits the registration information to the portal server 1003 together with the authentication session ID information or the like, which are received from the portal server 1003 and temporarily stored in the authentication information storage unit 1038 already, via the communication control unit 1032 and the network interface 1033 sequentially. In addition, at this point, the control unit 1023 stores such registration information in the storage medium 1029 or the like.

In step SP1146, the control unit 1050 of the portal server 1003 receives the registration information and the authentication session ID information or the like, which are transmitted from the client terminal 1002, via the network interface 1053 and the communication control unit 1052 sequentially and sends the received authentication session ID information or the like to the authentication processing unit 1056.

Consequently, under the control of the control unit 1050, the authentication processing unit 1056 compares the authentication session ID information or the like received from the client terminal 1002 and the authentication session ID information or the like temporarily stored in the authentication information storage unit 1057 already to execute user authentication processing.

As a result, for example, when the authentication session ID information received from the client terminal 1002 is within the term of validity and the user using the client terminal 1002 is authentication as a regular user by the authentication processing unit 1056, the control unit 1050 shifts to the next step SP1147.

In step SP1147, the control unit 1050 registers the registration information received from the client terminal 1002 in the customer database unit 1054 to thereby update registered contents in the customer database unit 1054 and shifts to the next step SP1148.

In step 1148, the control unit 1050 extends the term of validity of the authentication session ID information or the like issued to the client terminal 1002 by the authentication processing unit 1056.

Then, the control unit 1050 returns registration completion screen data, which indicates completion of registration of registration information for the user, to the client terminal 1002 together with the authentication session ID information or the like, for which the term of validity is extended by the authentication processing unit 1056, via the communication control unit 1052 and the network interface 1053 sequentially.

In step SP1149, the control unit 1023 of the client terminal 1002 receives the registration completion screen data and the authentication session ID information or the like with the term of validity extended, which are transmitted from the portal server 1003, via the network interface 1033 and the communication control unit 1032 sequentially.

Then, the control unit 1023 sends the registration completion screen data received from the portal server 1003 to the display unit 1025 via the display control unit 1024 to thereby cause the display unit 1025 to display a registration completion screen based on the registration completion screen data.

Consequently, with the registration completion screen displayed on the display unit 1025, the control unit 1023 notifies the user that the registration of the registration information in the portal server 1003 has been completed and shifts to the next step SP1150.

In step SP1150, when a control command indicating registration request of registration information for the user with respect to the music data delivery server 1004 is inputted from the input processing unit 1021, the control unit 1023 generates a registration screen acquisition request signal for requesting to acquire an information registration screen used for the registration of the registration information of the user in allowing the user to use the music data delivery server 1004.

Then, the control unit 1023 transmits the registration screen acquisition request signal to the music data delivery server 1004 together with the service session ID information or the like, which is issued by the music data delivery server 1004 and temporarily stored in the authentication information storage unit 1038 already, via the communication control unit 1032 and the network interface 1033 sequentially.

In step SP1151, the control unit 1070 of the music data delivery server 1004 receives the registration screen acquisition request signal and the service session ID information or the like, which are transmitted from the client terminal 1002, via the network interface 1073 and the communication control unit 1072 sequentially and sends the received service session ID information or the like to the authentication processing unit 1075.

Consequently, under the control of the control unit 1070, the authentication processing unit 1075 compares the service session ID information or the like received from the client terminal 1002 and the service session ID information or the like temporarily stored in the authentication information storage unit 1077 already to execute user authentication processing.

As a result, when the user using the client terminal 1002 is authenticated as a regular user by the authentication processing unit 1075, the control unit 1070 causes the authentication processing unit 1075 to extend the term of validity of the service session ID information or the like issued to the client terminal 1002 and shifts to the next step SP1152.

In step SP1152, the control unit 1070 transmits the information registration screen data of the information registration screen stored in, for example, the customer database unit 1074 or the page information storage unit 1076 to the client terminal 1002 together with the service session ID information or the like, for which the term of validity is extended by the authentication processing unit 1075, via the communication control unit 1072 and the network interface 1073 sequentially.

In step SP1153, the control unit 1023 of the client terminal 1002 receives the information registration screen data and the service session ID information or the like with the extended term of validity, which are transmitted from the music data delivery server 1004, via the network interface 1033 and the communication control unit 1032 sequentially.

At this point, the control unit 1023 sends the service session ID information or the like received from the music data delivery server 1004 to the authentication processing unit 1037. Consequently, under the control of the control unit 1023, in the authentication information storage unit 1038, the authentication processing unit 1037 temporarily stores the service session ID information or the like, for which the term of validity is extended, received from the music data delivery server 1004 overwriting the service session ID information or the like on the service session ID information or the like before the term of validity is extended to thereby update contents of the service session ID information or the like temporarily stored in the authentication information storage unit 1038 already.

In addition, the control unit 1023 sends the information registration screen data received from the music data delivery server 1004 to the display unit 1025 via the display control unit 1024 to thereby cause the display unit 1025 to display an information registration screen based on the information registration screen data.

Then, the control unit 1023 automatically inputs and displays various kinds of information constituting the registration information, which is stored in the storage medium 1029 or the like in step SP1145 described above, in respective input columns in the information registration screen displayed on the display unit 1025, and shifts to the next step SP1154.

In step SP1154, when input columns, in which information is not inputted, are present in the information registration screen even if the respective pieces of information are automatically inputted to the respective input columns in the information registration screen, if information is manually inputted in the input columns, in which information is not inputted, on the information registration screen and a control command corresponding to a character string indicating the manually inputted information is inputted from the input processing unit 1021, whereby input of information in the input columns in the information registration screen is completed, the control unit 1023 gathers the various kinds of information, which are completed to be inputted in the respective input columns in the information registration screen, into registration information for registration in the music data delivery server 1004.

Then, the control unit 1023 transmits such registration information to the music data delivery server 1004 together with the service session ID information or the like, which is received from the music data delivery server 1004 and temporarily stored in the authentication information storage unit 1038 in step SP1153 described above, via the communication control unit 1032 and the network interface 1033 sequentially.

Subsequently, in the third information registration processing procedure, the music data delivery server 1004 and the client terminal 1002 execute the same processing as steps SP1110 to SP1113 described above sequentially.

Consequently, as, in the first information registration processing procedure described above, with the registration completion screen displayed on the display unit 1025 in step SP1113, the control unit 1023 of the client terminal 1002 notifies the user that the registration of the registration information in the music data delivery server 1004 has been completed.

Figure 26:
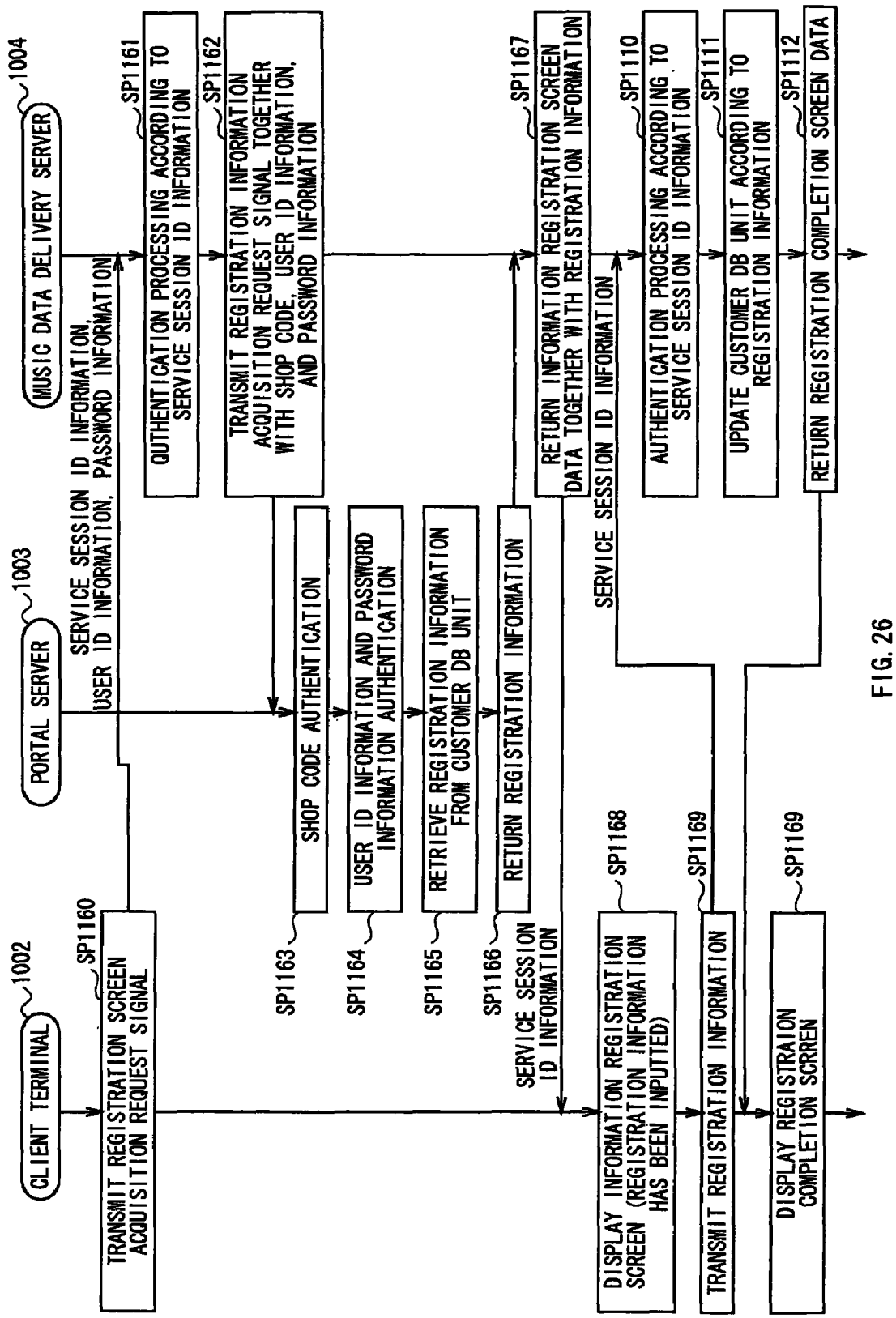
FIG. 26 is a sequence chart showing a fourth information registration processing procedure.

Next, a fourth information registration processing procedure at the time when the client terminal 1002 registers registration information of a user using the client terminal 1002 in the music data deliver server 1004 will be explained using a sequence chart shown in FIG. 26 in which parts corresponding to those in FIG. 23 are denoted by the identical reference numerals and signs.

Note that, as in the first and the second information registration processing procedures described above, the control unit 1050 of the portable server 1003 registers registration information of a user using the client terminal 1002 in the customer database unit 1054 to thereby execute such a fourth information registration processing procedure in a state in which a user, who has completed registration of the registration information, is allowed to use the portable server 1003.

In step SP1160, for example, when a control command for selecting a part of a top page managed by the music data delivery server 1004 displayed on the display unit 1025 is inputted from the input processing unit 1021, the control unit 1023 of the client terminal 1002 generates a registration screen acquisition request signal for requesting to acquire an information registration screen that is used for registration of the registration information of the user in allowing the user to use the music data delivery server 1004.

Then, the control unit 1023 transmits the registration screen acquisition request signal to the music data delivery server 1004 together with user ID information, password information, and the like, which are stored in the authentication information storage unit 1038, and the service session ID information or the like, which has already been issued by the music data delivery server 1004 and temporarily stored in the authentication information storage unit 1038, via the communication control unit 1032 and the network interface 1033 sequentially.

In step SP1161, the control unit 1070 of the music data delivery server 1004 receives the registration screen acquisition request signal, the user ID information, the password information, and the like, and the service session ID information or the like, which are transmitted from the client terminal 1002, via the network interface 1073 and the communication control unit 1072 sequentially and sends the received service session ID information or the like to the authentication processing unit 1075.

Consequently, under the control of the control unit 1070, the authentication processing unit 1075 compares the service session ID information or the like received from the client terminal 1002 and the service session ID information or the like temporarily stored in the authentication information storage unit 1077 already to execute user authentication processing.

As a result, when the user using the client terminal 1002 is authenticated as a regular user by the authentication processing unit 1075, the control unit 1070 causes the authentication processing unit 1075 to extend the term of validity of the service session ID information or the like issued to the client terminal 1002 and shifts to the next step SP1162.

In step SP1162, the control unit 1070 generates a registration information acquisition request signal for requesting to acquire registration information of the user using the client terminal 1002 that is already registered in the portal server 1003.

Then, the control unit 1070 transmits such a registration information acquisition request signal to the portal server 1003 together with a shop code, which is capable of identifying the music data delivery server 1004 to which the control unit 1070 belongs, and the user ID information, the password information, and the like, which are received from the client terminal 1002, via the communication control unit 1072 and the network interface 1073 sequentially.

In step SP1163, the control unit 1050 of the portal server 1003 receives the registration information acquisition request signal, the shop code, and the user ID information, the password information, and the like, which are transmitted from the music data delivery server 1004, via the network interface 1053 and the communication control unit 1052 sequentially and sends the received shop code, and user ID information, password information, and the like to the authentication processing unit 1056.

The authentication processing unit 1056 stores, for example, a shop code of the music data delivery server 1004 in the authentication information storage unit 1057 in advance.

Therefore, first, under control of the control unit 1050, the authentication processing unit 1056 compares the shop code received from the music delivery server 1004 and the shop code stored in the authentication information storage unit 1057 in advance to execute shop code authentication processing.

As a result, when the authentication processing unit 1056 authenticates the shop code received from the music data delivery server 1004 as a regular shop code because both the shop codes coincide with each other, the authentication processing unit 1056 judges that the music data delivery server 1004 currently communicating with the portal server 1003 is a regular music data delivery server 1004 participating in the music related service provision system.

Then, after authenticating the music data delivery server 1004 according to the shop code, in the next step SP1164, under the control of the control unit 1050, the authentication processing unit 1056 subsequently compares the user ID information, the password information, and the like received from the music data delivery server 1004 and the customer information registered in the customer database unit 1054 to execute user authentication processing.

As a result, when the user, who has requested to register the registration information in the music data delivery server 1004, is authenticated as a regular user by the authentication processing unit 1056, the control unit 1050 shifts to the next step SP1165.

In step SP1165, in response to the registration information acquisition request signal received from the music data delivery server 1004, the control unit 1050 retrieves registration information of the user, who has requested registration in the music data delivery server 1004 (i.e., registration information of a user who has already registered in the portal server 1003) out of plural pieces of registration information in the customer database unit 1054 on the basis of the user ID information, the password information, and the like and shifts to the next step SP1166.

In step SP1166, the control unit 1050 transmits the retrieved registration information to the music data delivery server 1004 via the communication control unit 1052 and the network interface 1053 sequentially.

In step SP1167, the control unit 1070 of the music data delivery server 1004 receives the registration information, which is transmitted from the portable server 1003, via the network interface 1073 and the communication control unit 1072 sequentially.

Then, the control unit 1070 causes the authentication processing unit 1075 to extend the term of validity of the service session ID information or the like issued to the client terminal 1002.

Consequently, the control unit 1070 transmits the registration information received from the portal server 1003 to the client terminal 1002 together with information registration screen data stored in, for example, the customer database unit 1074 or the page information storage unit 1076 in advance and the service session ID information or the like, for which the term of validity is extended by the authentication processing unit 1075, via the communication control unit 1072 and the network interface 1073 sequentially.

In step SP1168, the control unit 1023 of the client terminal 1002 receives the registration information, the information registration screen data, and the service session ID information or the like with the extended term of validity, which are transmitted from the music data delivery server 1004, via the network interface 1033 and the communication control unit 1032 sequentially.

Then, the control unit 1023 sends the registration information and the information registration screen data received from the music data delivery server 1004 to the display unit 1025 via the display control unit 1024.

Consequently, the control unit 1023 displays an information registration screen based on the information registration screen data on the display unit 1025 in a state in which various pieces of information constituting the registration information received from the music data delivery server 1004 are automatically inputted in respective input columns in the information registration screen and shifts to the next step SP1169.

Incidentally, in such step SP1168, the control unit 1023 sends the service session ID information or the like received from the music data delivery server 1004 to the authentication processing unit 1037. Consequently, under the control of the control unit 1023, in the authentication information storage unit 1038, the authentication processing unit 1037 temporarily stores the service session ID information or the like, for which the term of validity is extended, received from the music data delivery server 1004 overwriting the service session ID information or the like on the service session ID information or the like before the term of validity is extended to thereby update contents of the service session ID information or the like temporarily stored in the authentication information storage unit 1038 already.

Note that in such step SP1168, the control unit 1023 of the client terminal 1002 automatically inputs the various kinds of information constituting the registration information in the respective input columns in the information registration screen. However, the invention is not limited to this. In step SP1167 described above, the music data delivery server 1004 may transmit the information registration screen data to the client terminal 1002 in a state in which the various kinds of information constituting the registration information are automatically inputted in the respective input columns in the information registration screen.

In step SP1169, when input columns, in which information is not inputted, are present in the information registration screen even if the respective pieces of information are automatically inputted to the respective input columns in the information registration screen, if information is manually inputted in the input columns, in which information is not inputted, on the information registration screen and a control command corresponding to a character string indicating the manually inputted information is inputted from the input processing unit 1021, whereby input of information in the input columns in the information registration screen is completed, the control unit 1023 gathers the various kinds of information, which are completed to be inputted in the respective input columns in the information registration screen, into registration information for registration in the music data delivery server 1004.

Then, the control unit 1023 transmits such registration information to the music data delivery server 1004 together with the service session ID information or the like, which is received from the music data delivery server 1004 and temporarily stored in the authentication information storage unit 1038 in step SP1168 described above, via the communication control unit 1032 and the network interface 1033 sequentially.

Subsequently, in the fourth information registration processing procedure, the music data delivery server 1004 and the client terminal 1002 execute the same processing as steps SP1110 to SP1113 described above sequentially.

Consequently, as in the first information registration processing procedure described above, with the registration completion screen displayed on the display unit 1025 in step SP1113, the control unit 1023 of the client terminal 1002 notifies the user that the registration of the registration information in the music data delivery server 1004 has been completed.

In the above constitution, the client terminal 1002 is subjected to user authentication using authentication session ID information or the like, for which a term of validity is set, from the portal server 1003 directly or through the music data delivery server 1004 and then acquires registration information of a user who has already been registered.

Then, the client terminal 1002 diverts the registration information of the user acquired from the portal server 1003 to generate registration information with respect to the music data delivery server 1004. The client terminal 1002 is subjected to user authentication using service session ID information or the like, for which a term of validity is set, and then registers the generated registration information in the music data delivery server 1004.

According to the above constitution, the client terminal 1002 is subjected to user authentication using authentication session ID information or the like or service session ID information or the like, for which a term of validity is set, and then acquires already registered registration information from the portal server 1003, diverts the acquired registration information to generate registration information for registration in the music data delivery server 1004, and registers the generated registration information in the music data delivery server 1004. Therefore, the same effect as the first and the second embodiments described above can be obtained. In addition, it is possible to prevent registration information once registered in the portal server 1003 from being used illegally by a third party almost surely and register registration information of a user in the music data delivery server 1004.

In addition, when acquisition of registration information of a user is requested from the music data delivery server 1004, the portal server 1003 authenticates the music data delivery server 1004 with a shop code. Therefore, it is possible to prevent the registration information of the user from being used illegally by a third part more surely.

Moreover, the client terminal 1002 stores and holds registration information used for registration with respect to the portal server 1003 and diverts such registration information to registration with respect to the music data delivery server 1004. Therefore, the client terminal 1002 does not have to perform communication with the portal server 1003 in registering registration information in the music data delivery server 1004. This makes it possible to simplify registration processing of the registration information with respect to the music data delivery server 1004 significantly.

Note that, in such a third embodiment, the case in which registration information of a user using the client terminal 1002 is registered in the music data delivery server 1004 according to the first to the fourth information registration processing procedures is described. However, the present invention is not limited to this, and the registration information of the user can be registered in the same manner in servers other than the music data delivery server 1004 in accordance with such first to fourth information registration processing procedures.

Note that the registration information to be registered in the portal server 1003 and the music data delivery server 1004 explained for the first to the fourth information registration processing procedures described above corresponds to the customer information to be subjected to user registration with respect to the respective servers 31 to 36 explained concerning the second embodiment.

Incidentally, in the program module described above concerning FIG. 10, the HTTP message program 111 and the communicator program 112 are program modules that are capable of realizing the same function as the communication control unit 1032 of the client terminal 1002 described above concerning FIG. 17.

In addition, the content reproduction module 113 is a program module that is capable of realizing the same function as the encoder/decoder unit 1034 of the client terminal 1002 described above concerning FIG. 17.

Moreover, the copyright protection management module 114 is a program module that is capable of realizing the same functions as the copyright management unit 1035 of the client terminal 1002 described above concerning FIG. 17.

Moreover, the Internet radio selection and reproduction module 118 is a program module that is capable of realizing the same functions as the control unit 1023 and the voice control unit 1026 of the client terminal 1002 described above concerning FIG. 17.

Moreover, the tune purchase and reproduction module 119 is a program module that is capable of realizing the same functions as the control unit 1023 and the voice control unit 1026 of the client terminal 1002 described above concerning FIG. 17.

Moreover, the XML browser 151 is a program module that is capable of realizing the same functions as the input processing unit 1021 and the page information generation unit 1036 of the client terminal 1002 described above concerning FIG. 17.

Moreover, the hard disk content controller 117 and the database access module 115 as well as the content data access module 116 are program modules that are capable of realizing the same function as the control unit 1023 of the client terminal 1002 described above concerning FIG. 17.

Moreover, the authentication library 131 of the library 130 is a program module that is capable of realizing the same functions as the authentication processing unit 1037 and the authentication information storage unit 1038 of the client terminal 1002 described above concerning FIG. 17.

Moreover, the clip library 132 of the library 130 is a program module that is capable of realizing the same function as the control unit 1023 of the client terminal 1002 described above concerning FIG. 17.

Moreover, the related information display module 120 is a program module that is capable of realizing the same function as the radio broadcast display control unit 1039 of the client terminal 1002 described above concerning FIG. 17.

Moreover, the tuner selection and reproduction/recording module 121 is a program module that is capable of realizing the same functions as the control unit 1023 and the voice control unit 1026 as well as the tuner unit 1031 of the client terminal 1002 described above concerning FIG. 17.

Moreover, the audio user interface 152 is a program module that is capable of realizing the same functions as the input processing unit 1021 and the control unit 1023 as well as the display control unit 1024 of the client terminal 1002 described above concerning FIG. 17.

Moreover, the CD reproduction module 141 is a program module that is capable of realizing the same functions as the voice control unit 1026 and the external recording medium recording and reproduction unit 1028 of the client terminal 1002 described above concerning FIG. 17.

Moreover, the HDD reproduction module 142 is a program module that is capable of realizing the same functions as the control unit 1023 and the voice control unit 1026 of the client terminal 1002 described above concerning FIG. 17.

Therefore, in the terminal apparatus 10 with the hardware structure according to the hardware circuit block described above concerning FIG. 9, the CPU 11 can execute the same processing as the client terminal 1002 with the hardware structure according to the functional circuit block described above concerning FIG. 17 in accordance with the above-described various program modules.

Note that the above-described terminal apparatus 10 and various servers 31 to 36 can be realized by computers, respectively. In other words, programs describing processing contents of functions, which should be held by the computers, are provided to the terminal apparatus 10 and the various servers 31 to 36 of the computer structure. The computer executes the programs, whereby the processing functions are realized on the computers. The programs describing the processing contents can be recorded in a computer readable recording medium. As the computer readable recording medium, there are a magnetic recording device, an optical disk, a magneto-optical recording medium, a semiconductor memory, and the like. As the magnetic recording device, there are a hard disk device (HDD), a flexible disk (FD), a magnetic tape, and the like. As the optical disk, there are a DVD (Digital Versatile Disc), a DVD-RAM (Random Access Memory), a CD-ROM (Compact Disc Read Only Memory), a CD-R (Recordable)/RW (ReWritable), and the like. As the magneto-optical recording medium, there are an MO (Magneto-Optical disk) and the like.

The computers executing the programs stores, for example, programs recorded in a portable recording medium or programs transferred from a server computer in storages of the computers. Then, the computers read the programs from the storages of the computers and execute processing according to the programs. Note that the computers can also read the programs directly from the portable recording medium and execute processing according to the programs. In addition, the computers can also execute processing according to a received program every time the program is transferred from the server computer.

(4) Other Embodiments

Note that, in the third embodiment described above, the case in which a radio broadcast to be broadcast from a radio station is applied as a broadcast receivable by the client terminal 1002 is described. However, the present invention is not limited to this, and it is possible that the client terminal 1002 receives an Internet radio broadcast or a satellite radio broadcast to acquire related information thereof and radio broadcast information or receives a television broadcast to be broadcast from a television broadcasting station to acquire various kinds of broadcast information and the like concerning television programs of the television broadcast from a server on a network NT1000.

In addition, in the second and the third embodiments described above, the case in which a hardware circuit block, a functional circuit block, and a program module are mounted on the client terminal 1002 is described. However, the invention is not limited to this, these ma be mounted on various terminals other than the client terminal 1002 such as a cellular phone and a personal computer. Any terminal can realize the same processing as the client terminal 102 described above as long as the terminal is mounted with these hardware circuit block, functional circuit block, and program module.

Moreover, in the first to the third embodiments described above, the case in which the communication system for transmitting and receiving customer information according to the invention is applied to the network system and the music related service provision system described above concerning FIGS. 1 to 26 is described. However, the invention is not limited to this and can be applied to systems with other various structures widely as long as the systems perform user registration with respect to a communication apparatus establishing a system in order to receive a service.

Moreover, in the first to the third embodiments described above, the case in which the first communication apparatus storing the first customer information registered by a user in order to receive the first service according to the invention is applied to various servers such as the service enterpriser server 320, the CD title information provision sever 31, the broadcasting station server 32, the music delivery server 33, the CD shop server 34, the Internet radio server 36, and the music data delivery server 1004 described above concerning FIG. 1 to 26 is described. However, the invention is not limited to this and can be applied to other various first communication apparatuses widely as long as the first communication apparatuses perform user registration for provision of a service.

Moreover, in the first to the third embodiment described above, the case in which the second communication apparatus storing the second customer information registered by a user in order to receive the second service according to the invention is applied to the information management server 310, the integrated service server 35, and the portal server 1003 described above concerning FIGS. 1 to 26 is described. The invention is not limited to this and can be applied to other various second communication apparatuses widely as long as the second communication apparatuses perform user registration for provision of a service.

Moreover, in the first to the third embodiments described above, the case in which the third communication apparatus connected to at least the first communication apparatus according to the invention is applied to the terminal 300, the terminal apparatus 10, and the client apparatus 1002 described above concerning FIGS. 1 to 26 is described. However, the invention is not limited to this and can be applied to third communication apparatuses of other various structures widely such as information processing apparatuses like a personal computer, a cellular phone, a game device connected to a network and a video processing apparatus such as a hard disk recorder connected to a network.

Moreover, in the first to the third embodiment described above, the case in which the CPU 11 and the communication processing unit 22 or the control unit 1023 and the communication control unit 1032 described above concerning FIGS. 1 to 26 are applied as transmission means that transmits request information requesting registration in the first communication apparatus to the first communication apparatus together with identification information of a user is described. However, the invention is not limited to this, and other various transmission means can be applied widely according to a communication system applied to a communication system.

Moreover, in the first to the third embodiments described above, the case in which the CPU 11 and the communication processing unit 22 or the control unit 1023 and the communication control unit 1032 described above concerning FIGS. 1 to 26 are applied as reception means that receives customer information necessary for user registration with respect to the first communication apparatus from the first communication apparatus according to request information is described. However, the invention is not limited to this, and other various reception means can be applied widely according to a communication system applied to a communication system.

Moreover, in the first to the third embodiment, described above the case in which, when customer information necessary for user registration is already included in the second customer information, the CPU 11, the control unit 1023, and the display control unit 1024 described above concerning FIGS. 1 to 26 are applied as display means that displays the customer information in the second customer information on an input screen on which user registration is performed is described. However, the invention is not limited to this, and other various display means can be applied widely like control means or the like of the first communication apparatus such as the control unit 1070 of the music data delivery server 1004.

Moreover, in the first to the third embodiment described above, the case in which when customer information necessary for user registration for the first service is registered in the second customer information, the CPU 11 and the communication processing unit 22 or the control unit 1023 and the communication control unit 1032 described above concerning FIGS. 1 to 26 are applied as transfer means that transfers the customer information of the second customer information to the first communication apparatus according to permission from a user is described. However, the invention is not limited to this and other various transfer means can be applied widely according to a communication system applied to a communication system.

Moreover, in the first to the third embodiments described above, the case in which the hard disk drive 21, the RAM 20, the control unit 1023, and the storage medium 1029 described above concerning FIGS. 1 to 26 are applied as storage means that stores customer information that is inputted at the time of user registration for the second service is described. However, the invention is not limited to this, and other various storage means can be applied widely.

Moreover, in the first to the third embodiments described above, the case in which the control unit 1070 of the music data delivery server 1004 described above concerning FIGS. 1 to 26 is applied as information registration screen generation means that generates information used by a service enterpriser server to display an information registration screen is described. However, the invention is not limited to this, and other various information registration screen generating means can be applied widely like a dedicated information registration screen generation unit.

Moreover, in the first to the third embodiments described above, the case in which the CPU 35*a* and the authentication processing unit 156 described above concerning FIGS. 1 to 26 are applied as authentication means that authenticates a terminal apparatus is described. However, the invention is not limited to this, and other various authentication means can be applied widely.

Moreover, in the first to the third embodiments described above, the case in which the operation input units 15 and 1020 described above concerning FIGS. 1 to 26 are applied as input means, with which correction of registration information reflected on an information registration screen and input of information not reflected on the information registration screen are made possible, is described. However, the invention is not limited to this, and other various input means can be applied widely like a touch panel and the like.

INDUSTRIAL APPLICABILITY

The invention can be used for a service provision system that is established from a terminal such as a personal computer, a cellular phone, or an audio apparatus that is capable of using a service provided via a network such as the Internet, a customer management server such as a computer on the network that manages a user of the terminal, and a service provision server such as a computer that provides various services to the terminal via the network.

DESCRIPTION OF SYMBOLS

210 . . . INFORMATION MANAGEMENT ENTERPRISER, 220 . . . SERVICE ENTERPRISER, 250 . . . INFORMATION COMMUNICATION NETWORK, 300 . . . TERMINAL, 310 . . . INFORMATION MANAGEMENT SERVER, 320 . . . SERVICE ENTERPRISER SERVER, 1 . . . FIRST COMMUNICATION APPARATUS, 2 . . . SECOND COMMUNICATION APPARATUS, 3 . . . THIRD COMMUNICATION APPARATUS, 3A . . . TRANSMISSION MEANS, 3B . . . RECEPTION MEANS, 3C . . . DISPLAY MEANS, 11, 35A . . . CPU, 12 . . . BUS, 13 . . . ROM, 14 . . . INPUT PROCESSING UNIT, 15 . . . OPERATION INPUT UNIT, 16 . . . DISPLAY PROCESSING UNIT, 17 . . . DISPLAY DEVICE, 19A, 20, 35B . . . RAMS, 21, 35C . . . HDDS, 22 . . . COMMUNICATION PROCESSING UNIT, 23 . . . NETWORK INTERFACE, 30 . . . NETWORK, 31 . . . CD TITLE INFORMATION PROVISION SERVER, 32 . . . BROADCASTING STATION SERVER, 33 . . . MUSIC DELIVERY SERVER, 34 . . . CD SHOP SERVER, 35 . . . INTEGRATED SERVICE SERVER, 1002 . . . CLIENT TERMINAL, 1003 . . . PORTAL SERVER, 1004 . . . MUSIC DATA DELIVERY SERVER, 1023, 1050, 1070 . . . CONTROL UNITS, 1024. DISPLAY CONTROL UNIT, 1032, 1052, 1072 . . . COMMUNICATION CONTROL UNITS, 1037, 1056, 1075 . . . AUTHENTICATION PROCESSING UNITS, 1038, 1057, 1077 . . . AUTHENTICATION INFORMATION STORAGE UNITS, 1054, 1074 . . . CUSTOMER DATABASE UNITS

The invention claimed is:

1. A communication system for transmitting and receiving customer registration information, comprising:

a first communication apparatus configured to store customer registration information having a first format previously registered by a user in order to receive a first service, and to generate an information registration screen on which user registration of the customer registration information having the first format is performed;

a second communication apparatus configured to store customer registration information having a second format different from the first format registered by the user in order to receive a second service, and to serve as an authentication server for single sign-on authentication; and a third communication apparatus that includes:

a transmission unit configured to transmit a request for registration with the first communication apparatus to the first communication apparatus;

a reception unit configured to receive the information registration screen from the first communication apparatus according to the request; and a display unit configured to display the information registration screen from the first communication apparatus, wherein the first communication apparatus and the second communication apparatus are configured to update and share the customer registration information at regular periodic intervals, the information registration screen generated by the first communication apparatus includes an option to select whether the information registration screen is to be populated by the customer registration information in the second communication apparatus, upon selecting the option to populate the information registration screen, the transmission unit is configured to transmit a request for customer registration information to the second communication apparatus, and upon receiving the customer registration information from the second communication apparatus, the display unit is configured to display a first screen including the information registration screen and a second screen displaying the received customer registration information from the second communication apparatus.

2. The communication system according to claim 1, wherein the display unit is further configured to display the customer registration information received from the second communication apparatus on the information registration screen received from the first communication apparatus in response to a command from the user.

3. The communication system according to claim 1, wherein the second communication apparatus includes a transfer unit configured to transfer the customer registration information in the second communication apparatus to the first communication apparatus according to permission from the user.

4. The communication system according to claim 1, wherein the third communication apparatus further includes a storage unit configured to store the customer registration information inputted at the time of the user registration for the second service, and
the display unit is further configured to display the customer registration information stored in the storage unit on the information registration screen.

5. The communication system according to claim 1, wherein
the first communication apparatus is a service enterpriser server,
the second communication apparatus is a management enterpriser server in which customer registration information is registered,
the third communication apparatus is a terminal apparatus of the user, and
the transmission unit is further configured to transmit the information registration screen with the customer registration information to the service enterpriser server.

6. The communication system according to claim 5, wherein the service enterpriser server includes an information registration screen generating unit configured to generate information to display the information registration screen.

7. The communication system according to claim 5, wherein the service enterpriser server includes an authentication unit configured to authenticate the terminal apparatus.

8. The communication system according to claim 5, wherein the display unit is configured to display an indication to select whether the user information registered in the management enterpriser server is to be quoted immediately after displaying the information registration screen.

9. The communication system according to claim 5, wherein the terminal apparatus further includes an input unit with which correction of the registration information reflected on the information registration screen and input of information not reflected on the information registration screen are made possible.

10. The communication system according to claim 1, wherein the display unit is further configured to simultaneously display a first and second screen, said first screen including customer registration information and said second screen including the registration information.

11. The communication system according to claim 1, wherein the third communication apparatus receives customer registration information from the second communication apparatus and the display unit populates the information registration screen with the customer registration information, the display unit is further configured to accept input of additional customer registration information not included in the received customer registration information and allow correction of the received customer registration information.

12. The communication apparatus of claim 11, wherein after populating the information registration screen with the customer information, the third communication apparatus transmits the customer registration information to the first communication apparatus.

13. The communication apparatus of claim 1, wherein the third communication apparatus further comprises an audio apparatus.

14. The communication apparatus of claim 13, wherein the audio apparatus includes a tuner for receiving broadcast transmissions.

15. The communication apparatus of claim 1, wherein the third communication apparatus does not include operation keys for character input.

16. A user communication apparatus for transmitting and receiving customer registration information, comprising:
a transmission unit configured to transmit a request for registration with a first communication apparatus to the first communication apparatus, and to transmit a request for customer identification information to a second communication apparatus, to perform single sign-on authentication of the user communication apparatus at the second communication apparatus;
a reception unit configured to receive an information registration screen from the first communication apparatus according to the request on which user registration of the customer registration information having a first format is performed, the information registration screen including an option to select whether the information registration screen is to be populated by the customer registration information in a second communication apparatus having a second format different from the first format; and
a display unit configured to display the information registration screen from the first communication apparatus, wherein
the first communication apparatus and the second communication apparatus are configured to update and share customer registration information at regular periodic intervals,
upon selecting the option to populate the information registration screen, the transmission unit is configured to transmit a request for customer registration information to the second communication apparatus, and
upon receiving the customer registration information from the second communication apparatus, the display unit is configured to display a first screen including the information registration screen and a second screen displaying the received customer registration information from the second communication apparatus.

17. The user communication apparatus according to claim 16, further comprising:
a storage unit configured to store customer registration information inputted at the time of user registration for the second service, wherein
the display unit is configured to display the customer registration information stored in the storage unit on the information registration screen.

18. The user communication apparatus according to claim 16, wherein
the first communication apparatus corresponds to a service enterpriser server;
the second communication apparatus corresponds to a management enterpriser server;
the user communication apparatus corresponds to a terminal apparatus of a user; and
the transmission unit is further configured to transmit the information registration screen with the customer registration information to the service enterpriser server.

19. The user communication apparatus according to claim 18, wherein the display unit displays an indication to select whether the user information registered in the management enterpriser server is to be quoted immediately after displaying the information registration screen.

20. The user communication apparatus according to claim 18, further comprising:
an input unit configured to receive an input that corrects the registration information reflected on the information registration screen and to input information that is not reflected on the information registration screen.

21. An information server for transmitting and receiving customer registration information, comprising:
a reception unit configured to receive customer registration information necessary for user registration and having a first format;
a storage unit configured to store the customer registration information;
a transmission unit configured to transmit the customer registration information to a communication apparatus used by the user upon receiving a request for customer registration information; and
an authentication unit configured to perform single sign-on authentication based on customer registration information received from the communication apparatus, wherein
the request for customer registration information is transmitted by the communication apparatus used by the user in response to an option to populate an information registration screen on which user registration of customer registration information having a second format different from the first format is performed,
the information registration screen includes the option to populate and is transmitted to the communication apparatus used by the user by a second communication apparatus,
the information server and the second communication apparatus are configured to update and share customer registration information at regular periodic intervals, and
upon receiving the customer registration information, the communication apparatus used by the user is configured to display a first screen including the information registration screen and a second screen displaying the received customer registration information.

22. The information server according to claim 21, wherein the information server is configured to periodically update and share the customer registration information with a communication apparatus providing other services.

23. The information server according to claim 21, wherein the transmission unit is configured to transmit the customer registration information to a communication apparatus providing other services in response to permission from the user.

24. A communication method for transmitting and receiving customer registration information, comprising:
transmitting a request for registration with a first communication apparatus to the first communication apparatus and transmitting a request for customer identification information to a second communication apparatus to perform single sign-on authentication of the user communication apparatus at the second communication apparatus;
receiving an information registration screen from the first communication apparatus according to the request on which user registration of the customer registration information having a first format is performed, the information registration screen including an option to select whether the information registration screen is to be populated by the customer registration information in the second communication apparatus having a second format different from the first format;
displaying the information registration screen from the first communication apparatus;
transmitting a request for customer registration information to the second communication apparatus upon selection of the option to populate the information registration screen; and
displaying a first screen including the information registration screen and a second screen displaying the received customer registration information from the second communication apparatus upon receiving the customer registration information from the second communication apparatus, wherein
the first communication apparatus and the second communication apparatus are configured to update and share customer registration information at regular periodic intervals.

25. A communication method for an information server for transmitting and receiving customer registration information, comprising:
receiving customer registration information having a first format necessary for user registration;
storing the customer registration information;
transmitting the customer registration information to a first communication apparatus used by the user upon receiving a request for the customer registration information, wherein the request for customer registration information is transmitted by the first communication apparatus used by the user in response to an option to populate an information registration screen on which user registration of the customer registration having a second format is performed, the information registration screen including the option to populate being transmitted to the first communication apparatus by a second communication apparatus providing another service;
transmitting the customer registration information to an authentication server for single sign-on authentication, wherein the user performs user registration in the second communication apparatus, and the second communication apparatus transmits the customer registration information to the first communication apparatus used by the user; and
updating and sharing the customer registration information between the authentication-server and the second communication apparatus at regular periodic intervals, wherein
upon receiving the customer registration information, the first communication apparatus used by the user is configured to display a first screen including the information registration screen and a second screen displaying the received customer registration information.

26. A communication apparatus configured to store a computer program that is described in a computer-readable form for transmitting and receiving customer registration information, which when executed by a processor causes the processor to perform:
transmitting a request for registration with a first communication apparatus to the first communication apparatus and transmitting a request for the customer identification information to a second communication apparatus to perform sign-on authentication of the user communication apparatus at the second communication apparatus;
receiving an information registration screen from the first communication apparatus according to the request on which user registration of the customer registration information having a first format is performed, the information registration screen including an option to select whether the information registration screen is to be populated by the customer registration information in the second communication apparatus having a second format different from the first format;

displaying the information registration screen from the first communication apparatus; transmitting a request for customer registration information to the second communication apparatus upon selection of the option to populate the information registration screen; and displaying a first screen including the information registration screen and a second screen displaying the received customer registration information from the second communication apparatus upon receiving the customer registration information from the second communication apparatus, wherein the first communication apparatus and the second communication apparatus are configured to update and share customer registration information at regular periodic intervals.

* * * * *